US012422639B2

(12) United States Patent
Claessens et al.

(10) Patent No.: US 12,422,639 B2
(45) Date of Patent: Sep. 23, 2025

(54) FIBER MANAGEMENT TRAY ARRANGEMENTS AND ASSEMBLIES FOR FIBER OPTIC CLOSURE ORGANIZERS

(71) Applicant: COMMSCOPE TECHNOLOGIES LLC, Hickory, NC (US)

(72) Inventors: Bart Mattie Claessens, Hasselt (BE); Pieter Doultremont; Johan Geens, Bunsbeek (BE); Eddy Luc Cams, Bilzen (BE); Diogo Fevereiro Baptista, Leuven (BE)

(73) Assignee: CommScope Technologies LLC, Claremont, NC (US)

( * ) Notice: Subject to any disclaimer, the term of this patent is extended or adjusted under 35 U.S.C. 154(b) by 218 days.

(21) Appl. No.: 18/059,824

(22) Filed: Nov. 29, 2022

(65) Prior Publication Data
US 2023/0116032 A1    Apr. 13, 2023

Related U.S. Application Data

(63) Continuation of application No. PCT/US2021/034973, filed on May 28, 2021.
(Continued)

(51) Int. Cl.
*G02B 6/44* (2006.01)
(52) U.S. Cl.
CPC ......... *G02B 6/4453* (2013.01); *G02B 6/4455* (2013.01)
(58) Field of Classification Search
CPC . G02B 6/4452; G02B 6/4455; G02B 6/44524
See application file for complete search history.

(56) References Cited

U.S. PATENT DOCUMENTS

| 5,802,237 A | * | 9/1998 | Pulido | G02B 6/444 |
| | | | | 385/137 |
| 6,438,310 B1 | * | 8/2002 | Lance | G02B 6/44528 |
| | | | | 385/135 |

(Continued)

FOREIGN PATENT DOCUMENTS

| KR | 1020100024599 A | 3/2010 |
| WO | 02/097505 A1 | 12/2002 |

(Continued)

OTHER PUBLICATIONS

International Search Report for PCT/US2021/034973 mailed Sep. 23, 2021.
(Continued)

*Primary Examiner* — Eric Wong
(74) *Attorney, Agent, or Firm* — Merchant & Gould P.C.

(57) ABSTRACT

A fiber management organizer for a telecommunications closure includes a main body defining a first cable management region, a tray assembly extending over at least a portion of the first cable management region, the tray assembly including a tower mounted to oppositely positioned side walls of the main body, a plurality of trays rotatably mounted to the tower such that the trays are rotatable about an axis orthogonal to the longitudinal axis; and a cover support part disposed between the main body and the tower, the cover support part covering at least a portion of the first cable management region and supporting a central portion of the tower above the first cable management region. A demarcation cover can also be provided with the tray assembly to secure the trays in a closed position and limit access to the trays. The cover can be locked closed and unlocked. When unlocked, the cover can be pivoted to one or more stable open positions to provide access to the
(Continued)

sensitive area without having to completely remove the cover from the organizer.

20 Claims, 65 Drawing Sheets

Related U.S. Application Data

(60) Provisional application No. 63/153,609, filed on Feb. 25, 2021, provisional application No. 63/032,248, filed on May 29, 2020.

(56) References Cited

U.S. PATENT DOCUMENTS

| | | | |
|---|---|---|---|
| 7,418,184 B1* | 8/2008 | Gonzales | G02B 6/4455 |
| | | | 385/134 |
| 8,009,954 B2* | 8/2011 | Bran de Leon | G02B 6/4454 |
| | | | 385/136 |
| 8,929,706 B2* | 1/2015 | Teymouri | G02B 6/44528 |
| | | | 385/135 |
| 11,061,196 B2 | 7/2021 | Schurmans et al. | |
| 2009/0252472 A1 | 10/2009 | Solheid et al. | |
| 2011/0164853 A1 | 7/2011 | Corbille et al. | |
| 2013/0243386 A1* | 9/2013 | Pimentel | G02B 6/4401 |
| | | | 385/135 |
| 2014/0226945 A1 | 8/2014 | Claessens et al. | |
| 2015/0153532 A1 | 6/2015 | Holmberg et al. | |
| 2017/0052338 A1 | 2/2017 | Claessens et al. | |
| 2018/0039037 A1 | 2/2018 | Aznag et al. | |
| 2018/0292622 A1 | 10/2018 | Clatanoff et al. | |
| 2019/0018212 A1 | 1/2019 | Allen | |
| 2019/0025532 A1 | 1/2019 | Kaplan | |
| 2020/0150370 A1* | 5/2020 | Van Baelen | G02B 6/4455 |
| 2021/0011239 A1 | 1/2021 | Geens et al. | |
| 2021/0126996 A1* | 4/2021 | Allen | G02B 6/4455 |

FOREIGN PATENT DOCUMENTS

| | | |
|---|---|---|
| WO | 2014009255 A1 | 1/2014 |
| WO | 2019/160995 A1 | 8/2019 |
| WO | 2019/209643 A1 | 10/2019 |
| WO | 2020/154418 A1 | 7/2020 |
| WO | 2021/163340 A1 | 8/2021 |
| WO | 2021/163356 A1 | 8/2021 |
| WO | 2021/207228 A1 | 10/2021 |
| WO | 2021/226355 A1 | 11/2021 |
| WO | 2023/055419 A1 | 4/2023 |

OTHER PUBLICATIONS

International Search Report and Written Opinion for Application No. PCT/US2022/017330 mailed Jun. 27, 2022.

BUDI-FS—Demarcation Cover Installation Instructions, CommScope TC-1354-ADD-IP Rev. A, 2 pages (Feb. 2019).

OFDC-B8G Outdoor Fiber Distribution Closure Installation Instructions, CommScope TC-1426-IP, Ver 00, Issue 03, 8 pages (May 2019).

Extended European Search Report for EP21812907.0 mailed Jun. 14, 2024.

* cited by examiner

FIBER MANAGEMENT TRAY ARRANGEMENTS AND ASSEMBLIES FOR FIBER OPTIC CLOSURE ORGANIZERS

RELATED APPLICATIONS

This application is a Continuation of PCT/US2021/034973, filed on 28 May 2021 which claims the benefit of U.S. Patent Application Ser. No. 63/032,248, filed on May 29, 2020, and U.S. Patent Application Ser. No. 63/153,609, filed on Feb. 25, 2021, the disclosure of which are incorporated herein by reference in their entireties.

TECHNICAL FIELD

The present disclosure relates to telecommunications enclosures, and more particularly to fiber management arrangements for routing and managing fibers at fiber organizer assemblies housed in telecommunications closures.

BACKGROUND

Telecommunications systems typically employ a network of telecommunications cables capable of transmitting large volumes of data and voice signals over relatively long distances. Telecommunications cables can include fiber optic cables, electrical cables, or combinations of electrical and fiber optic cables. A typical telecommunications network also includes a plurality of telecommunications enclosures integrated throughout the network of telecommunications cables. The telecommunications enclosures or "closures" are adapted to house and protect telecommunications components such as splices, termination panels, power splitters, wave division multiplexers, fiber management trays, cable organizing and routing components, etc.

It is often preferred for telecommunications enclosures to be re-enterable. The term "re-enterable" means that the telecommunications enclosures can be reopened to allow access to the telecommunications components housed therein without requiring the removal and destruction of the telecommunications enclosures. For example, certain telecommunications enclosures can include separate access panels that can be opened to access the interiors of the enclosures, and then closed to reseal the enclosures. Other telecommunications enclosures take the form of elongated sleeves formed by wrap around covers or half-shells having longitudinal edges that are joined by clamps or other retainers. Still other telecommunications enclosures include two half-pieces that are joined together through clamps, wedges or other structures.

In certain applications, the enclosure/housing needs to be water and contaminant (e.g., dust) proof or water-resistant. In particular, water, moisture, cleaning fluids, dust etc., present at the exterior of the housing/enclosure should be prevented by the housing/enclosure from reaching components within the interior of the enclosure/housing. To provide such protection, enclosures can include a seal (e.g., a gel seal) around the perimeter of the enclosure or portions of the perimeter of the enclosure. One or more sealing blocks (e.g., gel blocks) housed in one of the housing pieces can be compressed against corresponding sealing blocks in another housing piece to form a seal therebetween. To accommodate cables or entering the enclosure through ports in the enclosure wall, corresponding sealing blocks positioned at the port locations of the enclosure can include sealing blocks that define cable passages such that the sealing blocks can be compressed around the cable forming a seal.

Typically, telecommunications closures house a fiber organizing assembly having equipment for organizing fibers, storing fibers, and optically connecting provider side fibers to subscriber side fibers. A given closure can accommodate different types of optical connections between fibers, such as connector to connector connections and splice connections. The organizer is typically sized according to the interior volume of the closure. It is generally desirable to maximize the number of fibers that can be managed within a given closure volume, as well as to maximize the versatility of the closure to manage different types of optical connections, different types of cables.

SUMMARY

In general terms, the present disclosure is directed to improvements in fiber management equipment of fiber organizers of telecommunications closures.

In one aspect, the present disclosure is directed to an improved telecommunications closure.

In another aspect, the present disclosure is directed to an improved organizer of a telecommunications closure.

In another aspect, the present disclosure is directed to an improved fiber management tray arrangement of an organizer of a telecommunications closure.

In another aspect, the present disclosure is directed to an improved fiber routing configuration using an organizer of a telecommunications closure and a tray arrangement of the organizer in accordance with principles of the present disclosure.

According to certain aspects of the present disclosure, a fiber management organizer for a telecommunications closure can include a main body defining a first cable management region and a second cable management region, the main body extending along a longitudinal axis, and a tray assembly extending over at least a portion of the first cable management region, the tray assembly including: a tower mounted to the main body; a plurality of trays rotatably mounted to the tower such that the trays are rotatable about an axis orthogonal to the longitudinal axis; a demarcation cover rotatably mounted to the tower such that the demarcation cover is rotatable about an axis orthogonal to the longitudinal axis. When the demarcation cover is in a closed position, the first cable management region is inaccessible and the second cable management region is accessible. When the demarcation cover is in an open position, the first and second cable management regions are each accessible.

In some examples, the tower is connected to the main body with a snap-fit type connection.

In some examples, the trays are connected to the tower with a snap-fit type connection.

In some examples, the demarcation cover includes a top wall and a pair of side walls, the side walls extending along sides of the plurality of trays.

In some examples, the demarcation cover is secured to the main body by a deflectable latch when the demarcation cover is in the closed position.

In some examples, the demarcation cover is secured to the main body by one or more fasteners when in the closed position.

In some examples, the first cable management region includes stored fiber optic cabling.

In some examples, the second cable management region includes a plurality of fiber optic adapters.

In some examples, the second cable management region includes a plurality of connectorized drop cables connected to the plurality of fiber optic adapters.

In some examples, the first cable management region includes stored fiber optic cabling extending from the plurality of fiber optic adapters.

According to certain aspects of the present disclosure, a fiber management organizer for a telecommunications closure can include a main body defining a first cable management region, a tray assembly extending over at least a portion of the first cable management region, the tray assembly including a tower mounted to oppositely positioned side walls of the main body; a plurality of trays rotatably mounted to the tower such that the trays are rotatable about an axis orthogonal to the longitudinal axis; and a cover support part disposed between the main body and the tower, the cover support part covering at least a portion of the first cable management region and supporting a central portion of the tower above the first cable management region.

In some examples, the tower is connected to the main body with a snap-fit type connection.

In some examples, the trays are connected to the tower with a snap-fit type connection.

In some examples, the cover support part is connected to the main body with a snap-fit type connection.

In some examples, the cover support part and the tower define an upper boundary of the first cable management region.

In some examples, the tower has a tray support portion extending at an oblique angle relative to the longitudinal axis.

In some examples, the tray support portion extends above the cover support portion.

In some examples, the cover support portion covers a portion of the first cable management region between an end of the base and the tower.

In some examples, the fiber management organizer further includes a demarcation cover rotatably mounted to the tower such that the trays are rotatable about an axis orthogonal to the longitudinal axis.

In some examples, when the demarcation cover is in a closed position, the first cable management region is inaccessible and the second cable management region is accessible, wherein, when the demarcation cover is in an open position, the first and second cable management regions are each accessible.

In general terms, the present disclosure is directed to improvements in fiber management equipment of fiber management organizers of telecommunications closures.

In one aspect, the present disclosure is directed to an improved telecommunications closure.

In another aspect, the present disclosure is directed to an improved fiber management organizer of a telecommunications closure.

In another aspect, the present disclosure is directed to fiber management organizers having features that provide selective access to different areas of the fiber management organizer.

In another aspect, the present disclosure is directed to a demarcation cover configured to provide selective access to an area of a fiber management organizer.

In another aspect, the demarcation cover can be locked or unlocked to a main body of the organizer.

In another aspect, when unlocked, the demarcation cover can be pivoted to one or more open positions relative to a main body of the organizer in which the cover remains pivotally coupled to the organizer.

According to certain aspects of the present disclosure, a fiber management organizer assembly for a telecommunications closure, includes: a subassembly, including: a main body defining a first area and a second area; a tray support structure mounted at the second area; and fiber management trays pivotally supported by the tray support structure; a demarcation cover, the demarcation cover being pivotally coupled with a hinge mechanism to the subassembly between an open position and a closed position, and being lockable, in the closed position, to the subassembly with a locking mechanism, an interior surface of the cover defining a seat; and a compressible pad positioned on the seat and configured to compress against one of the fiber management trays when the demarcation cover is in the closed position.

In some examples, the hinge mechanism includes a first hinge component on the demarcation cover that forms a hinge with a second hinge component on the tray support.

In some examples, the first hinge component is a socket and the second hinge component is a pin.

In some examples, the demarcation cover is lockable to the subassembly with two different locking mechanisms.

In some examples, one of the locking mechanisms includes a fastener insertable in holes defined by the cover and the main body, and wherein the other of the locking mechanism includes a resilient arm having a catch configured to lockingly engage a lip defined by the main body.

In some examples, the cover completely covers and extends beyond outer edges of the trays.

In some examples, the cover includes a holder for a fiber pick.

In some examples, the holder for the fiber pick includes clips and/or a grooved rest.

In some examples, the seat is defined by a ridge projecting from the interior surface of the cover and fulling surrounding the compressible pad.

In some examples, a cover support including a cover support body is provided, wherein when the cover is not locked to the subassembly, the cover can be pivoted to at least one open cover position relative to the subassembly while remaining coupled to the subassembly, the cover support being configured to abut the cover in the at least one open cover position and thereby encumber further pivoting of the cover from the at least one open cover position.

In some examples, the cover support body is slidable between different support positions in a slot defined by the subassembly, each support position corresponding to a different open cover position of the cover relative to the subassembly.

In some examples, the slot is defined by the tray support structure.

In some examples, the cover support body includes at least one flexible member including a catch configured to engage a catch engagement bar defined by the tray support structure at the slot.

In some examples, the cover support body includes two flexible members each including a catch configured to engage a catch engagement bar defined by the tray support structure at the slot.

In some examples, the at least one open cover position is pivoted at least 80 degrees relative to a closed position of the cover relative to the subassembly.

According to further aspects of the present disclosure, a fiber management organizer assembly for a telecommunications closure, includes: a subassembly, including: a main body defining a first area and a second area; a tray support structure mounted at the second area; and fiber management trays pivotally supported by the tray support structure; a demarcation cover, the demarcation cover being pivotally coupled to the subassembly with a hinge mechanism; and a cover support including a cover support body slidably positioned in a slot defined by the tray support structure, wherein the cover is configured to pivot to at least one open cover position relative to the subassembly while remaining coupled to the subassembly, the cover support being configured to abut the cover in the at least one open cover position and thereby encumber further pivoting of the cover from the at least one open cover position.

In some examples, the cover support body includes at least one flexible member including a catch configured to engage a catch engagement bar defined by the tray support structure at the slot.

In some examples, a telecommunications closure incudes housing pieces configured to cooperate to define a sealable and re-enterable closure volume, cables carrying optical fibers entering the closure volume, and a fiber management organizer assembly, in accordance with any of the above-described examples, positioned in the closure volume.

In some examples, the splice bodies protecting splices between optical fibers of the cables are held in spliced holders supported by the fiber management trays.

A method of accessing the fiber trays of any of the above-described example assemblies can include unlocking the locking mechanism and subsequent to the unlocking, pivoting the cover to an open position while the cover remains coupled to the subassembly.

In some examples, the method can include a cover support within a slot defined by the tray support structure such that the cover support abuts the cover and encumbers further pivoting of the cover beyond the open position.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
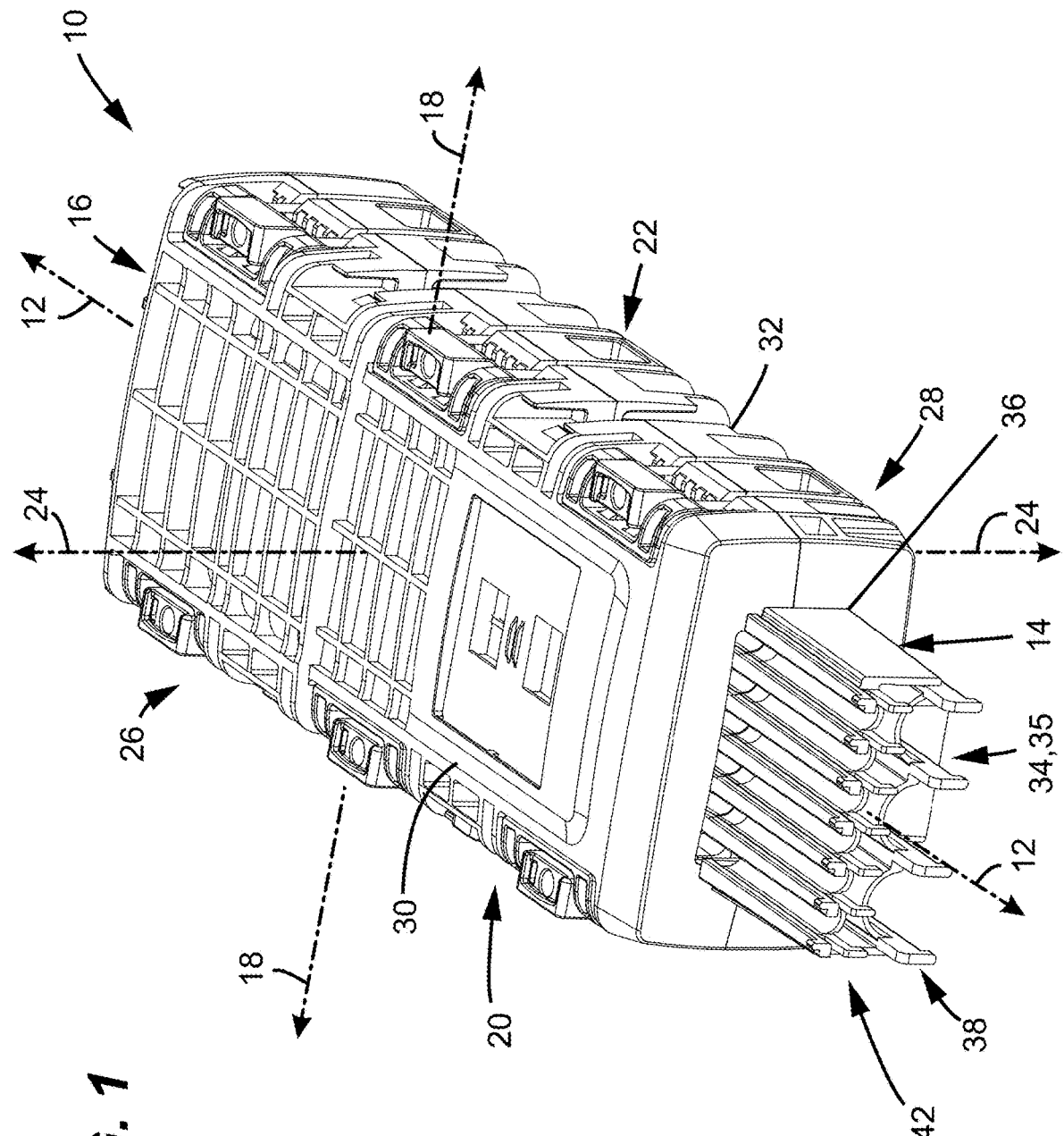
FIG. 1 is a perspective view of a telecommunications closure in accordance with the present disclosure, the closure being in a closed configuration.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Telecommunications Closure 10

Figure 2:
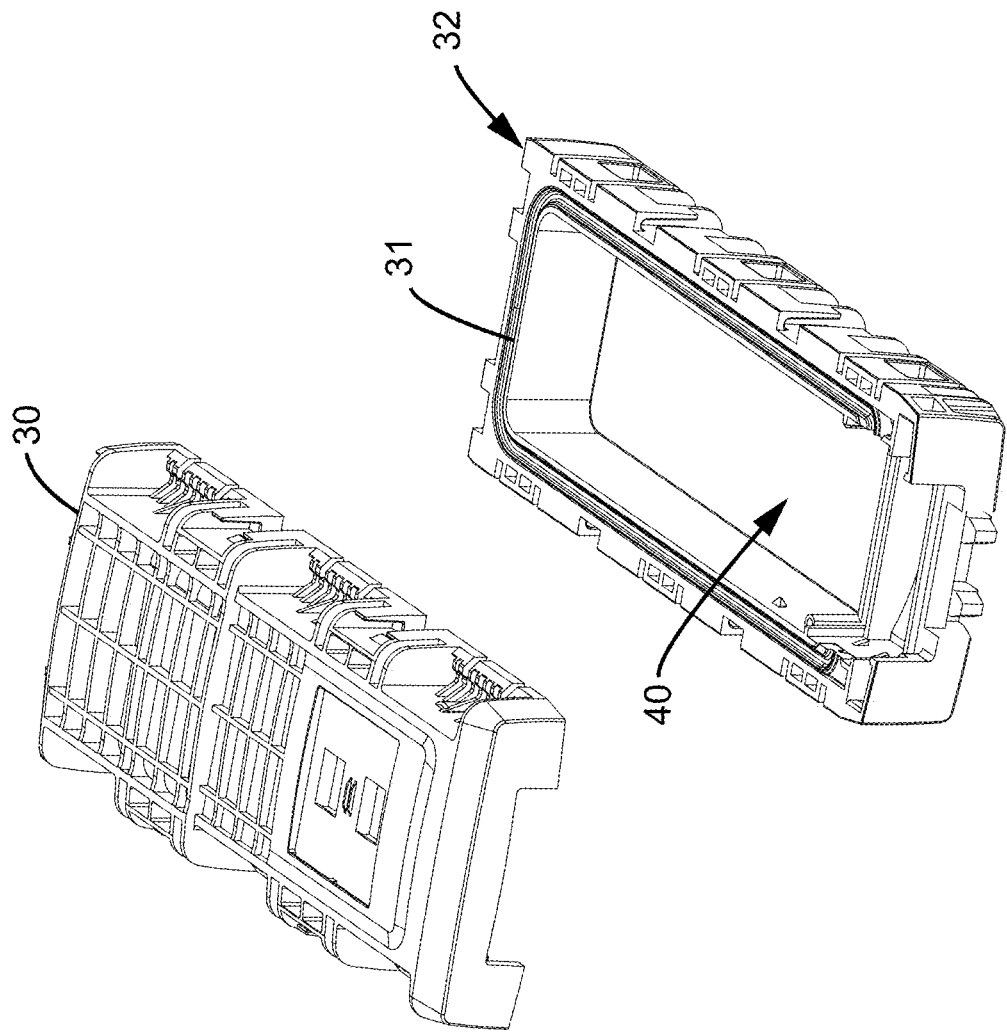
FIG. 2 is a perspective view of the housing pieces of the closure of FIG. 1.

Referring to FIGS. 1-2, a telecommunications closure 10 extends along a longitudinal axis 12 between a proximal end 14 and a distal end 16. The closure 10 extends along a transverse axis 18 between a first side 20 and a second side 22. The closure 10 extends along a vertical axis 24 between a top 26 and a bottom 28. The axes 12, 18 and 24 are mutually perpendicular, with the axes 12 and 18 defining a horizontal plane.

As used herein, terms such as proximal, distal, top, bottom, upper, lower, vertical, horizontal and so forth will be used with reference to the axes 12, 18, and 24 of FIG. 1 and in relating the positions of one component to another with respect to the full closure assembly of FIG. 1. These relative terms are for ease of description only, and do not limit how the closure 10 or any individual component or combination of components, may be oriented in practice.

The closure 10 includes a first upper housing piece 30 and a second lower housing piece 32 that cooperate (e.g., with hinges, clamps, etc.) to form a sealable and re-enterable closure volume 40. A perimeter seal element 31 forms a seal about three sides of the closure volume 40 when the closure 10 is in sealed and closed configuration.

The closure volume 40 is configured to house a cable organizer 34. An internal portion (not shown in FIGS. 1-2) of the cable organizer 34 is positioned within the closure volume 40. An external portion 35 of the cable organizer 34 is positioned exterior to the closure volume 40, with the cable organizer 34 extending through a proximally positioned opening 36 defined between the proximal ends of the first and second housing pieces 30 and 32. Cables enter the closure volume 40 via the opening 36 and sealed cable ports defined by the internal portion of the cable organizer 34.

The cable organizer 34 is configured to accommodate relatively thick cables (such as feeder cables and branch cables) entering the closure 10 via a lower region 38 of the cable organizer 34, and relatively thin cables (such as drop cables) entering the closure via an upper region 42 of the cable organizer 34.

Cable Organizer 100—General Construction

Referring now to FIGS. 3-11, a fiber management organizer or cable organizer (or organizer) 100 in accordance with the present disclosure will be described. The cable organizer 100 can cooperate with housing pieces of a closure such as described above. For example, the cable organizer 100 can cooperate with the housing pieces 30, 32 as described above with respect to FIGS. 1 and 2, an internal portion of the organizer being positioned in the closure volume 40. Other than at the proximal side, the housing pieces 30-32 do not form another opening to the outside of the closure.

Figure 21:
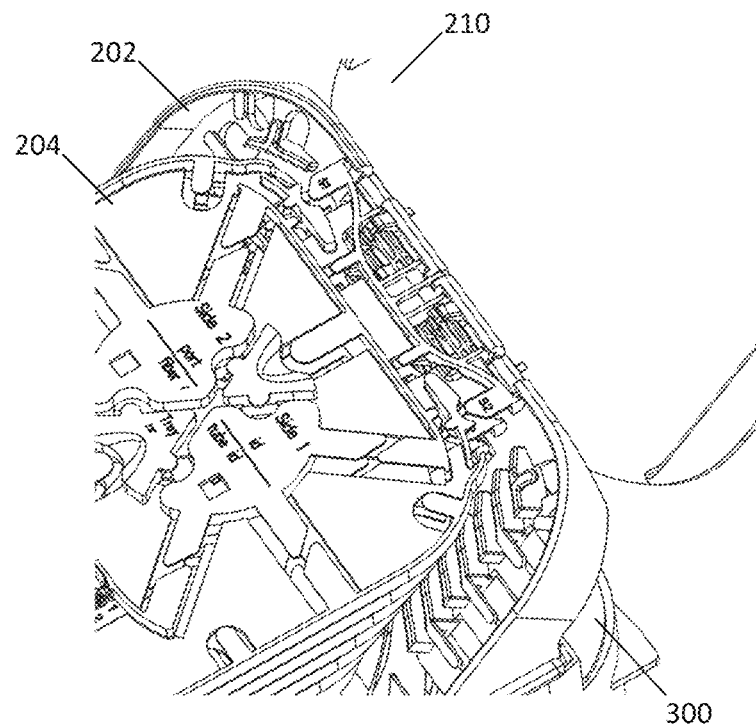
FIG. 21 is a partial top perspective view of the assembly of FIG. 18.
Figure 22:
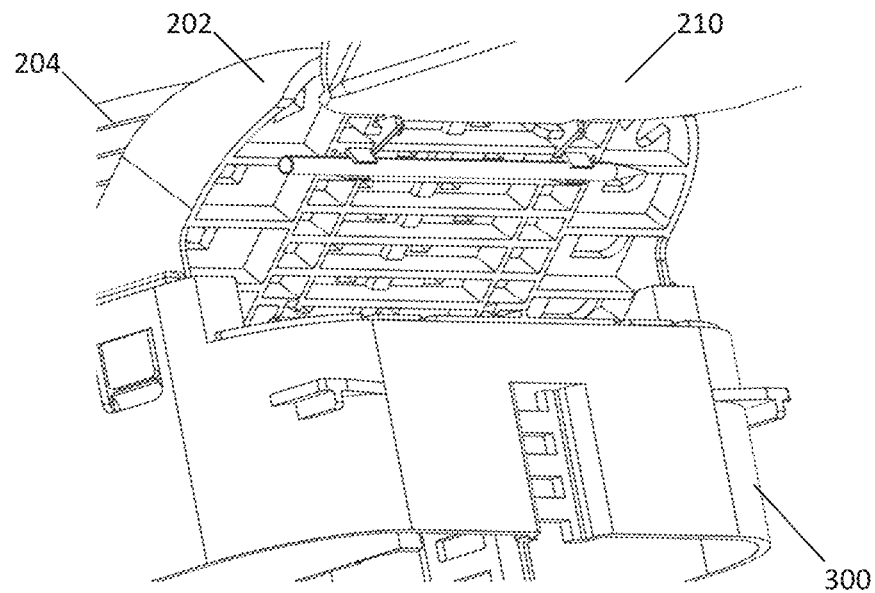
FIG. 22 is a partial bottom perspective view of the assembly of FIG. 18.

The organizer 100 extends along a longitudinal axis 102 from a proximal end 103 to a distal end 104, along a transverse axis 106 from a first side 108 to a second side 110, and along a vertical axis 112 from a top 114 to a bottom 116. The axes 102, 106 and 112 are mutually perpendicular, with the axes 102 and 106 defining a horizontal plane. The organizer 100 optionally includes an external portion 118 (FIG. 21) configured to be positioned outside of a closure volume and an internal portion 120 positioned distally from the external portion 118 and configured to be positioned within a closure volume. In some examples the external portion 118 and the internal portion 120 of the organizer are of unitary construction. Alternatively, the external portion is constructed separately and attached to the internal portion.

The organizer 100 is generally divided by one or more panels, walls, or other structures between an upper region 122 and a lower region 124. Some of these panels, walls and other structures form an integrated unit that serves as a main support structure 300 of the organizer 100. In some examples, the internal portion 120 of the organizer 100 corresponds to the main support structure or main body 300, and the external portion 118 is coupled to the main body 300.

Figure 13:
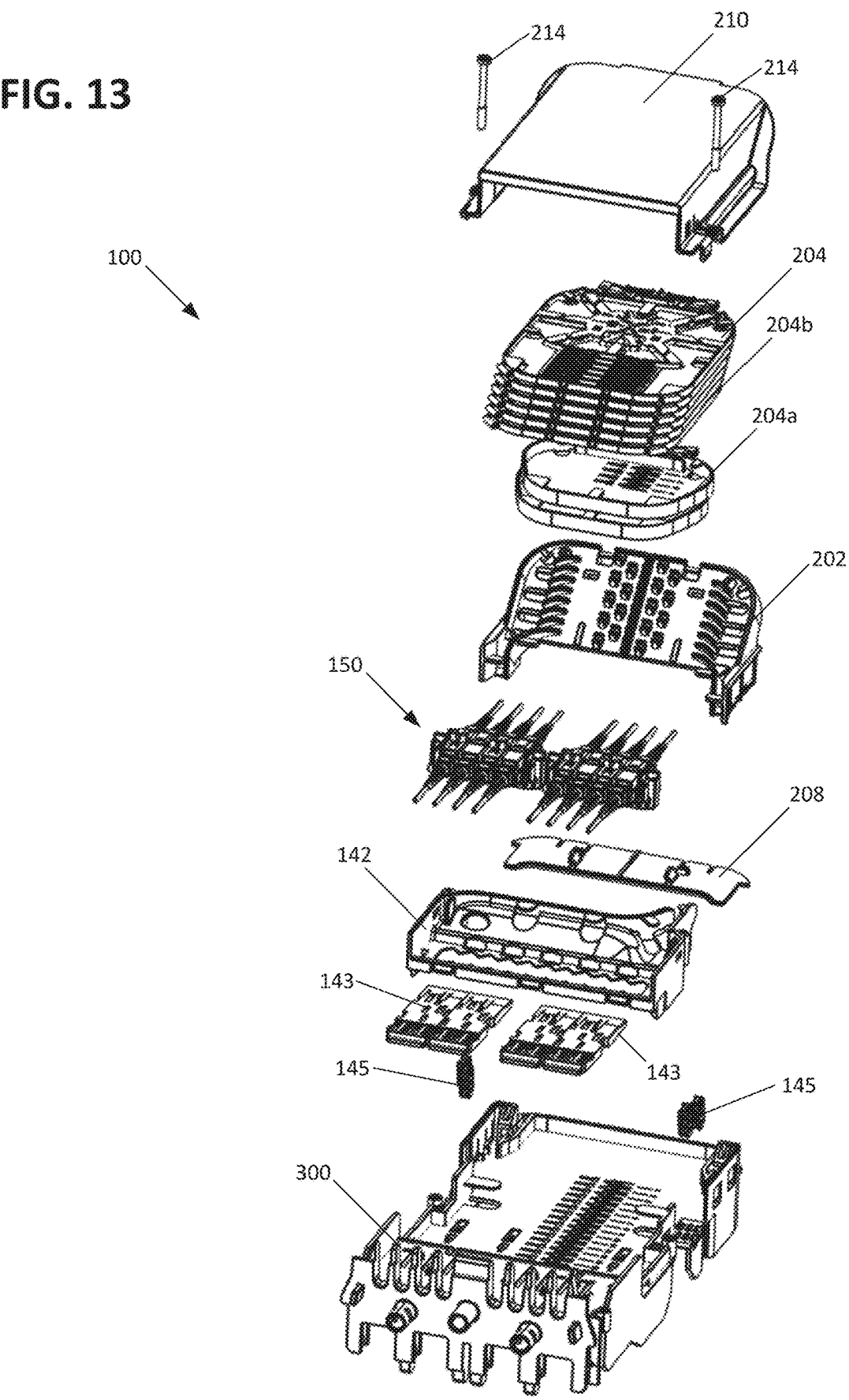
FIG. 13 is a perspective exploded view of the assembly of FIG. 3.
Figure 14:
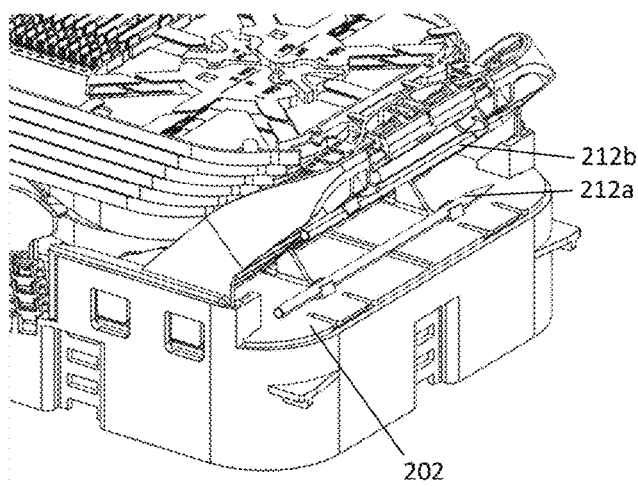
FIG. 14 is a partial rear perspective view of the assembly of FIG. 10.
Figure 15:
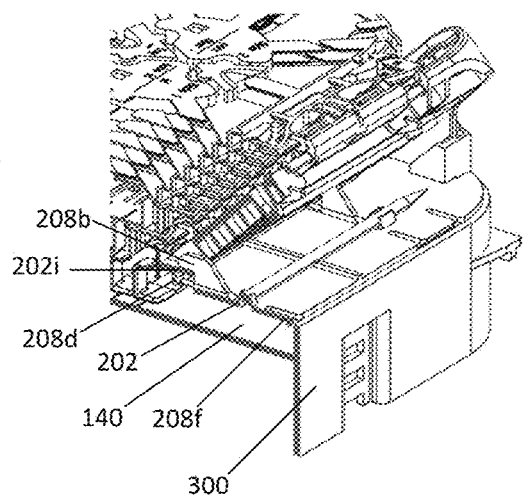
FIG. 15 is a partial cross-sectional perspective view of the assembly of FIG. 10.
Figure 16:
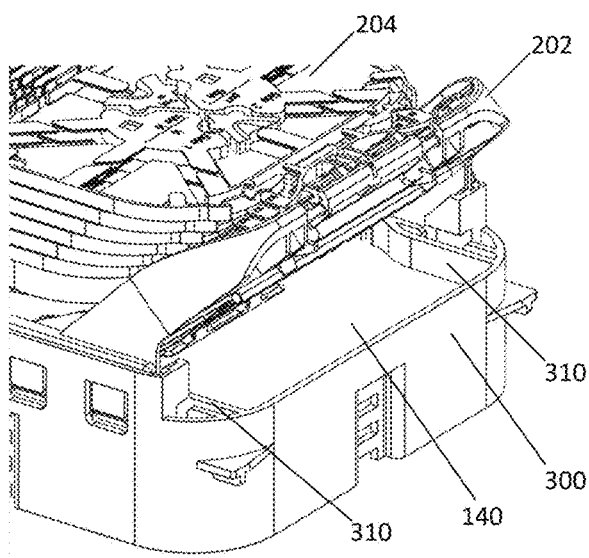
FIG. 16 is a partial rear perspective view of the assembly of FIG. 10 with a cover support part removed.

The internal portion 120 includes in the upper region 122, a cable fixation portion 126 and a fiber management portion 128 positioned distally from the cable fixation portion 126. The internal portion 120 also includes in the lower region 124 a cable fixation portion 130 and a fiber management portion 132 positioned distally from the cable fixation portion 130. The cable fixation portions 126 and 130 are generally vertically aligned. The fiber management portions 128 and 132 are generally vertically aligned. As shown at FIG. 13, connector plates 143, which are snap-fit onto the main body 130, provide for a fixation point for the drop cables.

The lower fiber management portion 132 is partially defined by a horizontal downward facing surface 302a of a panel 302 and a sidewall 304 of the base 300, together forming a basket 139. The basket 139 of the lower fiber management portion 132 can serve as a storage area for looped fiber from the feeder cables or branch cables. The looped fiber can be in the form of loose fibers, loose fibers protected in groups by tubes or sheaths, fiber ribbons, etc. Fibers can be guided from the lower fiber management portion 132 to the upper fiber management portion at oppositely positioned channels 180 defined along the sides 108, 110 of the organizer 100. The fibers passing through the channels 180 can be secured with fixation devices 182. Once at the upper fiber management portions, the fiber can be further managed, e.g., with splices, connectors and adapters, splitters, wave division multiplexors, etc.

The upper fiber management portion 128 can also include one or more banks 150 of fiber optic adapters 152. In the example shown, the banks 150 are supported within a subtray 142 removably mounted within the main body 300. The adapters 152 can be used to optically connect connectorized drop cables 50 having connectors 52 with connectorized fibers having connectors 56 terminating the fibers. In this example, two banks 150 of adapters 152 are arranged side by side parallel to the transverse axis 106. In other examples, zero or two banks of adapters can be provided aligned with one another parallel to the transverse axis 106. Where adapters are not longitudinally aligned with entering cables, non-connectorized drop cables can be fixed in the upper cable fixation portion 126 and their fibers managed in the upper fiber management portion 128. Thus, the upper region of the organizer 100 can accommodate connectorized drop cables, non-connectorized drop cables, or a combination of connectorized and non-connectorized drop cables. Other cable types and configurations can also be accommodated and managed at the cable fixation portion 126. In alternative examples, the adapters, or non-functional receptacles that behave like one-sided adapters, can serve as parking or storage for the connectors 52 or the connectors 56 until an active fiber optic connection is needed. The connectors can be any suitable form factor, such as, but not limited to, one or more of LC form factor, SC form factor, and MPO form factor connectors. An example subtray 142 and fiber optic banks 150 having features suitable for use with organizer 100 are described in, e.g., U.S. Provisional Patent Application 63/005,907 filed Apr. 6, 2020, the content of which application is fully incorporated herein by reference in its entirety.

The upper cable fixation portion 126 and the lower cable fixation portion 130 are separated by a wall 320 of the base 300. The wall 320 includes an upward facing horizontal surface 320b and a downward facing horizontal surface 320a. The surfaces 320b and 320c can support cable fixation assemblies. Example cable fixation assemblies are described in, e.g., International PCT Patent Application No. PCT/US2020/14634 filed Jan. 22, 2020 and U.S. Provisional Patent Application No. 62/972,864, filed Feb. 11, 2020, the contents of which applications are fully incorporated herein by reference in their entireties.

Positioned proximally of the cable fixation portions 126 and 130 is a seal region 160 (FIG. 46) of the organizer 100. The seal region 160 includes a plurality of dividers 162 and 164 in the upper region 122 and the lower region 124, respectively, of the organizer 100. The dividers 162 define openings 166 through which connectorized drop cables 50 or non-connectorized drop cables enter the closure. The dividers 164 define openings 173 through which feeder cables, branch cables or the like enter the closure. In the space between rows of dividers there are placed seal blocks 174. The seal blocks 174 form seals around the cables entering the closure. The seal blocks 174 also serve to seal off the proximal opening of the closure defined between the housing pieces of the closure.

Figure 3:
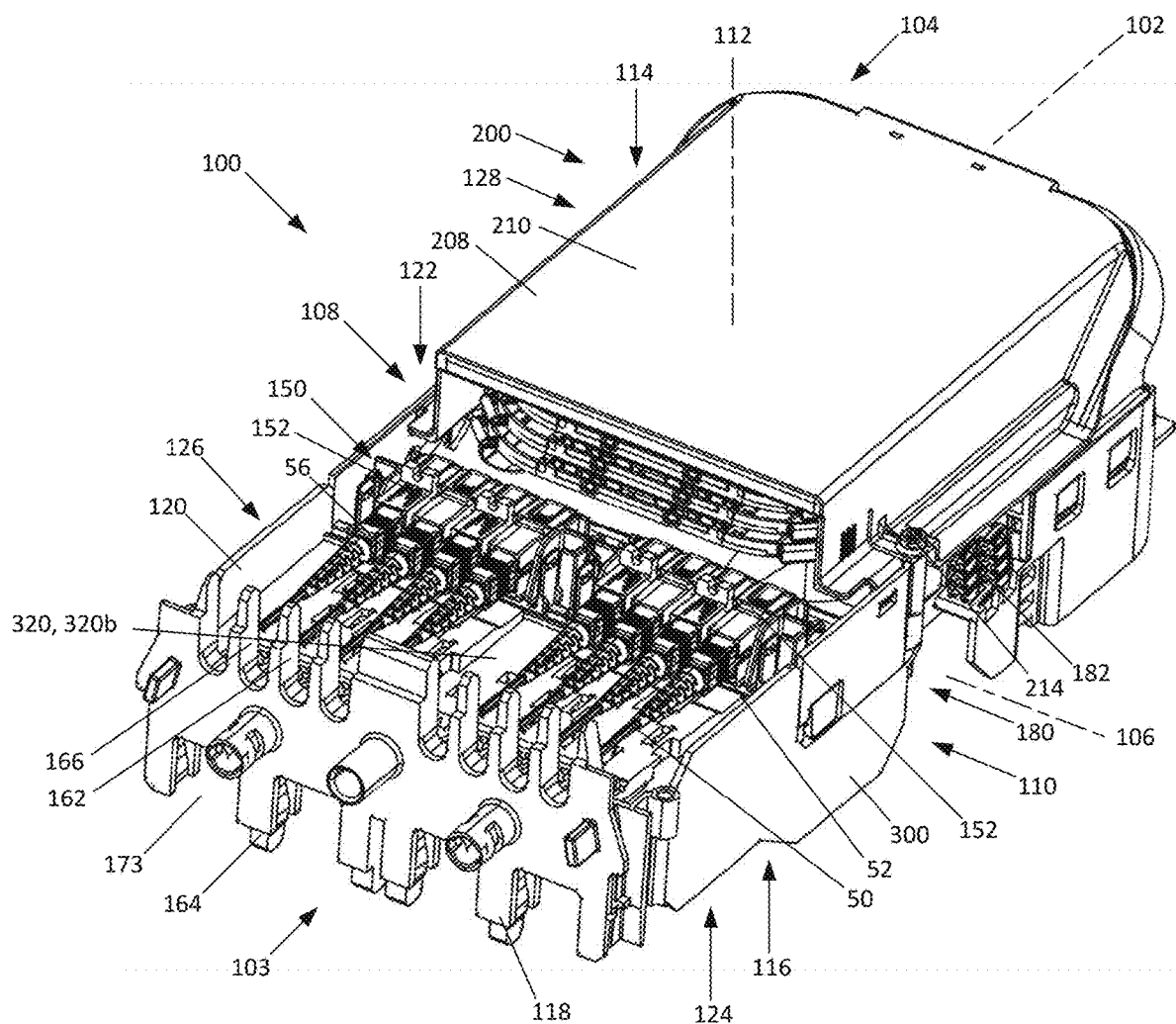
FIG. 3 is a perspective view of an assembly of an optical fiber management organizer according to the present disclosure.
Figure 3A:
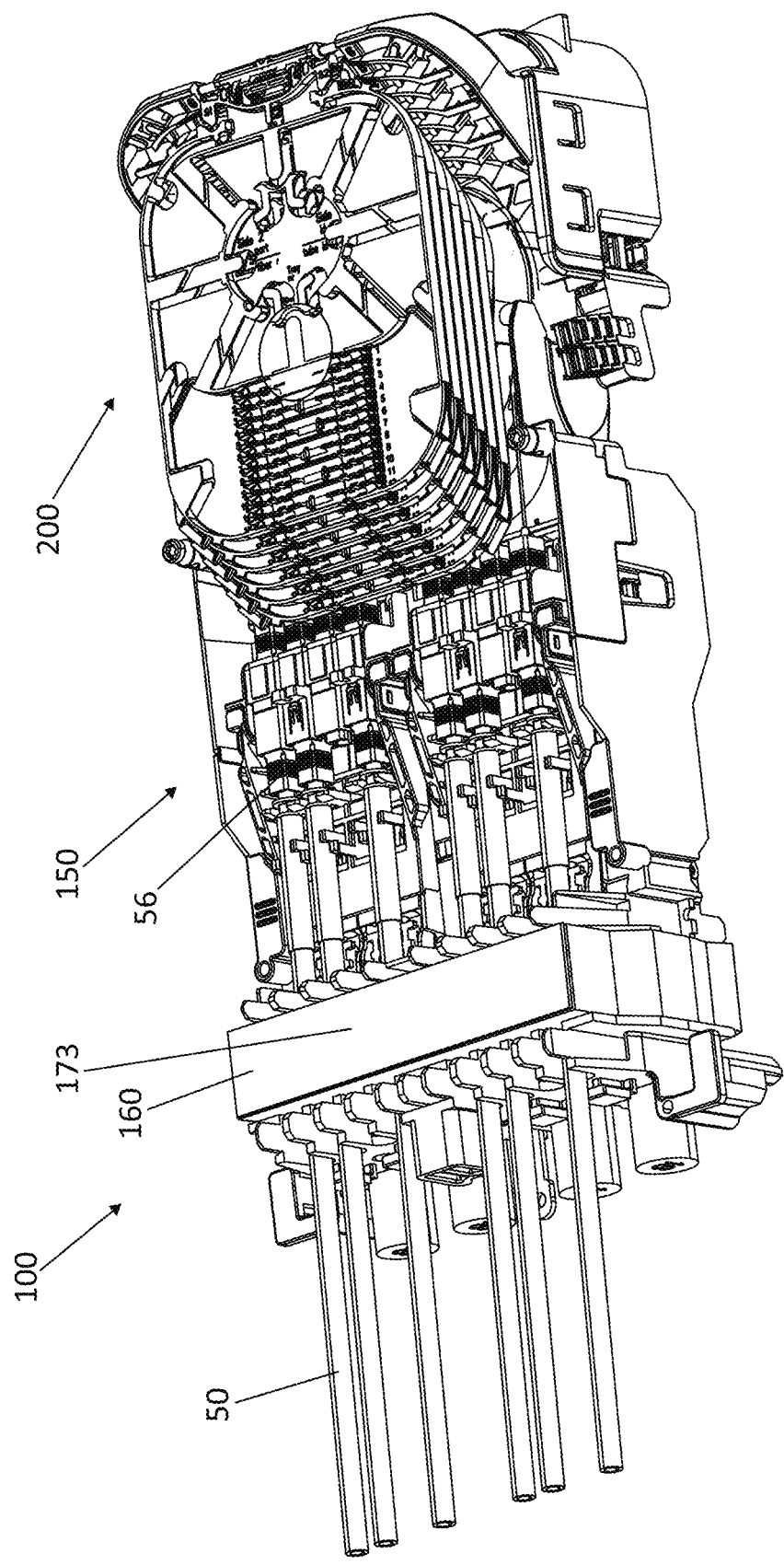
FIG. 3A is a perspective view of the assembly of FIG. 3 showing additional installed cables and features.
Figure 4:
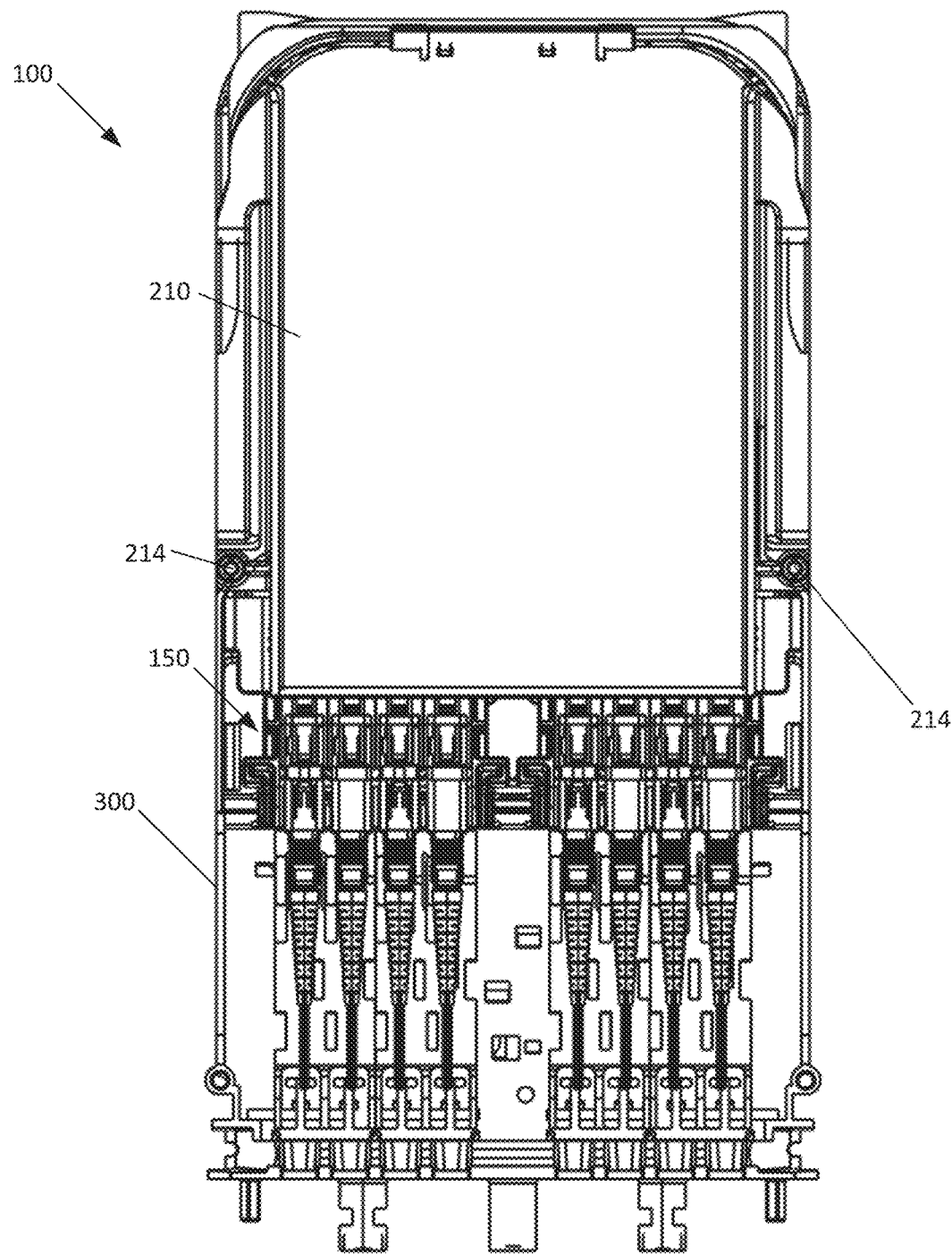
FIG. 4 is a top view of the assembly of FIG. 3.
Figure 5:
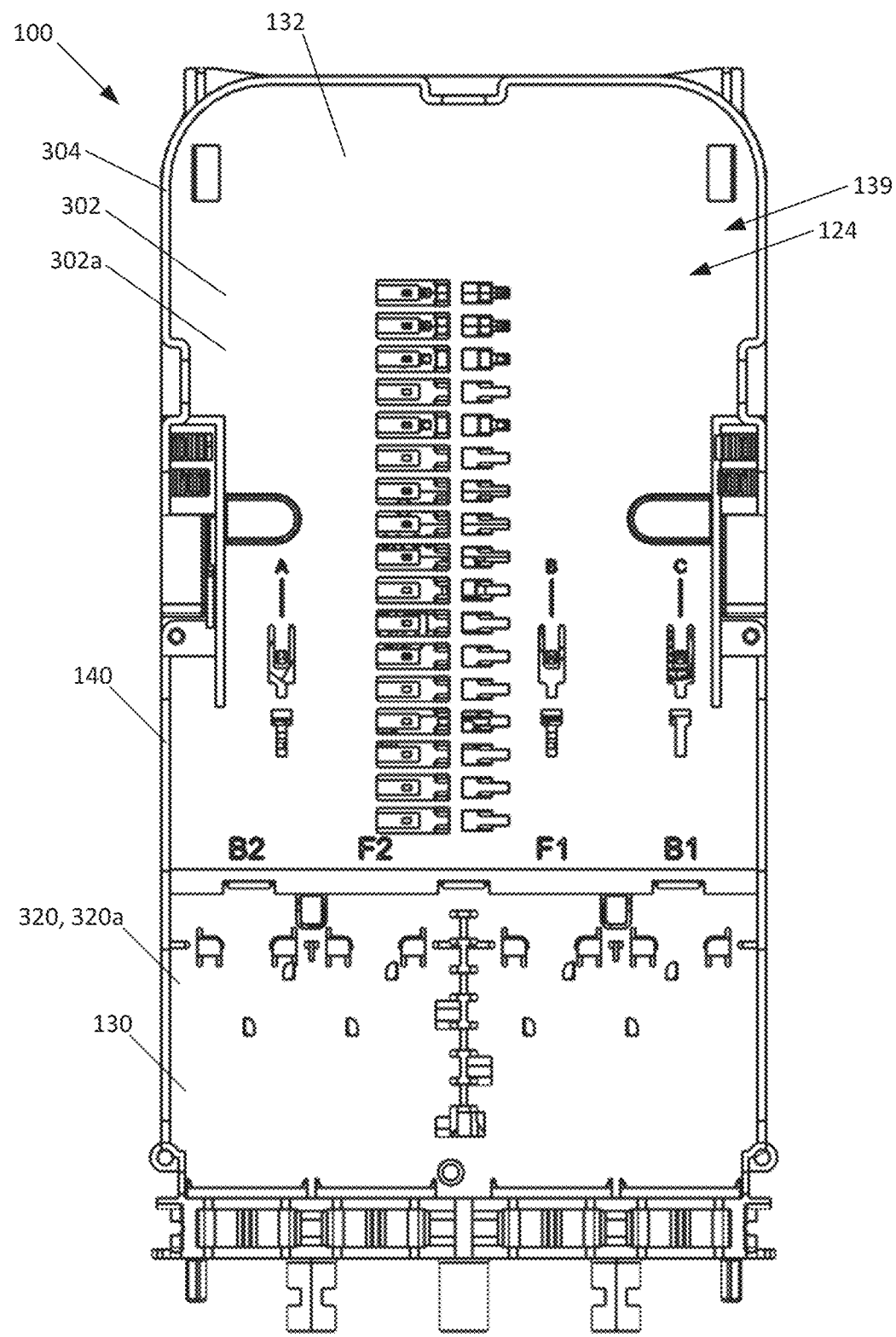
FIG. 5 is a bottom side view of the assembly of FIG. 3.
Figure 6:
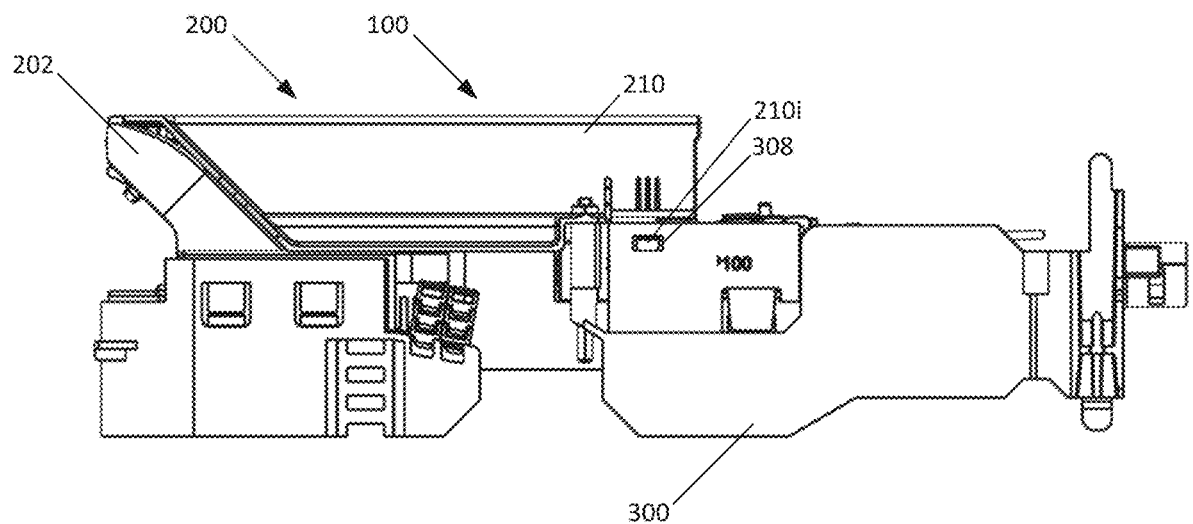
FIG. 6 is a first side view of the assembly of FIG. 3.
Figure 7:
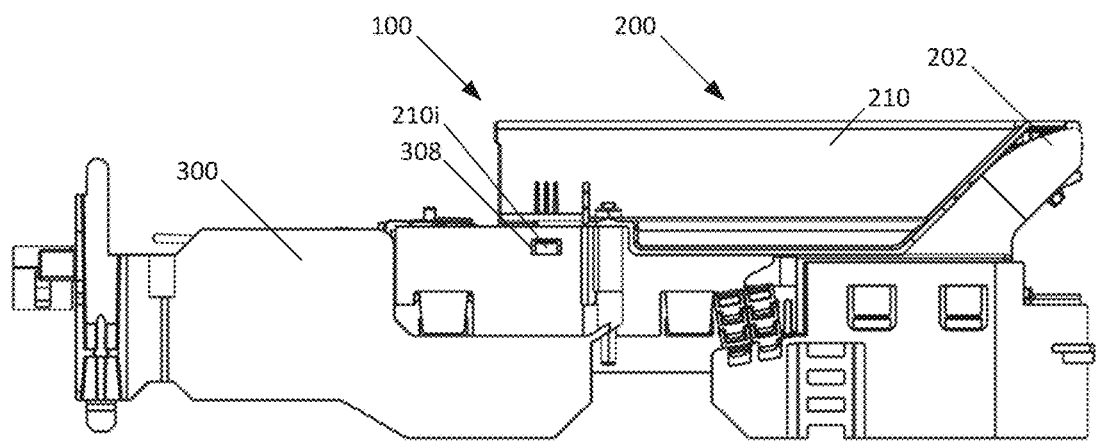
FIG. 7 is a second side view of the assembly of FIG. 3.
Figure 8:
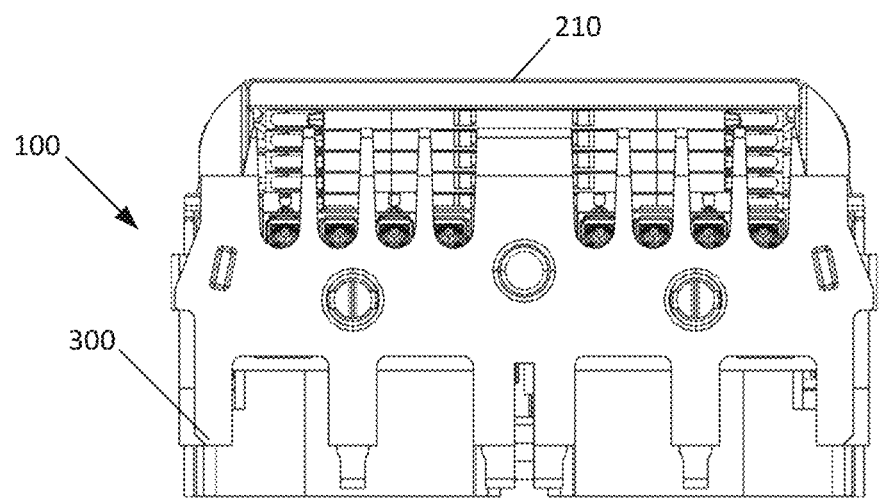
FIG. 8 is a front view of the assembly of FIG. 3.
Figure 9:
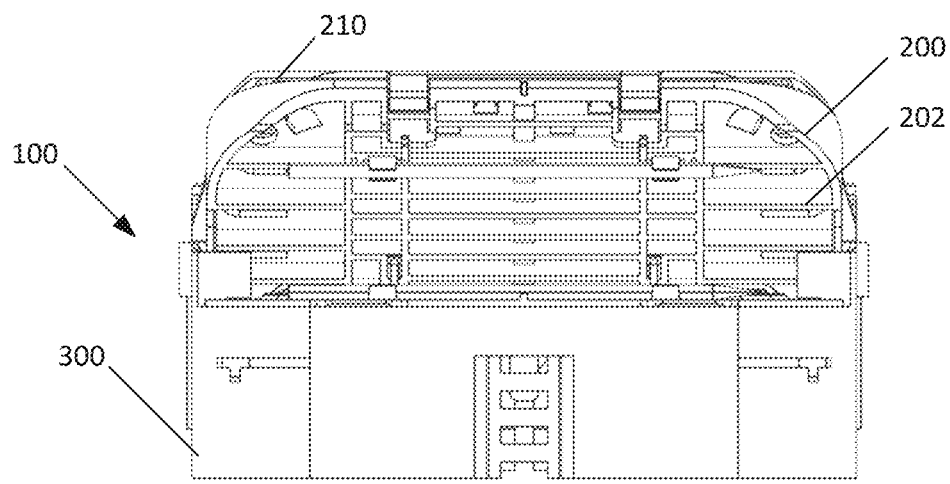
FIG. 9 is a rear view of the assembly of FIG. 3.
Figure 10:
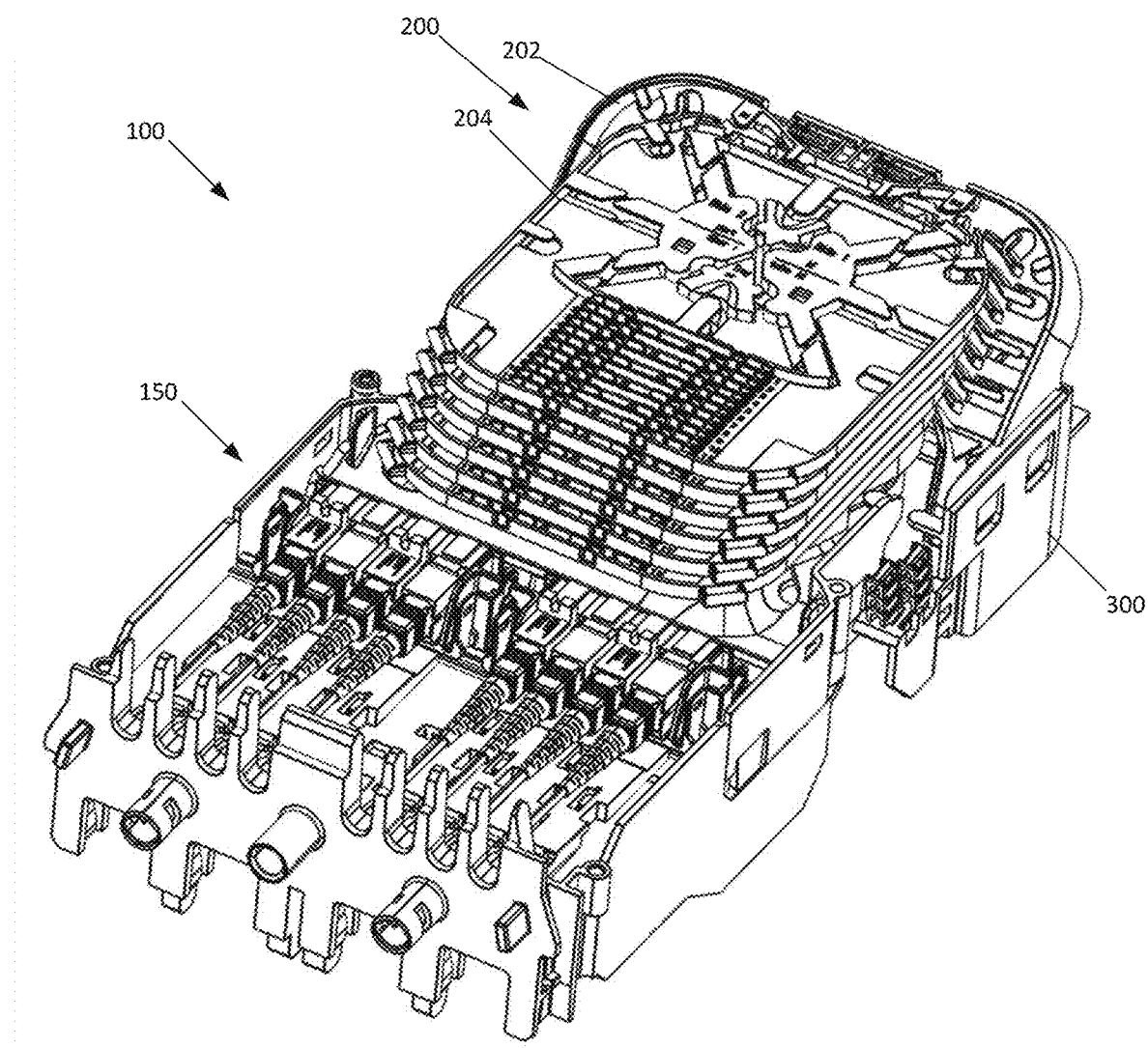
FIG. 10 is a perspective view of the assembly of FIG. 3, with a demarcation tray removed.

In one aspect, the base 300 forms a cable management area 140 defined by the upper surface 302b of the wall 302, the sidewall 304, and the subtray 142. The base 300 can be further provided with attachment features 308 for receiving and retaining the subtray 142 and various other cable management components 144, such as cable support guides 144a and splice holder 144b, having corresponding attachment features. See FIG. 3A. Examples of attachment features 308 suitable for use with interconnecting the base 300, subtray 142, and cable management components 144 are shown and described in, e.g., International PCT Patent Application No. PCT/US2019/028245 filed Apr. 19, 2019, the content of which application is fully incorporated herein by reference in its entirety. To aid in guiding cables passing between the lower region 38 and the upper region 122 and the lower region 124, stackable cable guides 145 can be provided and mounted to the base main body 300.

Tray Assembly 200

The organizer 100 includes a tray assembly 200 mounted to the base 300. The tray assembly 200 can include a tower 202, a plurality of trays 204 pivotally attached to the tower 202, a cover support part 208 supporting and securing the tower 202 to the base 300, and a tray assembly cover 210 also pivotally attached to the tower 202.

In the example shown, two lower trays 204a are provided and six upper trays 204b are provided. In one aspect, the lower trays 204a have a greater depth than the upper trays 204b and are configured as cable loop storage trays. The upper trays 204b are configured as splice trays. The trays 204 can be configured as any other type of telecommunications tray. Also, more or fewer lower and/or upper trays 204 may be provided, depending upon a particular application. Other examples of suitable trays 204 for use with the organizer 100 and connectable to the tower 202 are shown and described in, e.g., U.S. Provisional Patent Application 62/972,919 filed Feb. 18, 2020, the content of which application is fully incorporated herein by reference in its entirety.

In one aspect, the tower 202 is configured to connect to the main body 300 with a snap-fit type connection. The tower 202 is shown in isolation at FIGS. 31 to 36. In one aspect, the tower 202 has a base portion 202a from which a tray support portion or wall 202b extends at an oblique angle from the axes 112 and 102 such that the tray support portion 202b extends in a direction away from the end 103 and towards the end 104. On the tray support portion 202b, a plurality of attachment features or anchor points 202c are provided to which the trays 204 can be pivotally connected in a hinged arrangement. In one aspect, each of the trays 204 is rotatable with respect to the tower 202 about an axis orthogonal to the longitudinal axis 102 of the organizer 100. As the anchor points 202c are arranged on the sloping tray support portion 202, the trays 204 are stacked upon each other in a staggered arrangement, as most easily viewed at FIGS. 10 to 13. Accordingly, the top-most tray 204 is located closer to the end 104 and farther away from the end 103, relative to the bottom-most tray 204. The tower 202 can be additionally provided with cable routing features, such as guide walls or ribs 202d and retaining tabs 202e arranged on either side of the anchor points 202c such that cables routed to and from the main body 300 can be guided and routed to the desired tray 204.

Figure 23:
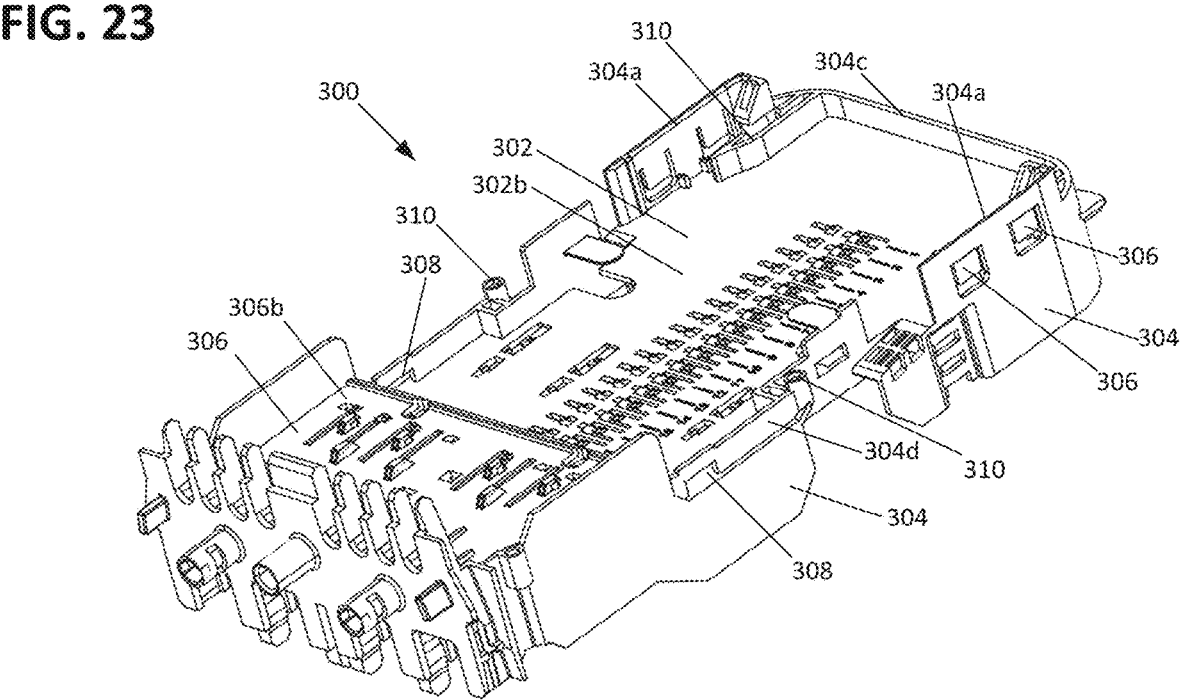
FIG. 23 is a perspective view of a base main body of the organizer of FIG. 3.
Figure 24:
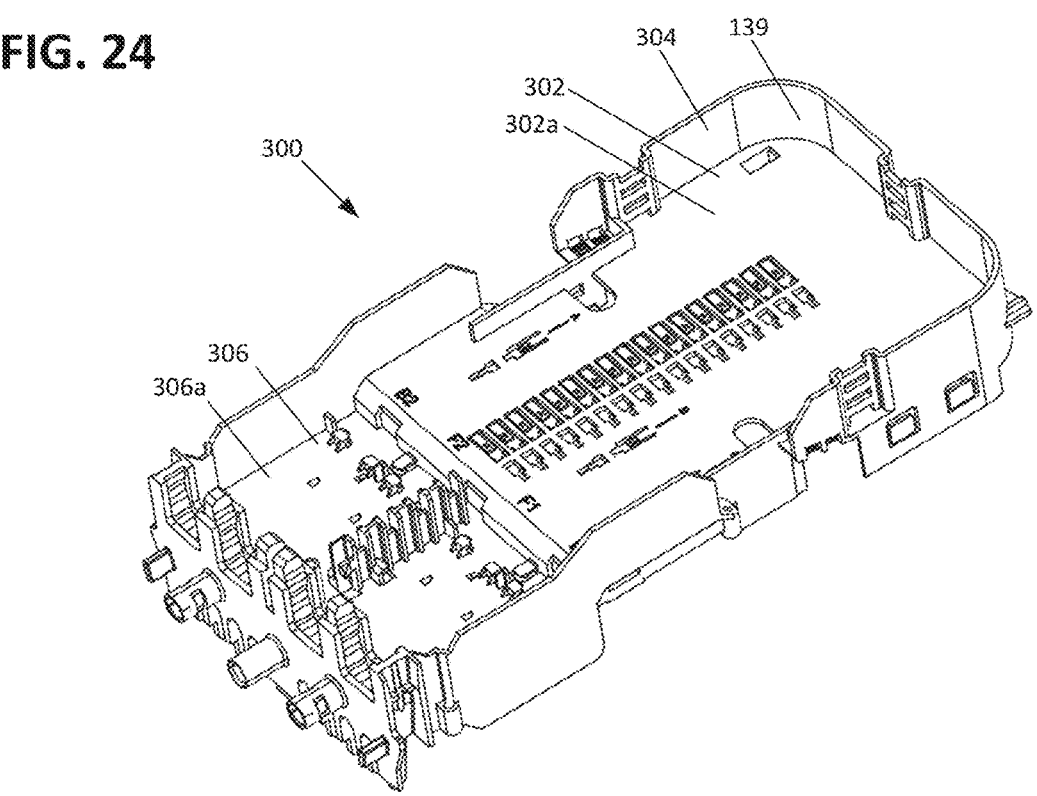
FIG. 24 is a bottom perspective view of the base main body of FIG. 23.
Figure 25:
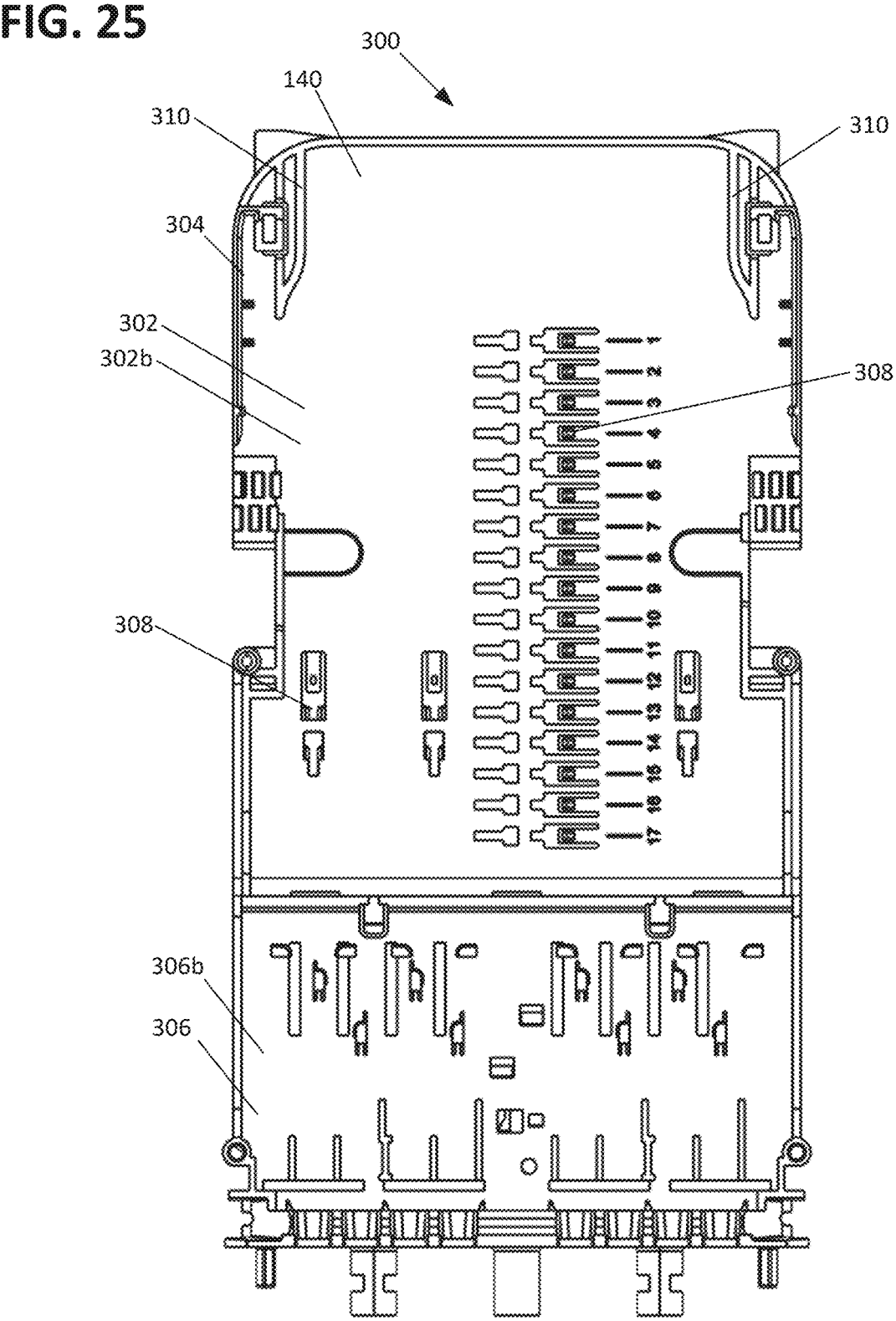
FIG. 25 is a top view of the base main body of FIG. 23.
Figure 26:
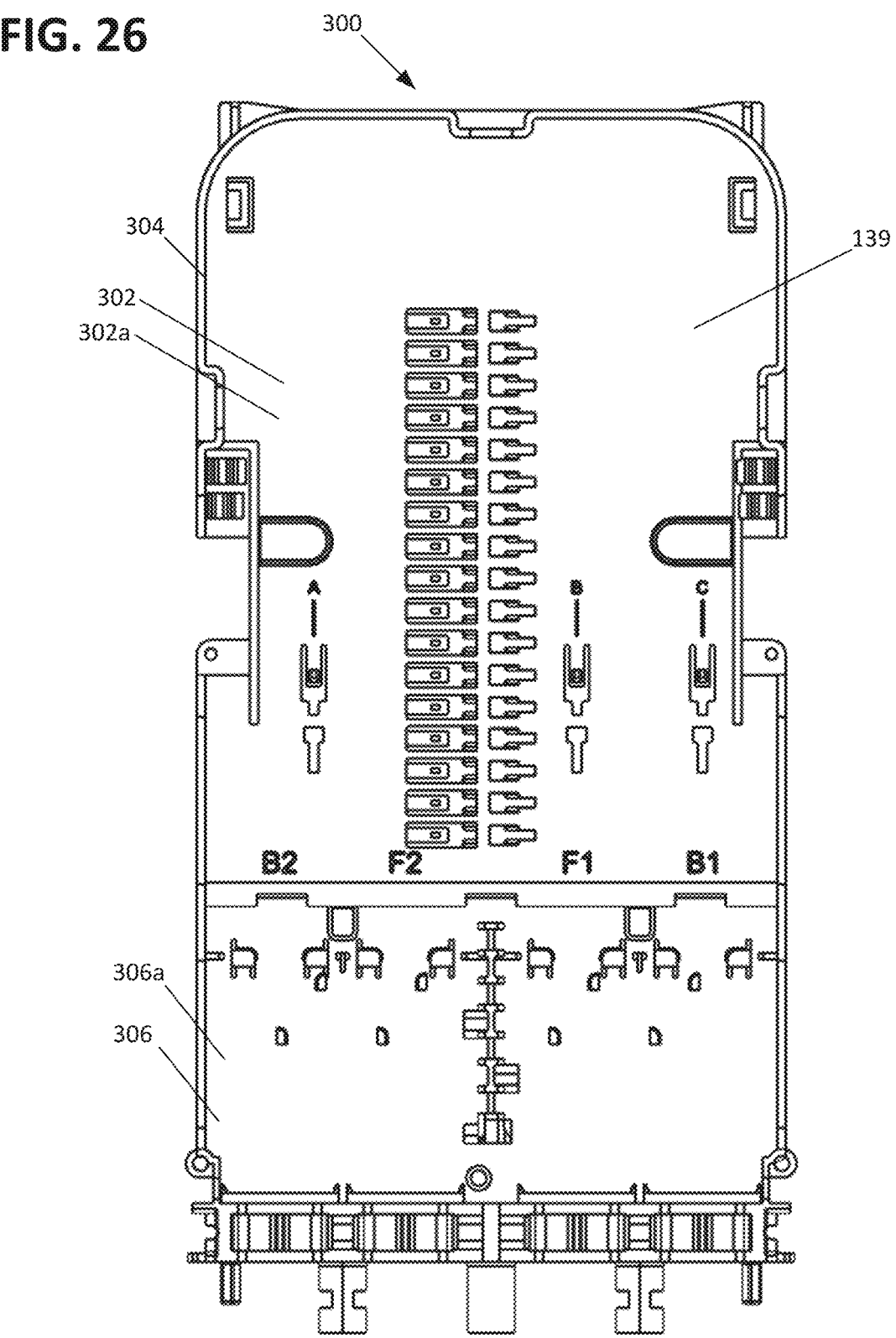
FIG. 26 is a bottom view of the base main body of FIG. 23.
Figure 27:
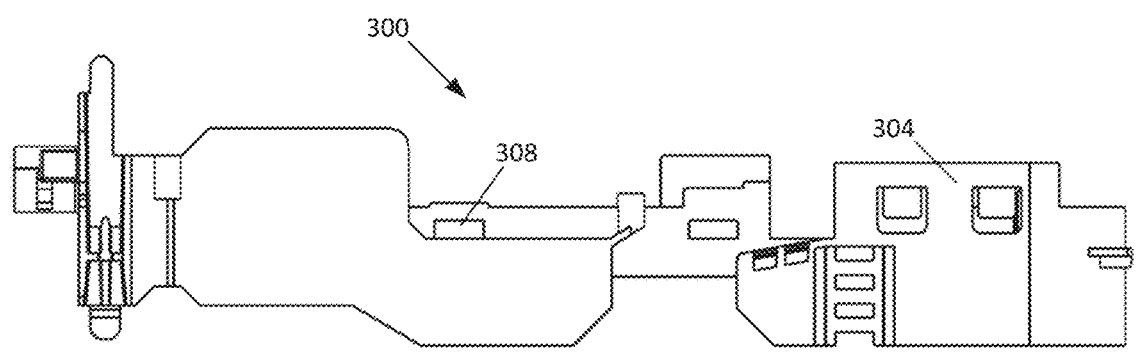
FIG. 27 is a first side view of the base main body of FIG. 23.
Figure 28:
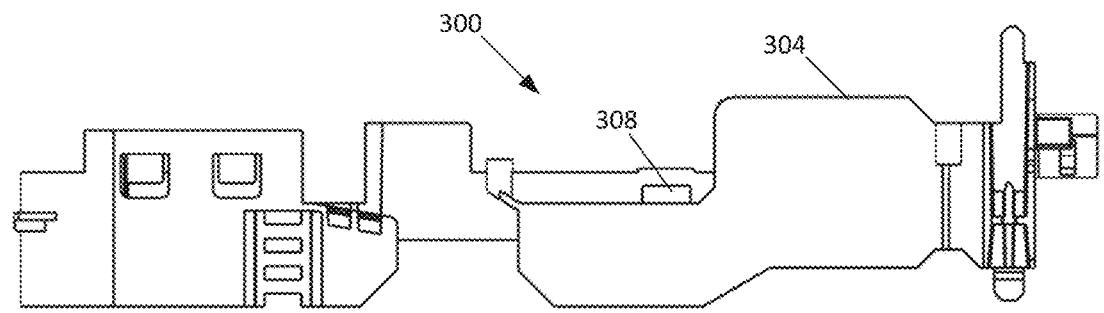
FIG. 28 is a second side view of the base main body of FIG. 23.
Figure 29:
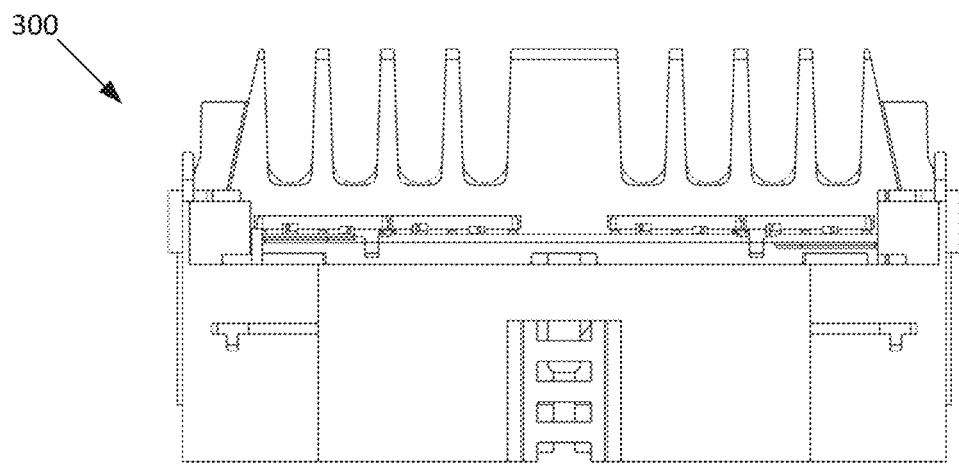
FIG. 29 is a front view of the base main body of FIG. 23.
Figure 30:
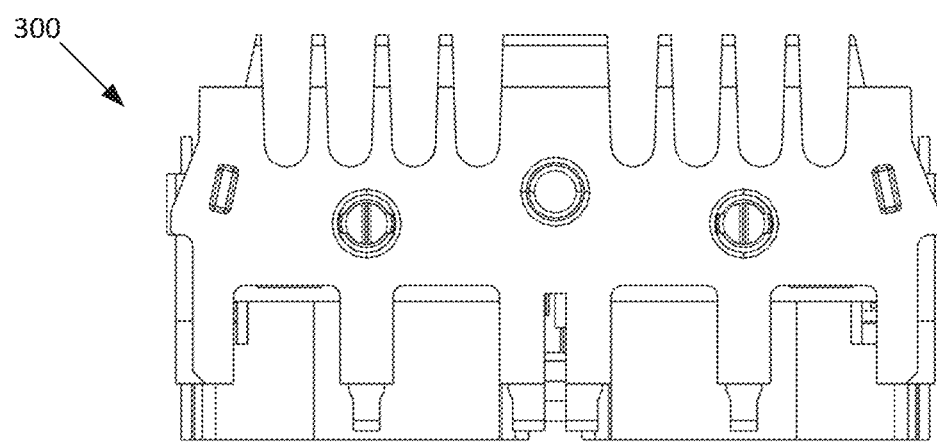
FIG. 30 is a rear view of the base main body of FIG. 23.
Figure 31:
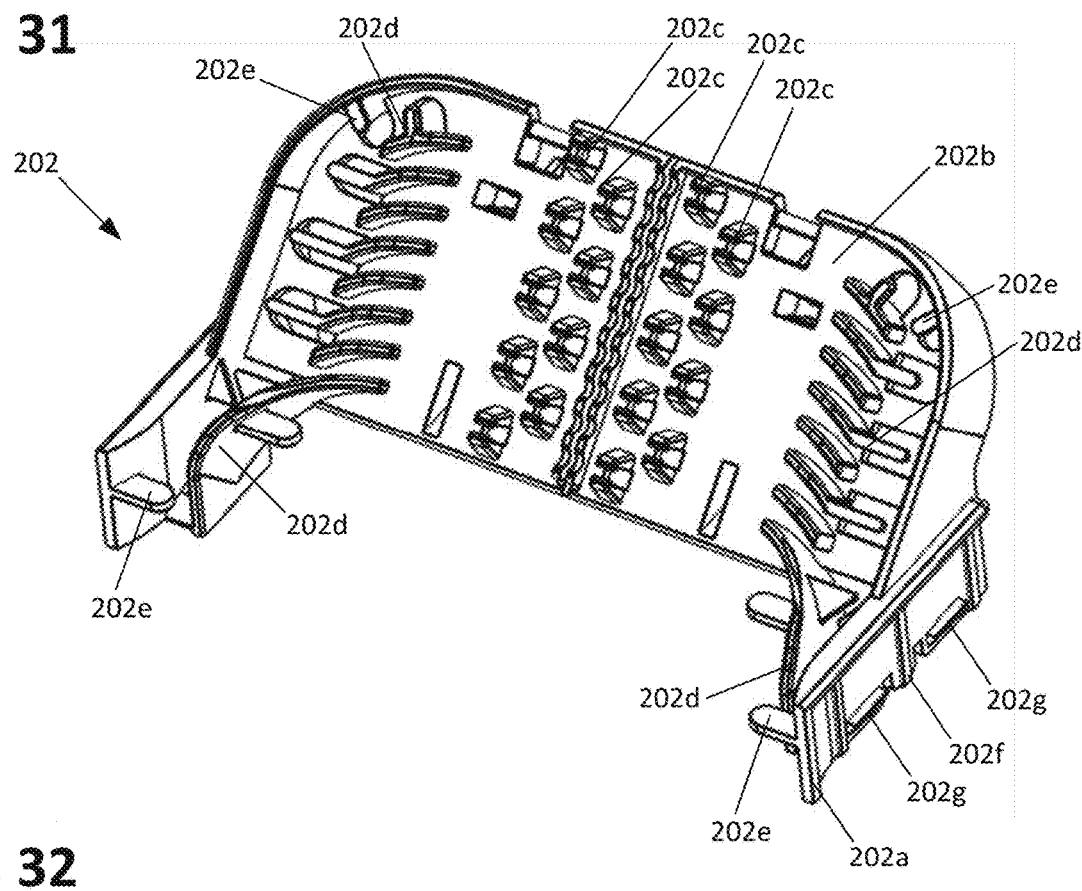
FIG. 31 is a top perspective view of a tower of the organizer of FIG. 3.
Figure 32:
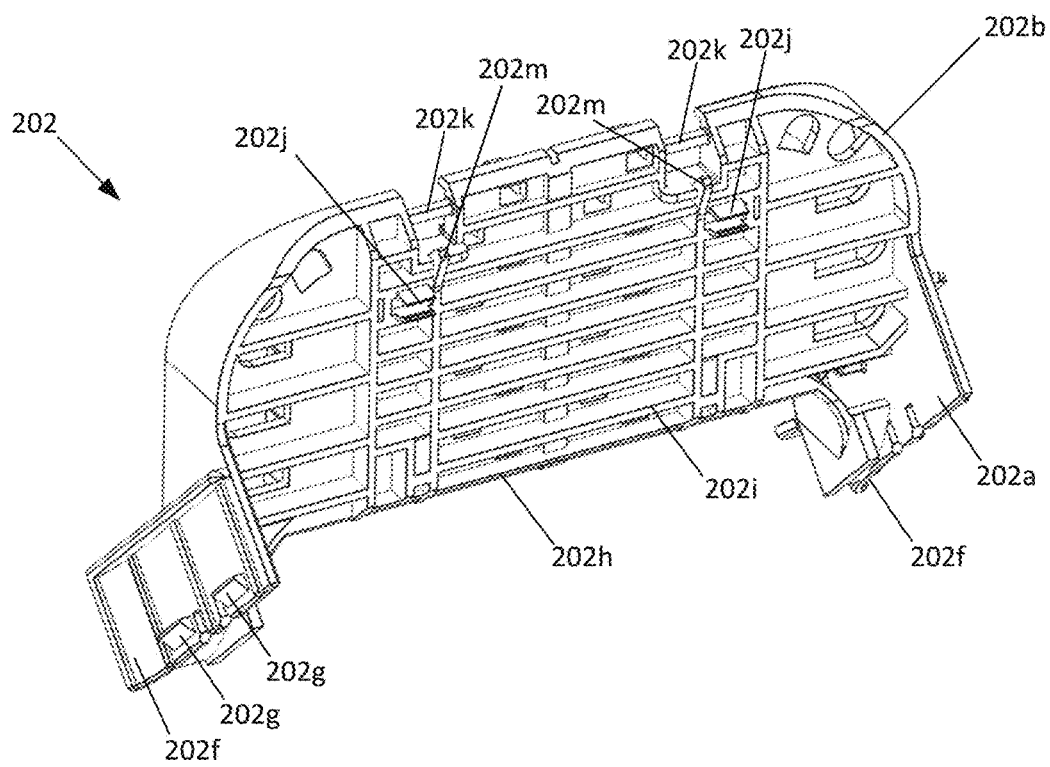
FIG. 32 is a bottom perspective view of the tower of FIG. 31.
Figure 33:
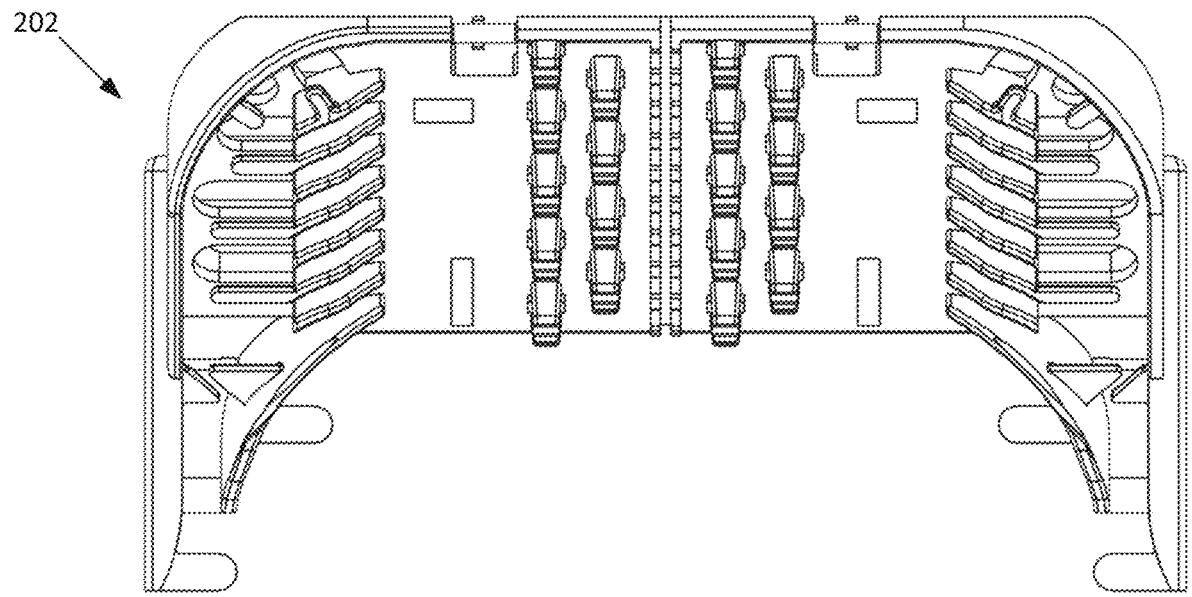
FIG. 33 is a top view of the tower of FIG. 31.
Figure 34:
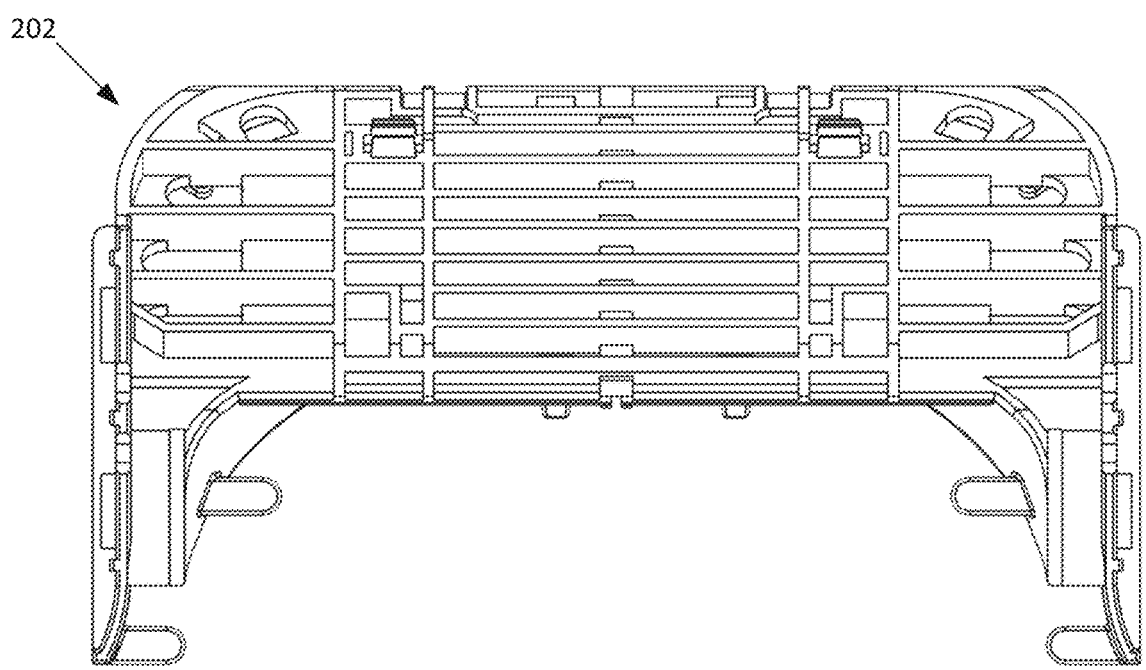
FIG. 34 is a bottom view of the tower of FIG. 31.
Figure 35:
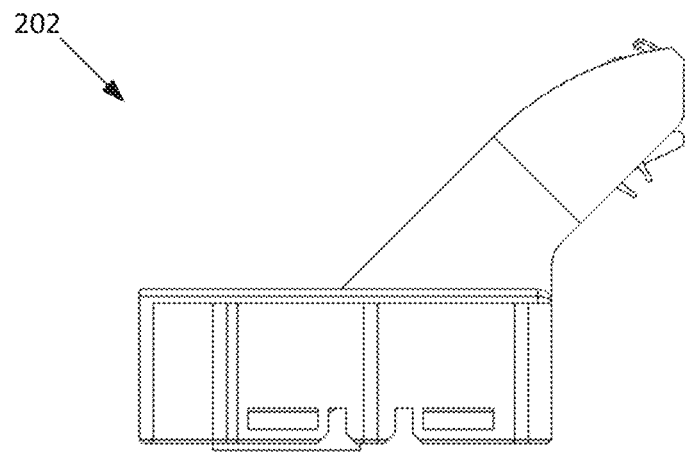
FIG. 35 is a first side view of the tower of FIG. 31.
Figure 36:
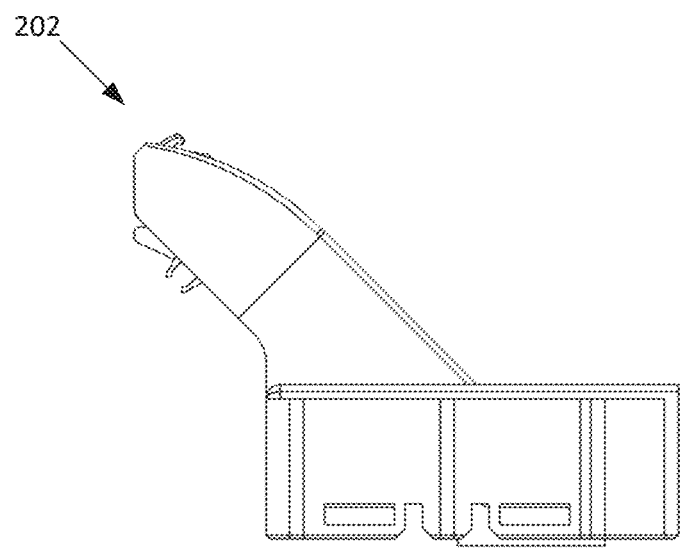
FIG. 36 is a second side view of the tower of FIG. 31.
Figure 37:
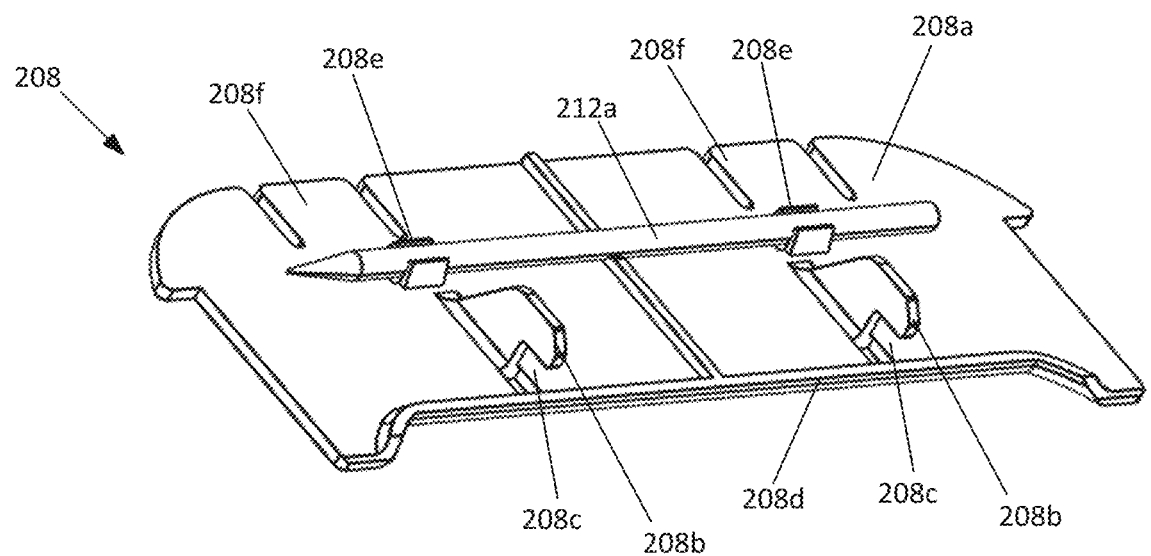
FIG. 37 is a top perspective view of a cover support part of the organizer of FIG. 3.
Figure 38:
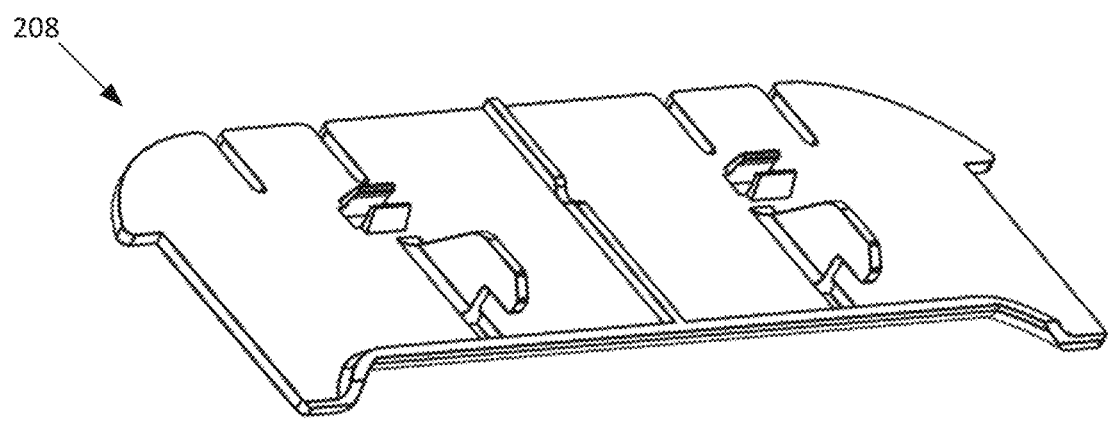
FIG. 38 is a bottom perspective view of the cover support part of FIG. 37.
Figure 39:
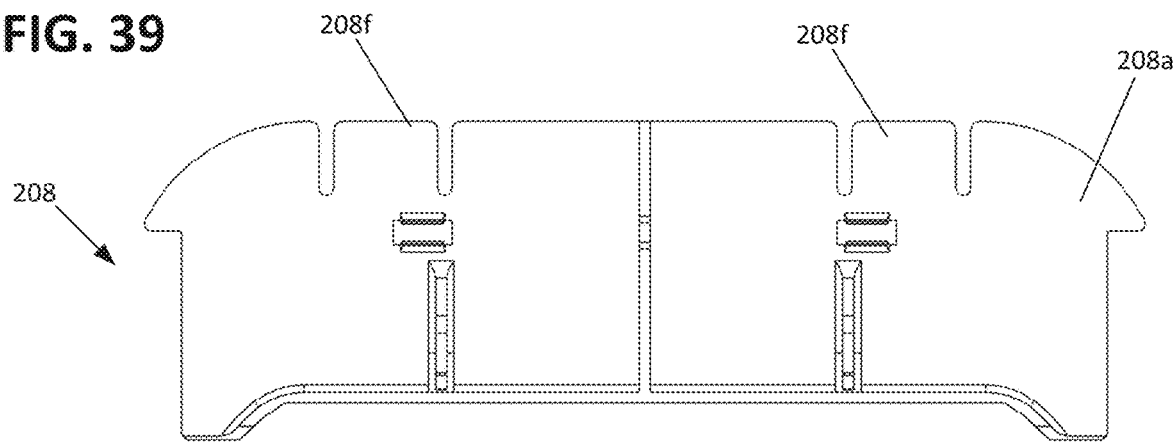
FIG. 39 is a top view of the cover support part of FIG. 37.
Figure 40:
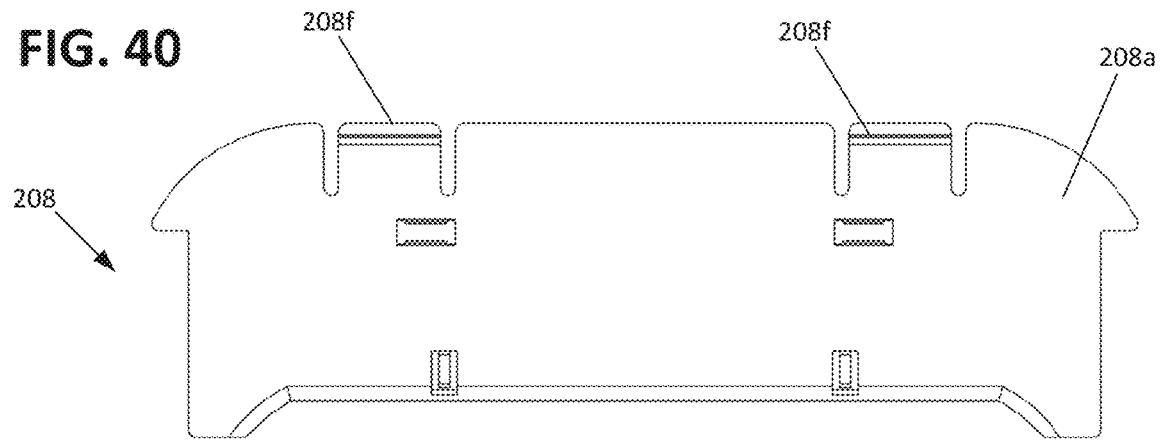
FIG. 40 is a bottom view of the cover support part of FIG. 37.
Figure 41:
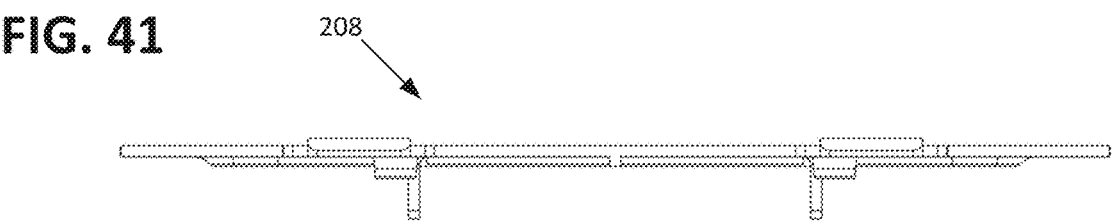
FIG. 41 is a front view of the cover support part of FIG. 37.
Figure 42:
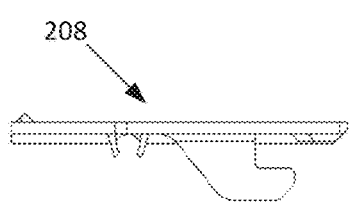
FIG. 42 is a side view of the cover support part of FIG. 37.
Figure 43:
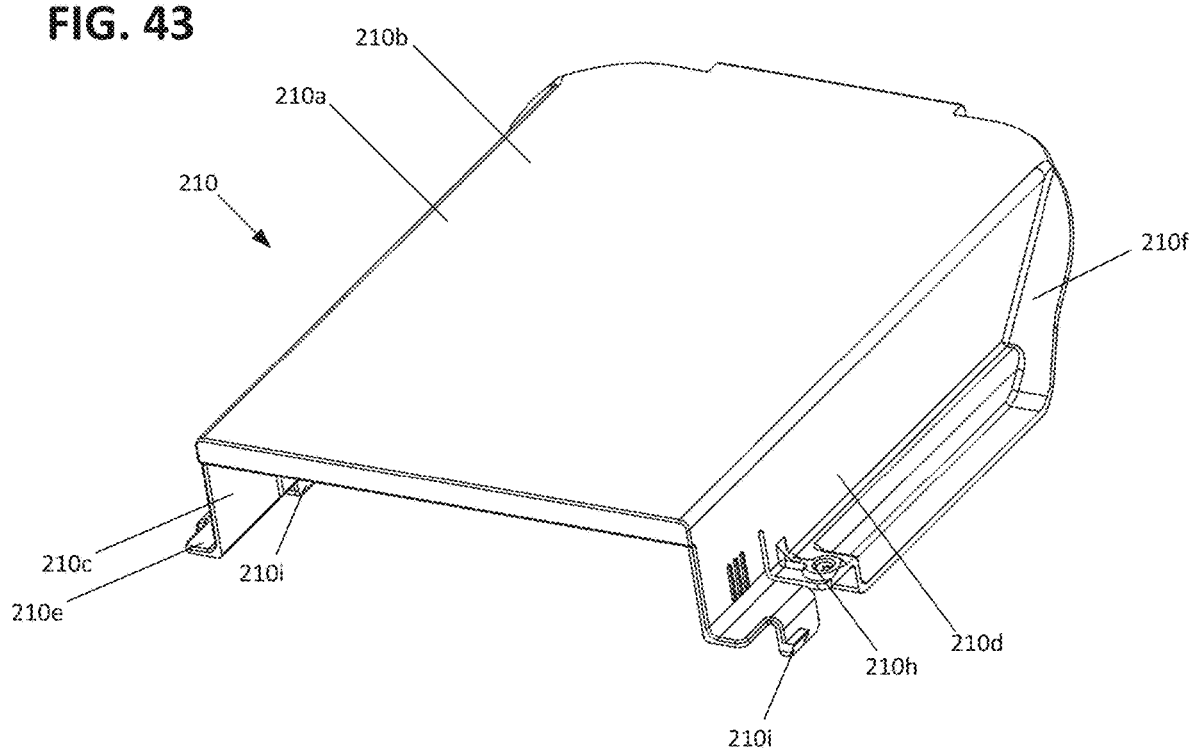
FIG. 43 is a top perspective view of a demarcation cover of the organizer of FIG. 3.
Figure 44:
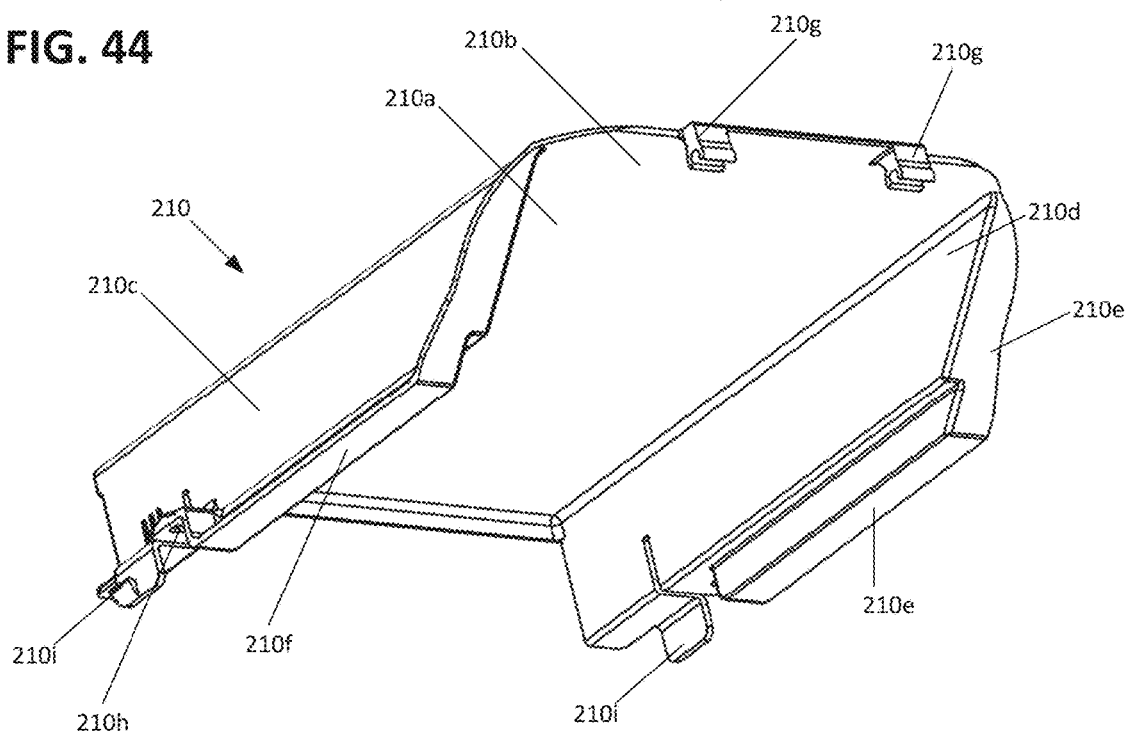
FIG. 44 is a bottom perspective view of the demarcation cover of FIG. 43.

In one aspect, the base portion 202a is formed by a pair of side walls 202f, each having a pair of latch members 202g. As can be seen at, for example, FIG. 23, the main body 304 has a pair of side portions 304a within which latch members 306 are provided for receiving the latch members 202g of the tower 200. With such an arrangement, the tower 202 can be snap-fit to the main body 300. In one aspect, one or both of the latch members 202g 306 can be configured as deflectable latch members. Once the tower 202 is connected to the main body 300, the ends of the sidewalls 202f are supported by the top surface 302b of the horizontal wall 302. The tower 202 is also shown as being provided with a pair of clip members or anchor points 202j for holding a pick tool 212b. The tower 202 is further shown as including a pair of attachment members 212k, shown as pins or rods 212k, for receiving corresponding attachment members of the cover 210.

As assembled, the tower 202 is only supported by the main body 300 at each side wall 202e of the tower. This configuration is advantageous in that internal walls or similar support structures within the central portion of the storage cable management area 140 can be avoided, thereby allowing for greater storage capacity and flexibility with stored loops of cable in the cable management area 140. However, as the tower supports the weight of the trays 204, significant stress can be exerted on the side walls 202e and the connections between the latch members 202g/306.

To more fully support the tower 202, a cover support part 208 can be provided. The cover part 208 is shown in isolation at FIGS. 27 to 42. The cover part 208 is provided with a main wall or body 208a from which a pair of attachment members 208b extend orthogonally. Each of the attachment features 208b is provided with a notch 208c. A lip portion or flange 208d also extends from the main wall 208a along a side proximate the attachment features 208b. The cover part 208 is also shown as including a pair of attachment features 208e for retaining a pick 212 in a snap-fit type manner.

As most easily seen at FIGS. 14 to 22, which show various views of the organizer 100, the cover support part 208 rests against and is supported on the underneath side by a pair of vertical support wall structures 310 extending from the panel 302. Once installed, the cover support part 208 extends beneath the tower 202 and supports the tower 202 along its width between the side walls 202e. In particular, the flange 208d of the cover support part 208 extends below and supports a wall structure 202h of the tower 202. While in this position, as most easily seen at FIG. 15, the attachment members 208b extend over a wall structure 202i of the tower 202 such that the notch 208c receives the wall structure 202i. Accordingly, the attachment members 208b and the flange 208d form an effective clip or clamp that secures the cover support part 208 to the tower 202. Once the cover support part 208 has been sufficiently clipped onto the tower 202, deflectable latch members 208f of the support part snap against an end segment 304c of the sidewall 304c to secure the cover support part 208 to the base 300. The interconnections between the cover support part 208 and the base 300, between the cover support part 208 and the tower 202, and between the tower 202 and the base 300 result in a robust assembly in which the tower 202 is fully supported and locked to the base 300. Simultaneously, the tower 200 itself and the cover support part 208 operate to partially enclose the cable management area 140 such that the cables can be more easily contained within the cable management area 140. Through the use of such an arrangement, the cable management area 140 is enlarged to occupy the space or volume within the base 300 and below the tower 200, thereby resulting in the cable management area 140 being as large as possible.

As previously discussed, the organizer 100 is provided with a demarcation cover 210. As shown, the demarcation cover 210 is provided with a main body 210a defining a top wall 210b, a pair of side walls 210c, 210d extending from the top wall 210b, a pair of sloped flange walls 210e, 210f extending at an oblique angle from the top wall 210b and orthogonally from the side walls 210c, 210d, a pair of attachment members 210g for connecting to the tower 202, a pair of apertures 210h for receiving locking fasteners 214, and a pair of deflectable latch members 210i for securing the cover 210 to the base 300 via apertures 308 in a segment 304d of the base sidewall 304.

With reference to FIGS. 17 to 22, the demarcation cover 210 is shown as being attached to the tower 202, via a snap-fit connection between the members 210g and 210k, and rotatable between closed and open positions.

Figure 17:
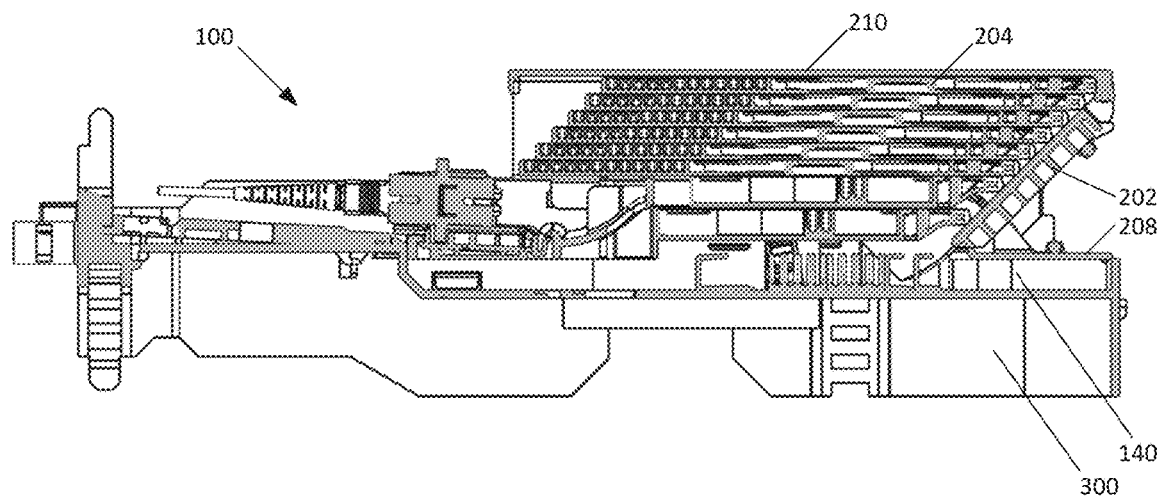
FIG. 17 is a cross-sectional side view of the assembly of FIG. 3.
Figure 18:
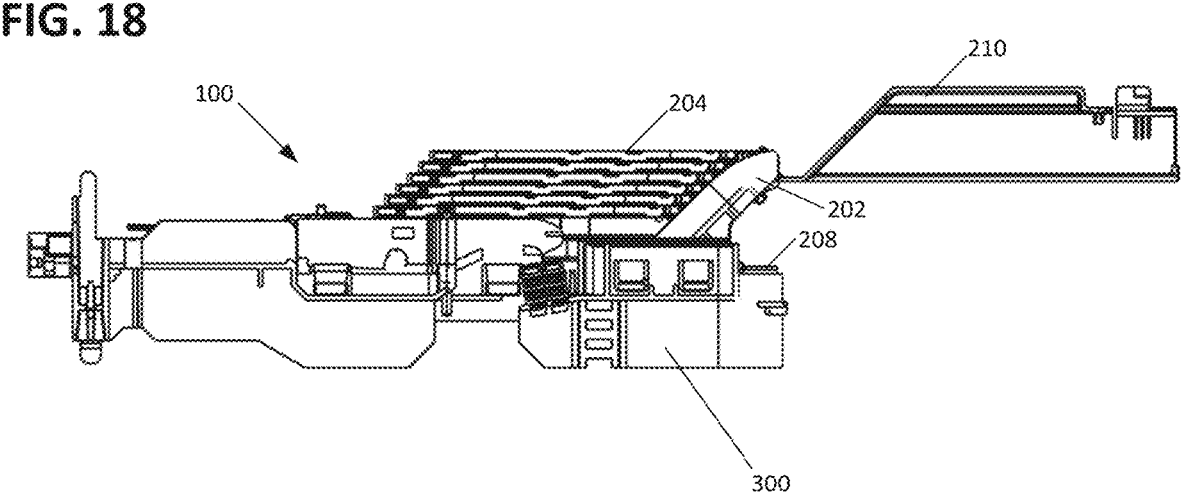
FIG. 18 is a side view of the assembly of FIG. 3, with a demarcation cover placed in an open position.
Figure 19:
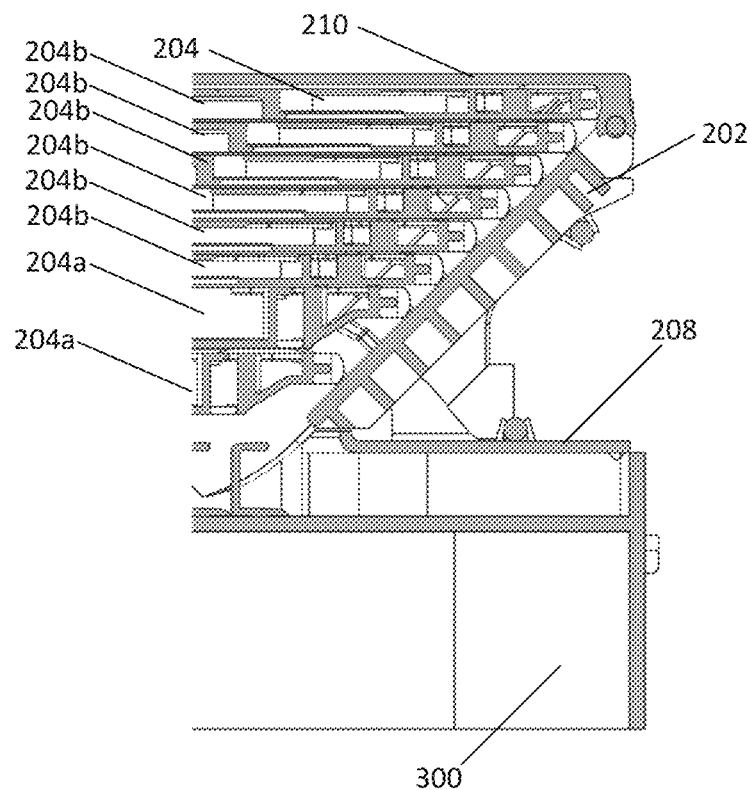
FIG. 19 is a partial cross-sectional side view of the assembly of FIG. 17.
Figure 20:
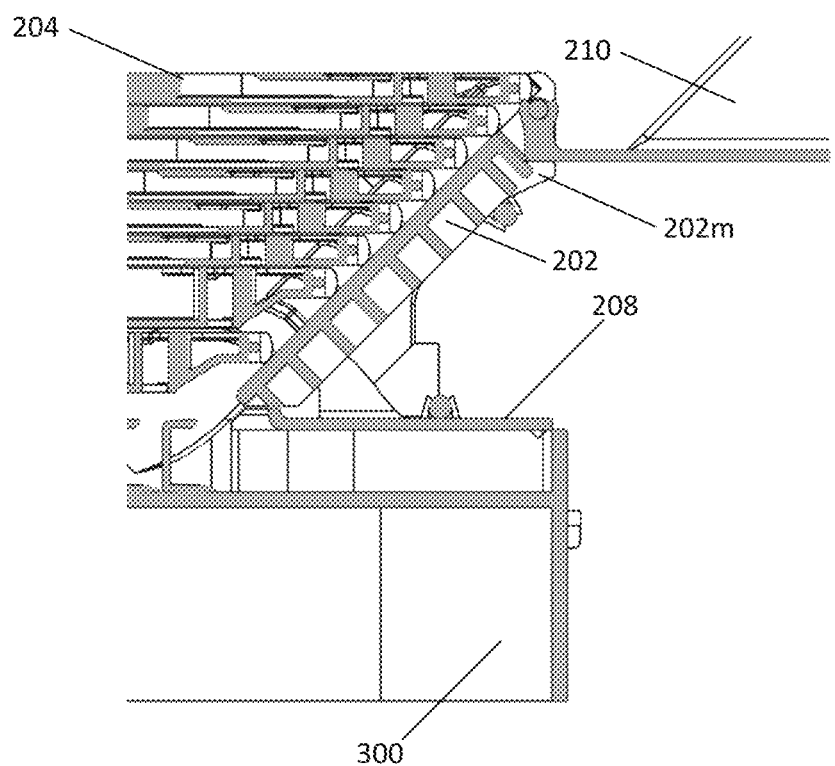
FIG. 20 is a partial cross-sectional side view of the assembly of FIG. 18.

In the closed position, as shown at FIGS. 17 and 19 the demarcation cover top wall 210b entirely covers the topmost tray 204 of the tray assembly with the side walls 210c, 210d extending downwardly along the sides of the trays 204. In this position, the deflectable latch members 210i are engaged within the apertures 308 in the base 300 such that the cover is generally retained in the closed position. To additionally secure the cover 210 in the closed position, locking fasteners 214 can be provided which extend through the apertures 210h in the cover 210 and into threaded openings 310 in the base 300. Where additional security is desired, the locking fasteners 214 can be provided with a keyed interface such that the fasteners cannot be removed without a similarly keyed tool. By providing cover 210 with the tray assembly 200, the trays 204 are automatically retained in the closed position and prevented from rotating with respect to the tower 202 when the cover 210 is moved to the closed position. Thus, additional locking components for the trays are avoided. In one aspect, the cover 210, when in the closed position, covers the trays 204 but does not cover the fiber optic adapters 152. Accordingly, another advantage of the cover 210, is that operator access to the trays 204 is prevented while still allowing access to the fiber optic adapters 152. Such an arrangement is advantageous where it is desired to provided limited access to an operator to perform some functions involving the fiber optic adapters, while ensuring that unnecessary access to the trays 204 is prevented.

In the open position of the cover 210, as shown at FIGS. 18 and 20 to 22, the demarcation cover 210 is rotated generally about 180 degrees from the closed position about a hinge axis defined by the interface between the members 202k, 210g. At this point, the top wall 210c of the cover 210 rests against support members 202m of the tower 202. In this position, the bottom side of the top wall 210c can be advantageously used as a tray or temporary work surface while an installer is working within the organizer 100.

Cable Routing

Figure 45:
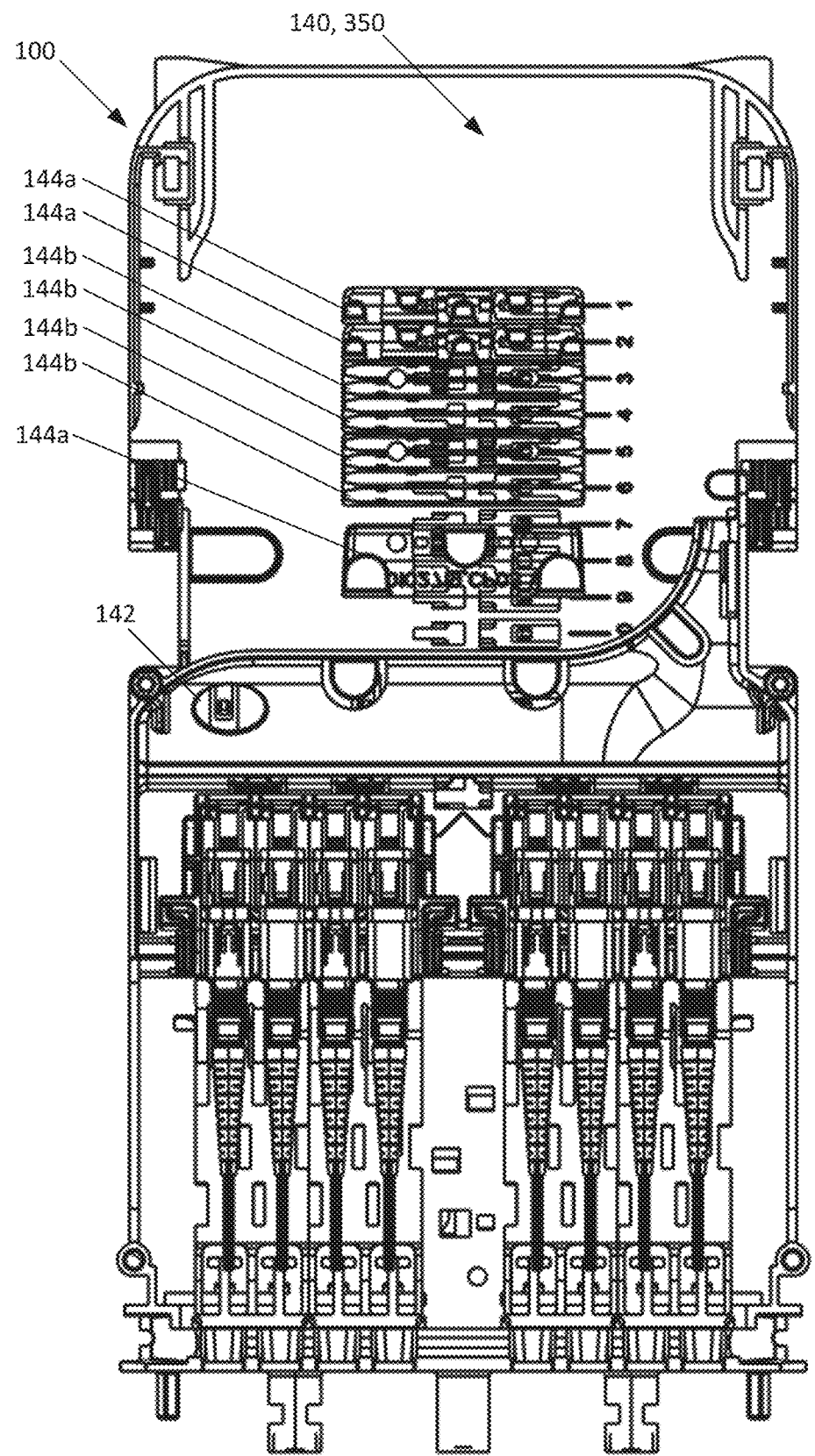
FIG. 45 is a top view of the organizer of FIG. 3 with components removed to show a first cable routing zone.

Referring to FIGS. 45 to 48, various components of the organizer 100 are removed to illustrate different fiber routing zones on the upper region 122 of the organizer 100. For example, FIG. 45 shows the organizer with the trays 204 and tower 202 removed such that a first zone 350 can be viewed. The first zone 350 generally corresponds to the previously described cable management area 140. Accordingly, the first zone 350 is defined by the panel 302, the sidewall 304, and the subtray 142. The first zone is further defined by the undersides of the tower 202 and the cover support part 208. As discussed previously for cable management area 140, the first zone 350 can include additional cable management components 144 (e.g. 144a, 144b) to aid in managing cables stored within the first zone 350.

Figure 46:
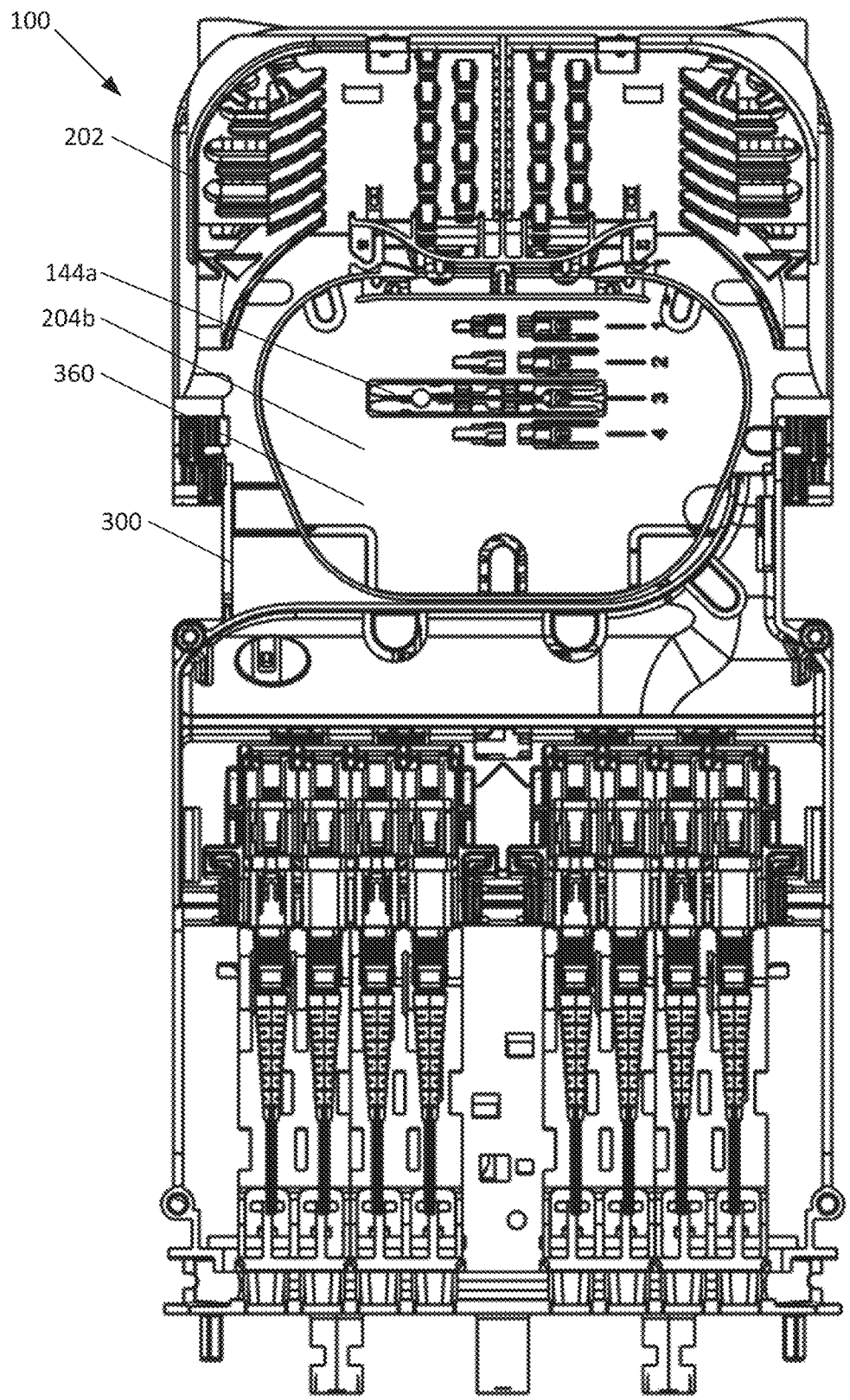
FIG. 46 is a top view of the organizer of FIG. 3 with components removed to show a second cable routing zone.

As shown at FIG. 46, a second zone 360 is shown which is defined by the lower-most tray 204b. The tray 204b shown at FIG. 46, can be provided with telecommunications components 144 to aid in managing cables stored within the tray 204b. As shown, the tray 204b is provided with attachment features similar to attachment features 308 for interconnecting with the telecommunications components. As shown, a cable support guide 144a is provided within tray 204b.

Figure 47:
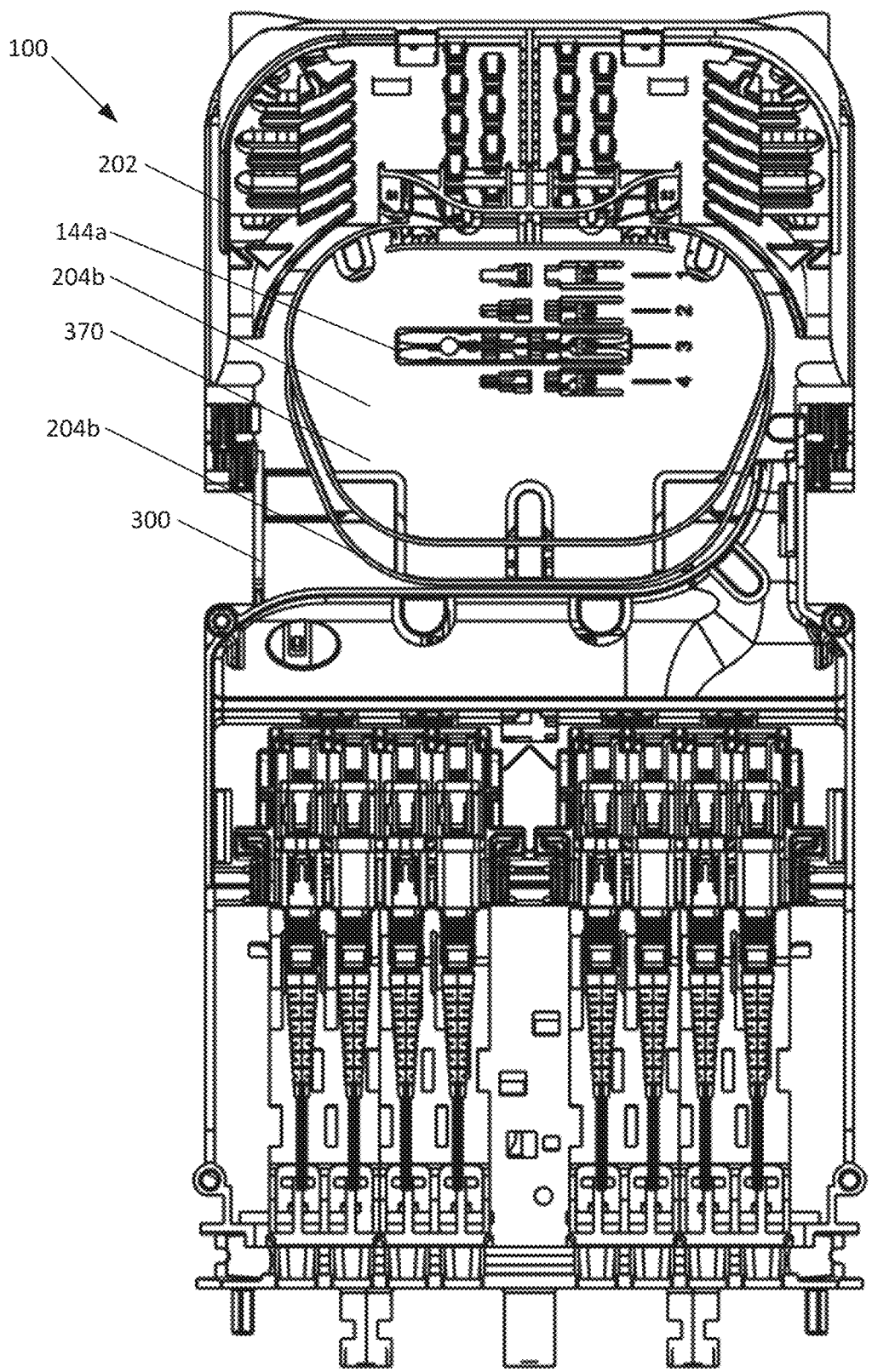
FIG. 47 is a top view of the organizer of FIG. 3 with components removed to show a third cable routing zone.

As shown at FIG. 47, a third zone 370 is shown which is defined by the tray 204b above the lower-most tray 204b. The tray 204b shown at FIG. 47, can be provided with telecommunications components 144 to aid in managing cables stored within the tray 204b. As shown, the tray 204b is provided with attachment features similar to attachment features 308 for interconnecting with the telecommunications components. As shown, a cable support guide 144a is provided within tray 204b.

Figure 48:
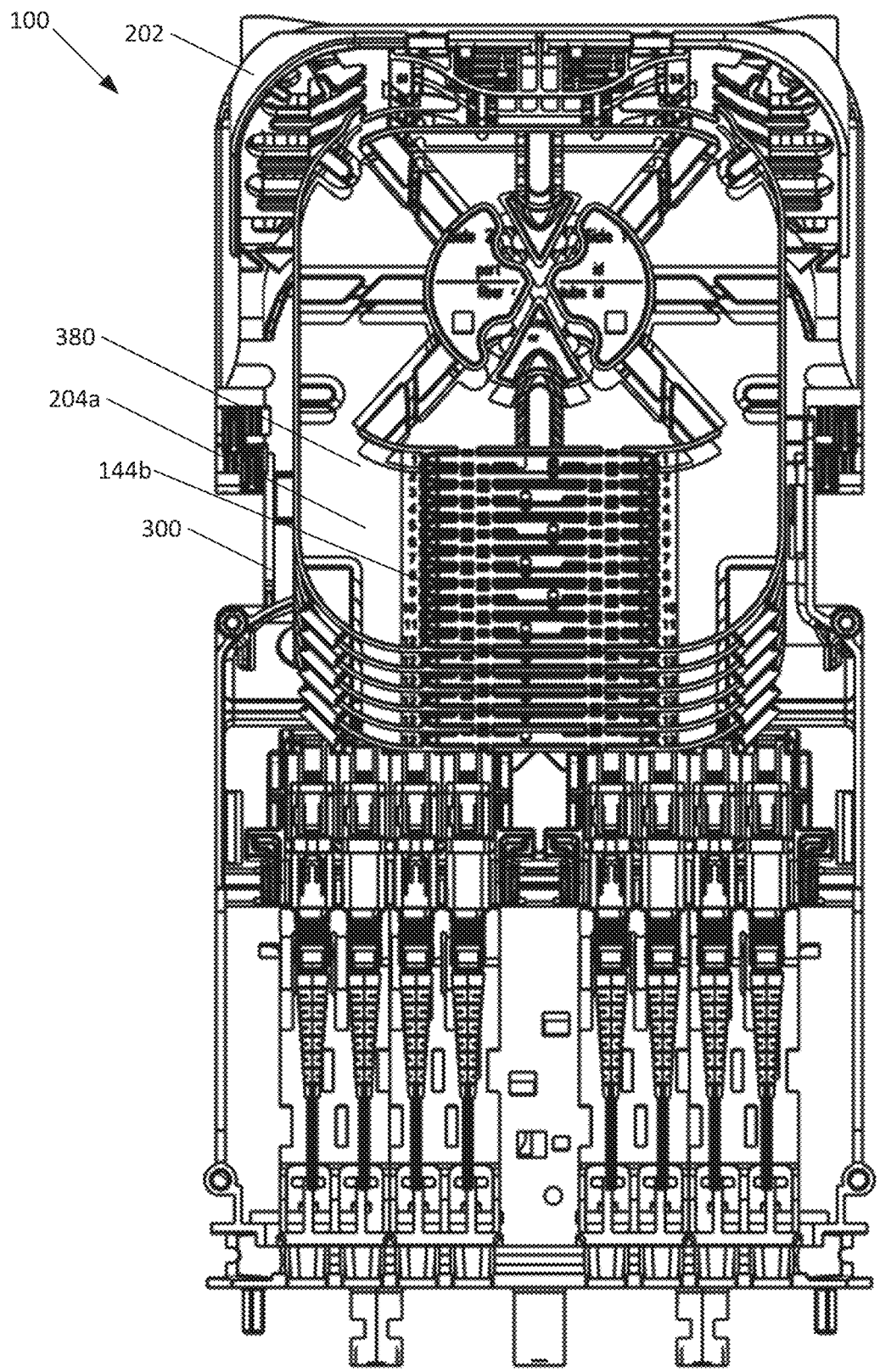
FIG. 48 is a top view of the organizer of FIG. 3 with components removed to show a fourth cable routing zone.

As shown at FIG. 48, a fourth zone 380 is shown which is defined by any of the upper trays 204a. The tray 204a shown at FIG. 47, can be provided with telecommunications components 144 to aid in managing cables stored within the tray 204a. As shown, the tray 204a is provided with attachment features similar to attachment features 308 for interconnecting with the telecommunications components. As shown, splice holders 144b are provided within tray 204a.

As discussed previously, the tower is provided with cable routing features 202d, 202e to facilitate and manage the routing of cables between the above-described zones.

Figure 49:
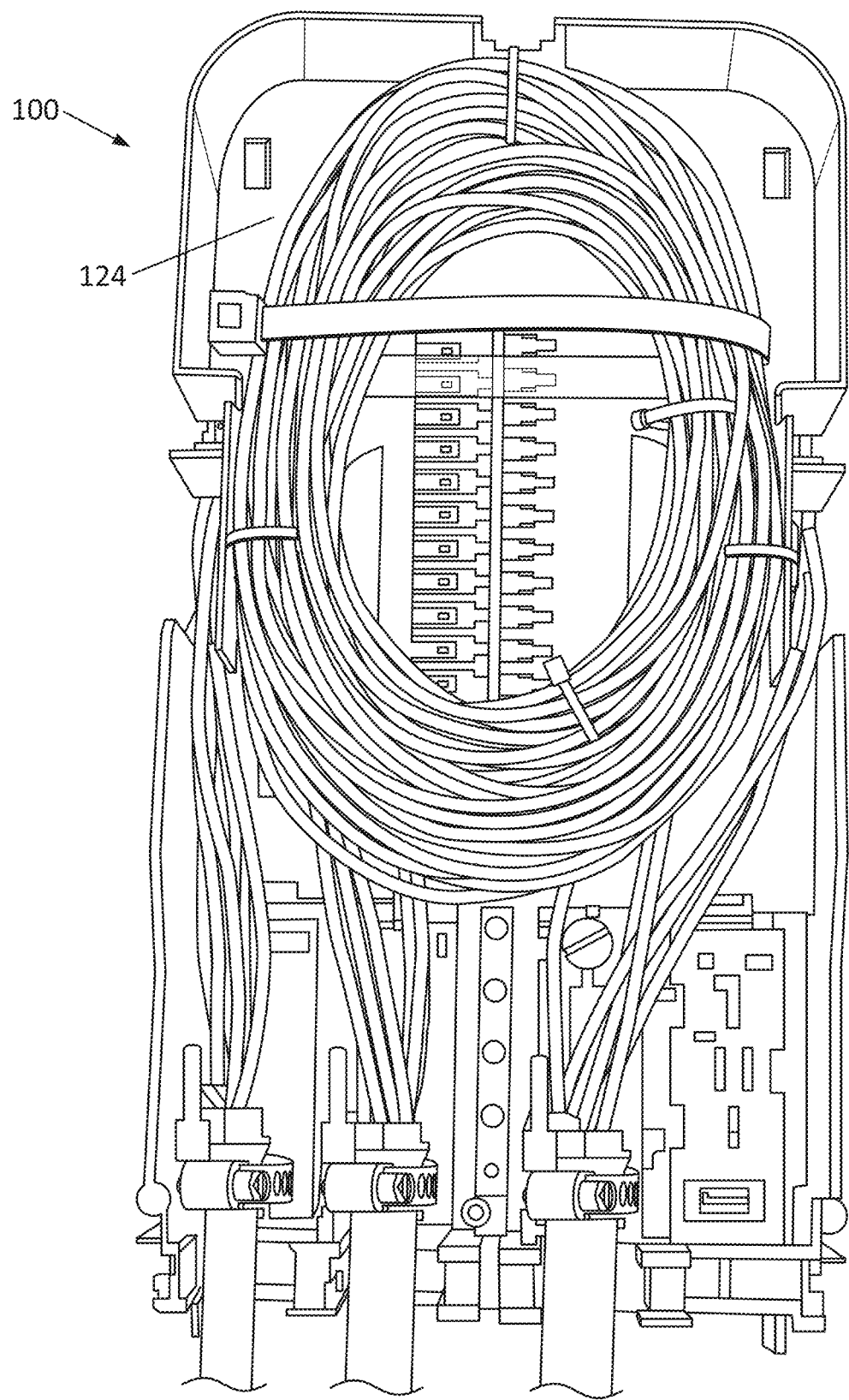
FIG. 49 is a bottom view of the organizer of FIG. 3 showing an example cable routing installation.

Referring to FIGS. 49 to 53, an example cable routing installation utilizing the organizer 100 is presented. FIG. 49 shows a feeder cable and two branch cables within the lower region 124 of the organizer 100, wherein cables from the feeder cable and one of the branch lines extend to the upper region 122 of the organizer 100. In some examples, one or two feeder cables enter the lower region 124 via cable ports at the proximal end of the organizer 100 and have jacketed portions affixed at the cable fixation portion 130. Optical fibers from the one or more feeder cables are stored in loops in the fiber management portion 132. In some examples, the optical fibers are held in protective sheaths that are stored in loops in the basket 139 of the fiber management portion 132. Each sheath can hold a plurality of fibers such as, e.g., 4, 6, 8, 10, 12 or more fibers. Portions of the sheaths can be routed to the upper region 122.

In addition, branch cables can enter the lower region 124 via further ones of the cable ports at the proximal end of the organizer 100, with jacketed portions of the branch cables being affixed at the cable fixation portion 130. For example, a provider side feeder or branch cable and a subscriber side branch cable can enter the closure at the lower region 124. Fibers from the provider side feeder or branch cable can be spliced to fibers of the subscriber side branch cable, with the fibers and splices being managed at the organizer 100. In some examples, the optical fibers of the branch cables are held in protective sheaths that are stored in loops in the basket 139 of the fiber management portion 132. Each sheath can hold a plurality of fibers such as, e.g., 4, 6, 8, 10, or 12 or more fibers. Portions of the sheaths can be routed to the upper region 122 via channels 180 at the rear of the main body 300 for further fiber management. The provider side feeder or branch cable can be routed to the closure from, e.g., another closure on the provider side of the network, e.g., larger closure. The subscriber side branch cable can be routed from the closure to another closure on the subscriber side of the network, e.g., a smaller closure, such as a multiport service terminal (MST).

Figure 50:
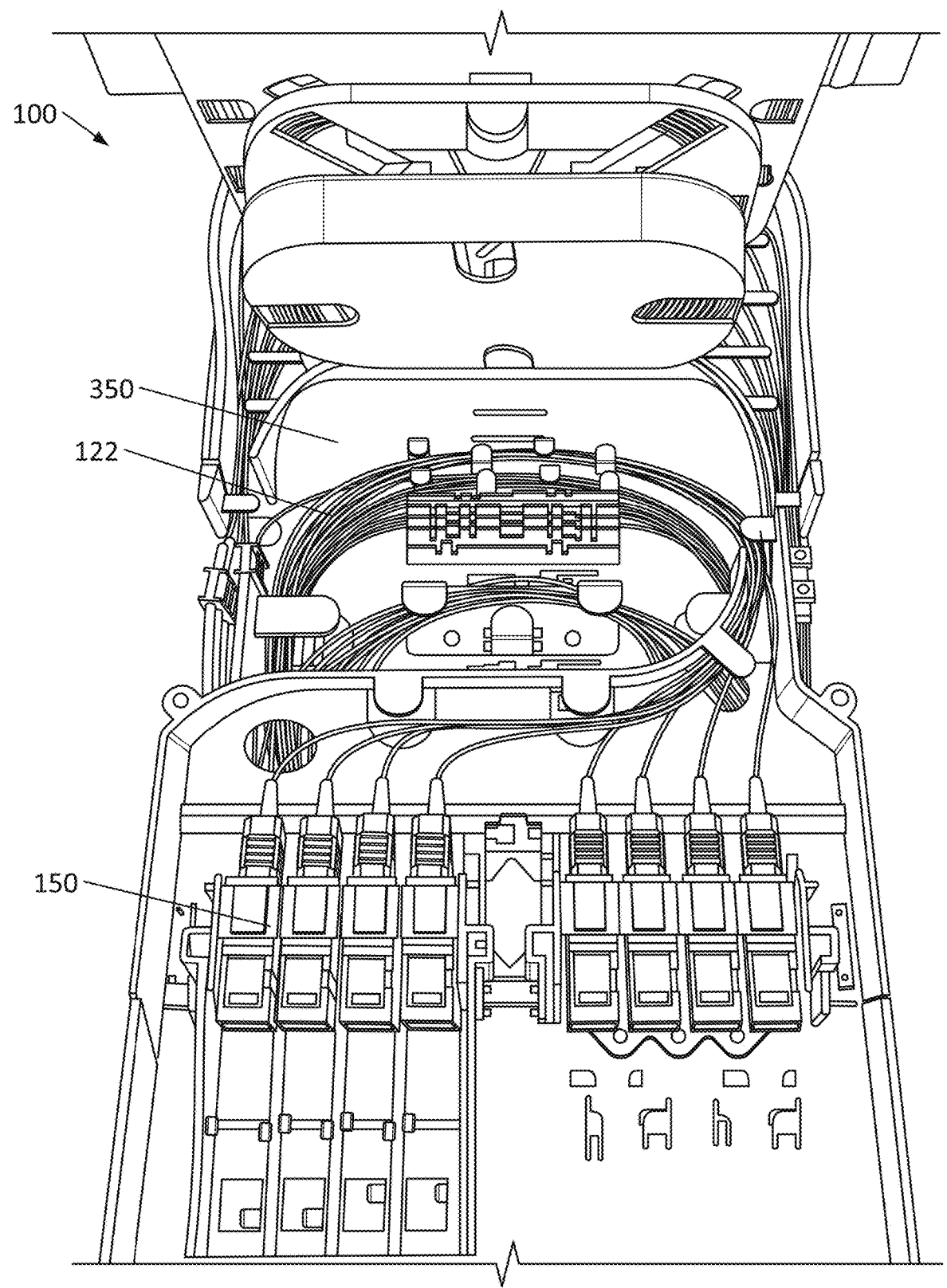
FIG. 50 is a top view of the organizer of FIG. 49 showing the cable routing installation at the first cable routing zone.

FIG. 50 shows cables organized from the adapter block 150 in the first zone 350. At this level, the connectorized drop cables 50, for example of the type shown at FIG. 3A, can be connected to the adapters in the adapter block 150. Examples of cables that could be stored in the first zone 350 are unused loops of cables, such as from some of the feeder cables extending from the lower region and extending to the upper region. Additionally, pigtails or cables extending from connectors connected to the adapters in the adapter block 150 can be stored in the first zone 350. The first zone 350 can also be configured to house and support a fiber optic splitter.

Figure 51:
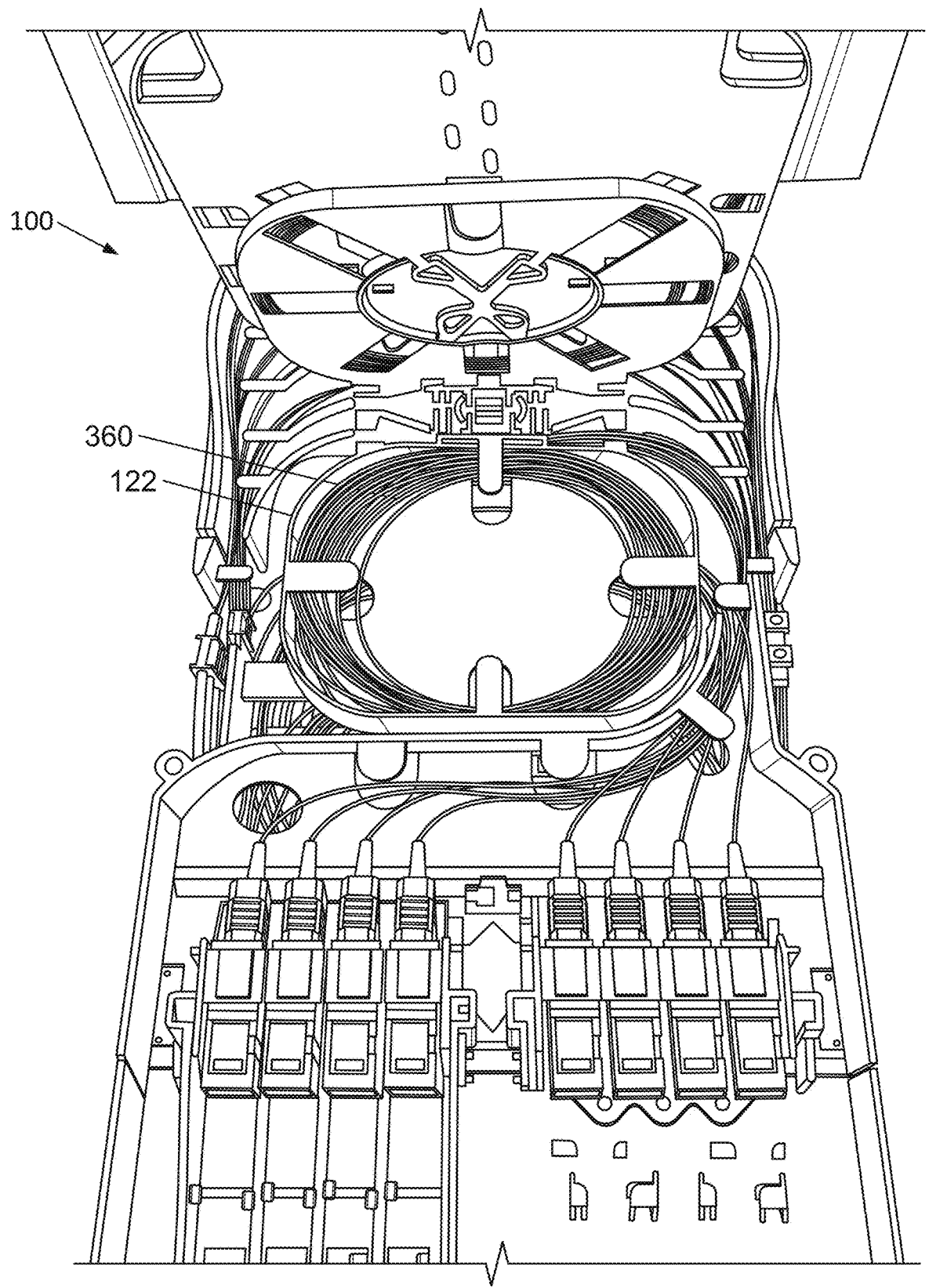
FIG. 51 is a top view of the organizer of FIG. 49 showing the cable routing installation at the second cable routing zone.

FIG. 51 shows cables stored in the second zone 360. Examples of cables that can be stored in the second zone 360 are loops of fiber cable within tubes, for example 900 um cables, from a feeder cable that are stored for later use. The second zone 360 can also be configured to house and support a fiber optic splitter.

Figure 52:
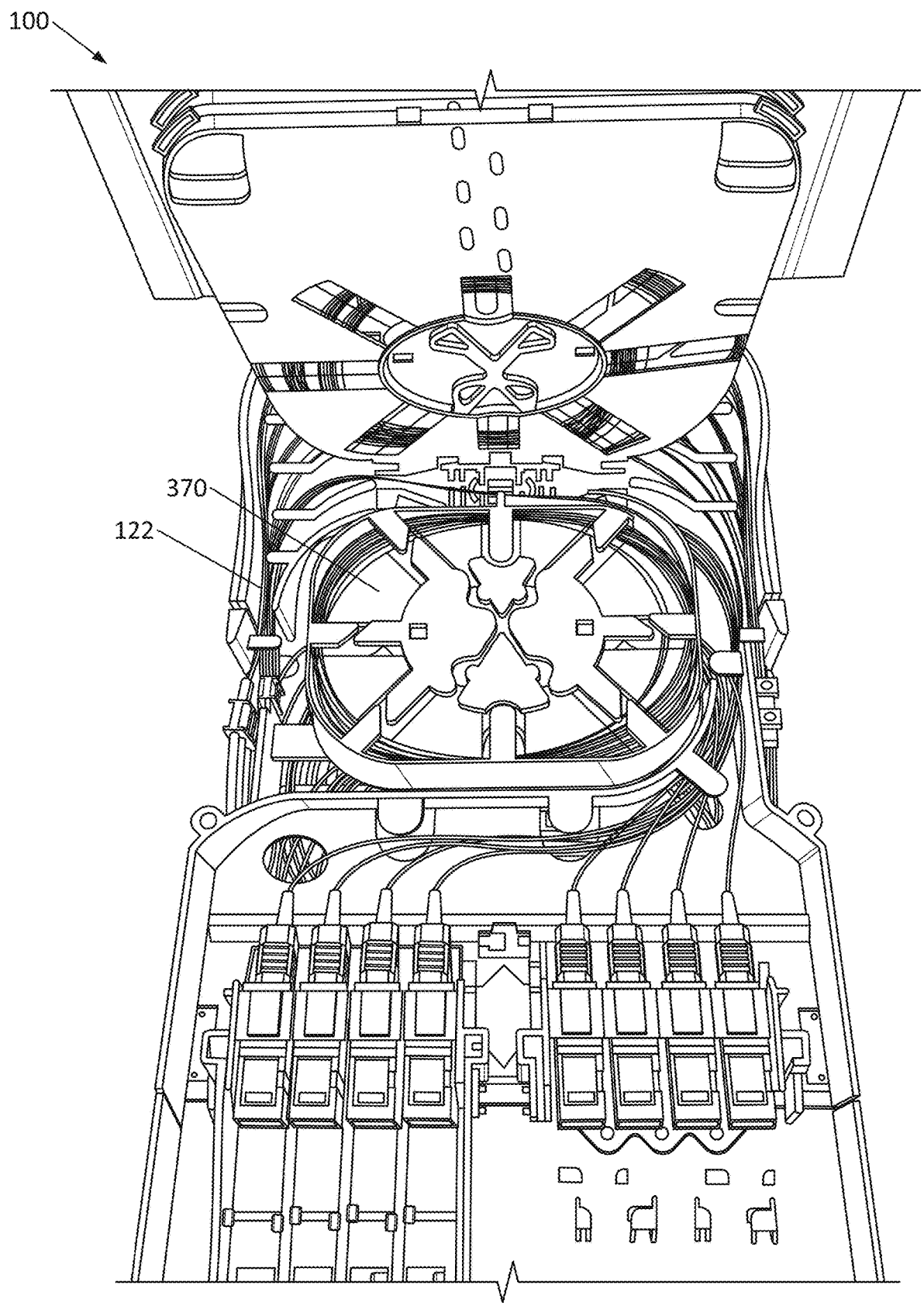
FIG. 52 is a top view of the organizer of FIG. 49 showing the cable routing installation at the third cable routing zone.
Figure 53:
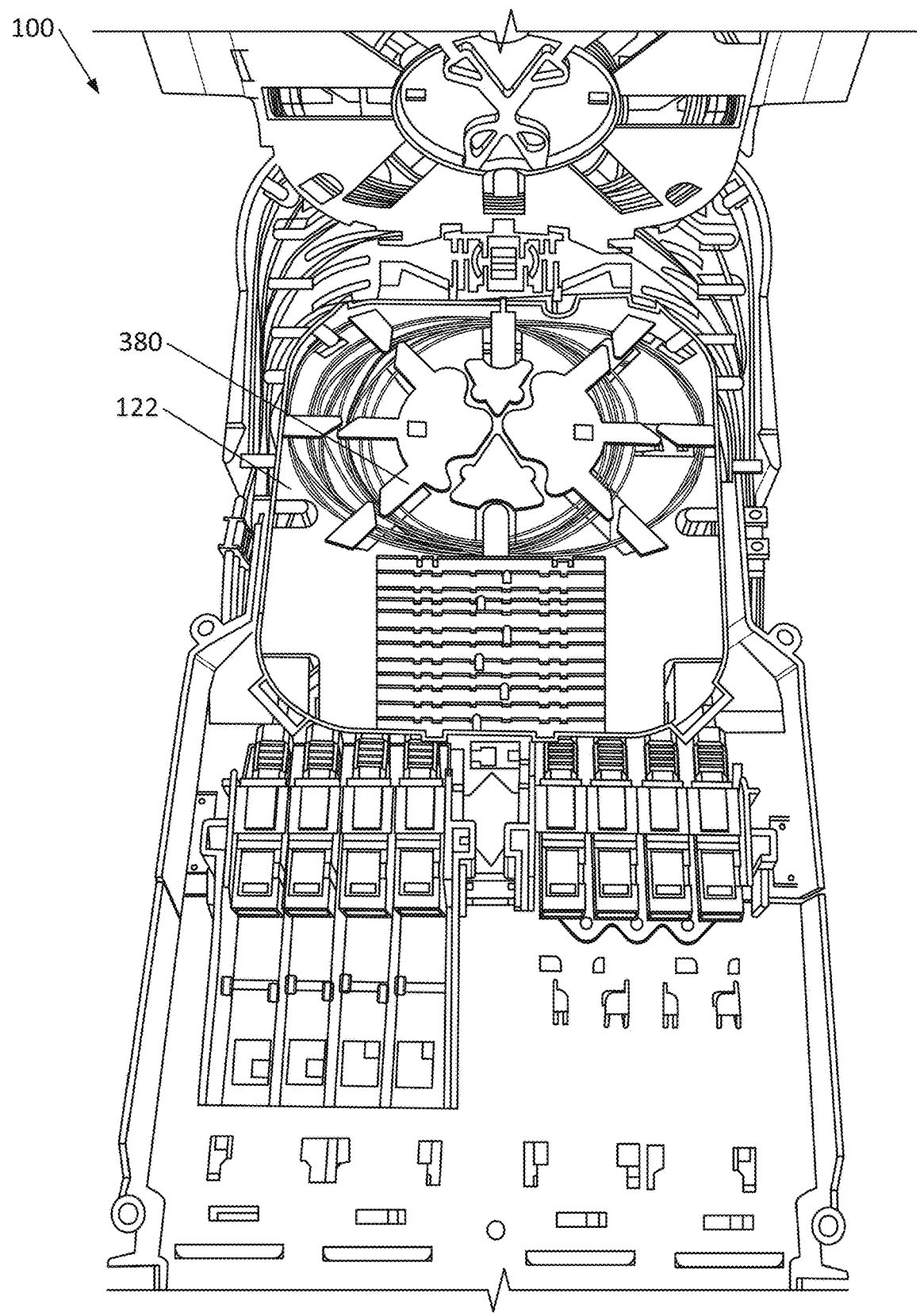
FIG. 53 is a top view of the organizer of FIG. 49 showing the cable routing installation at the fourth cable routing zone.

FIG. 52 shows cables stored in the third zone 370. FIG. 53 shows cables stored in the fourth zone 380. Examples of cables that can be stored in the third zone 370 are 250 uncut um fiber pigtails without tubing. The third zone 370 can also be configured to house and support a fiber optic splitter.

FIG. 53 shows cable stored in a fourth zone 380. The fourth zone 380 includes the upper trays 204a. Examples of cables that can be stored in the fourth zone 380 are splice fibers between feeder and branch cables.

Figure 54:
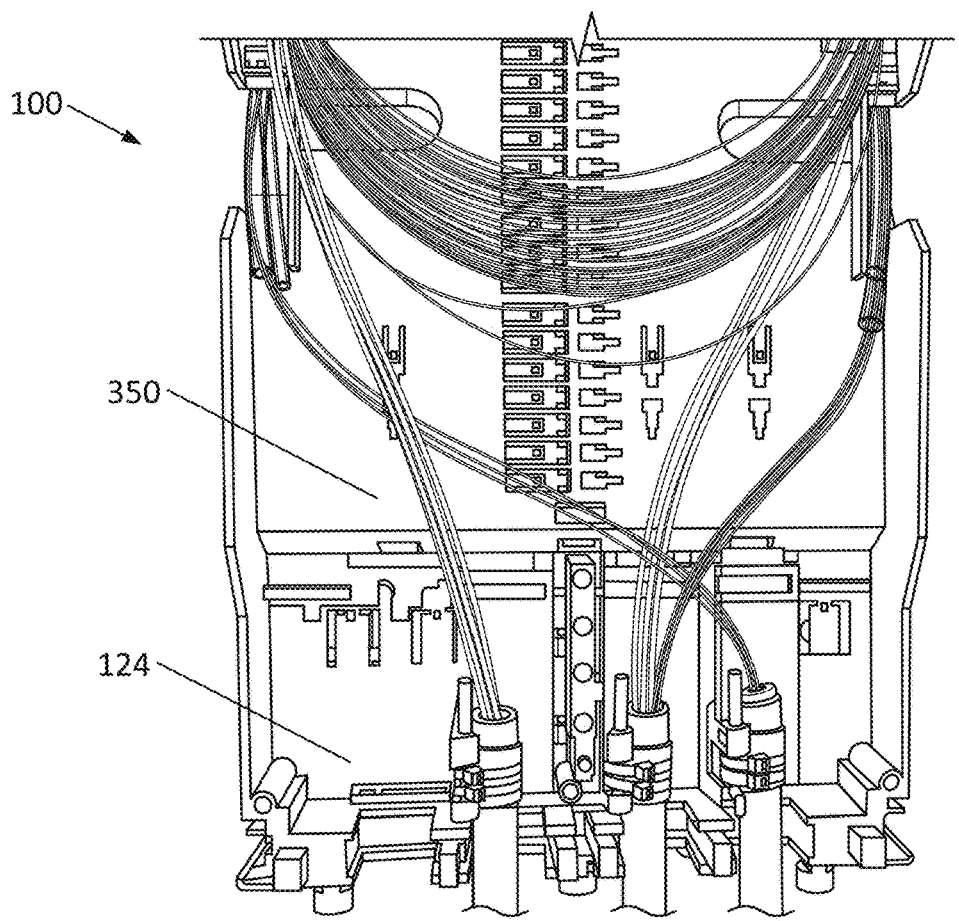
FIG. 54 is a bottom view of the organizer of FIG. 3 showing an example cable routing installation.
Figure 55:
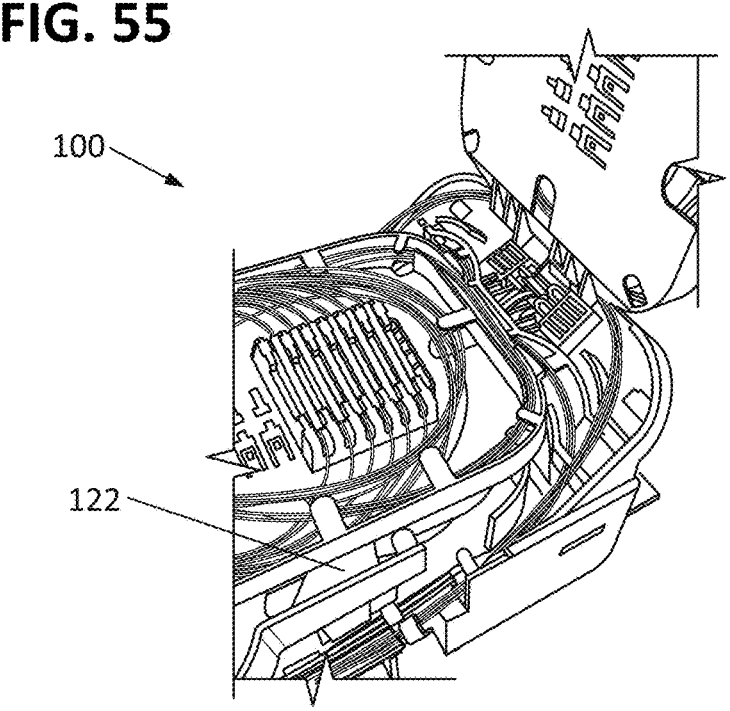
FIG. 55 is a top perspective view of the organizer of FIG. 49 showing the cable routing installation at the upper region.

Referring to FIGS. 54 to 55, an example cable routing installation with flat ribbon cable utilizing the organizer 100 is presented. FIG. 54 shows a feeder cable and two branch cables within the lower region 124 of the organizer 100, wherein cables from the feeder cable and one of the branch lines extend to the upper region 122 of the organizer 100. FIG. 55 shows cables routed throughout the upper region 124 of the organizer.

Figure 56:
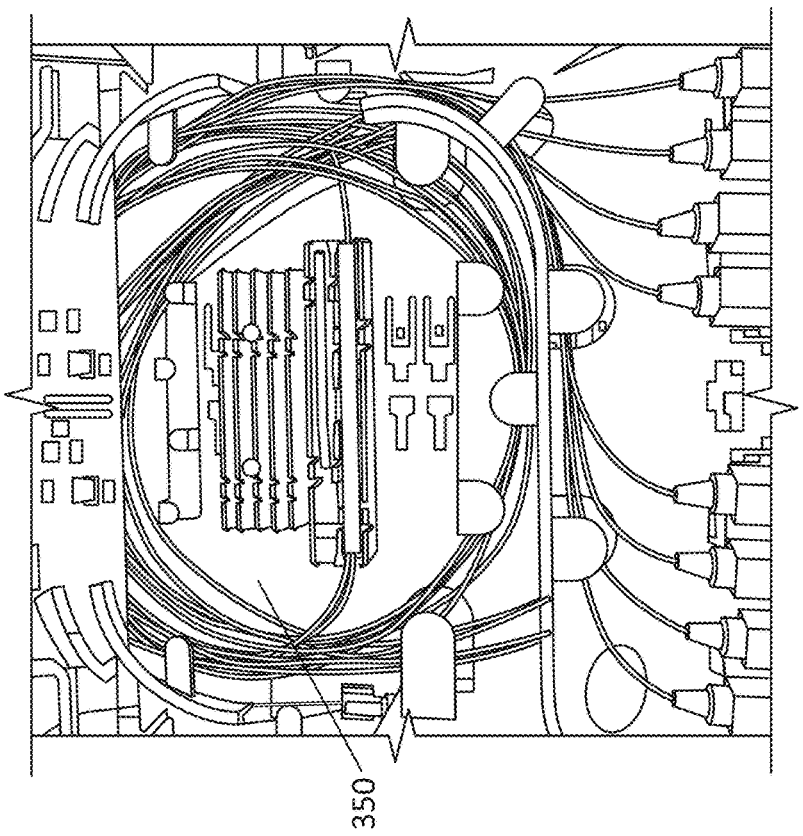
FIG. 56 is a top view of a further example cable routing installation in the first cable routing zone of the organizer of FIG. 3.
Figure 57:
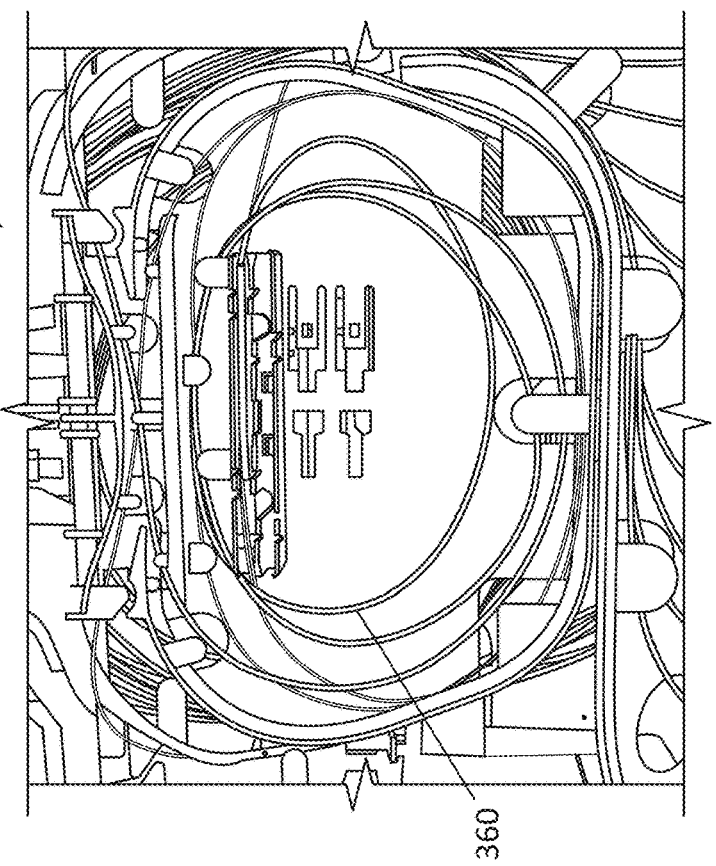
FIG. 57 is a top view of a further example cable routing installation in the second cable routing zone of the organizer of FIG. 3.
Figure 59:
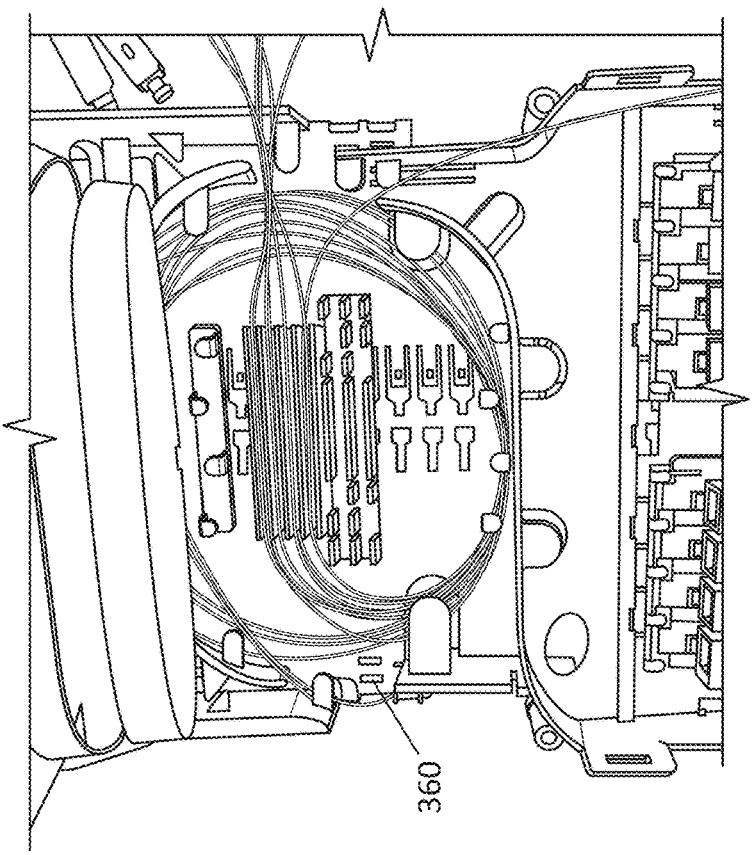
FIG. 59 is a top view of a further example cable routing installation in the second cable routing zone of the organizer of FIG. 3.
Figure 58:
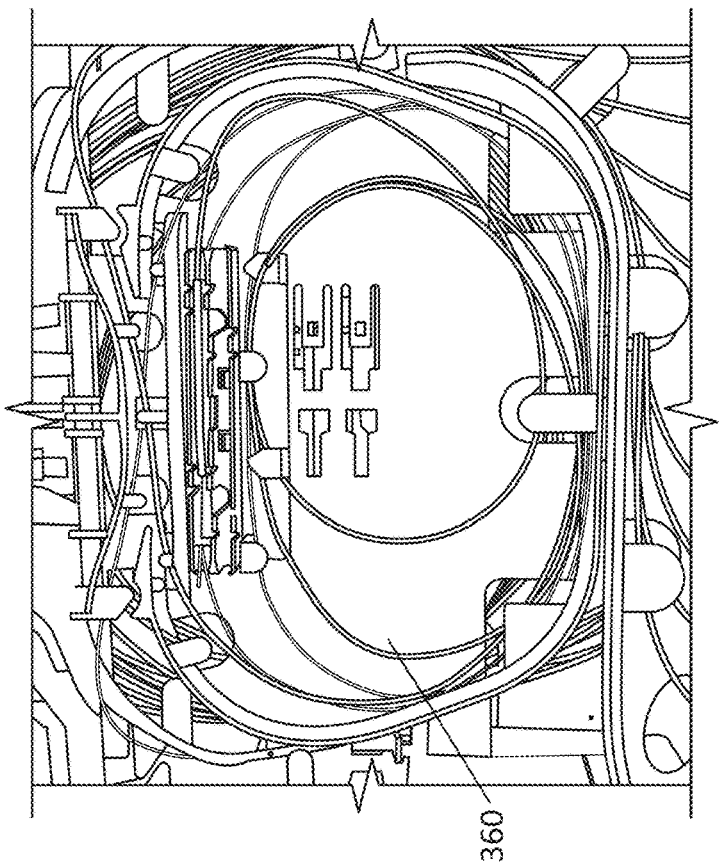
FIG. 58 is a top view of a further example cable routing installation in the second cable routing zone of the organizer of FIG. 3.
Figure 60:
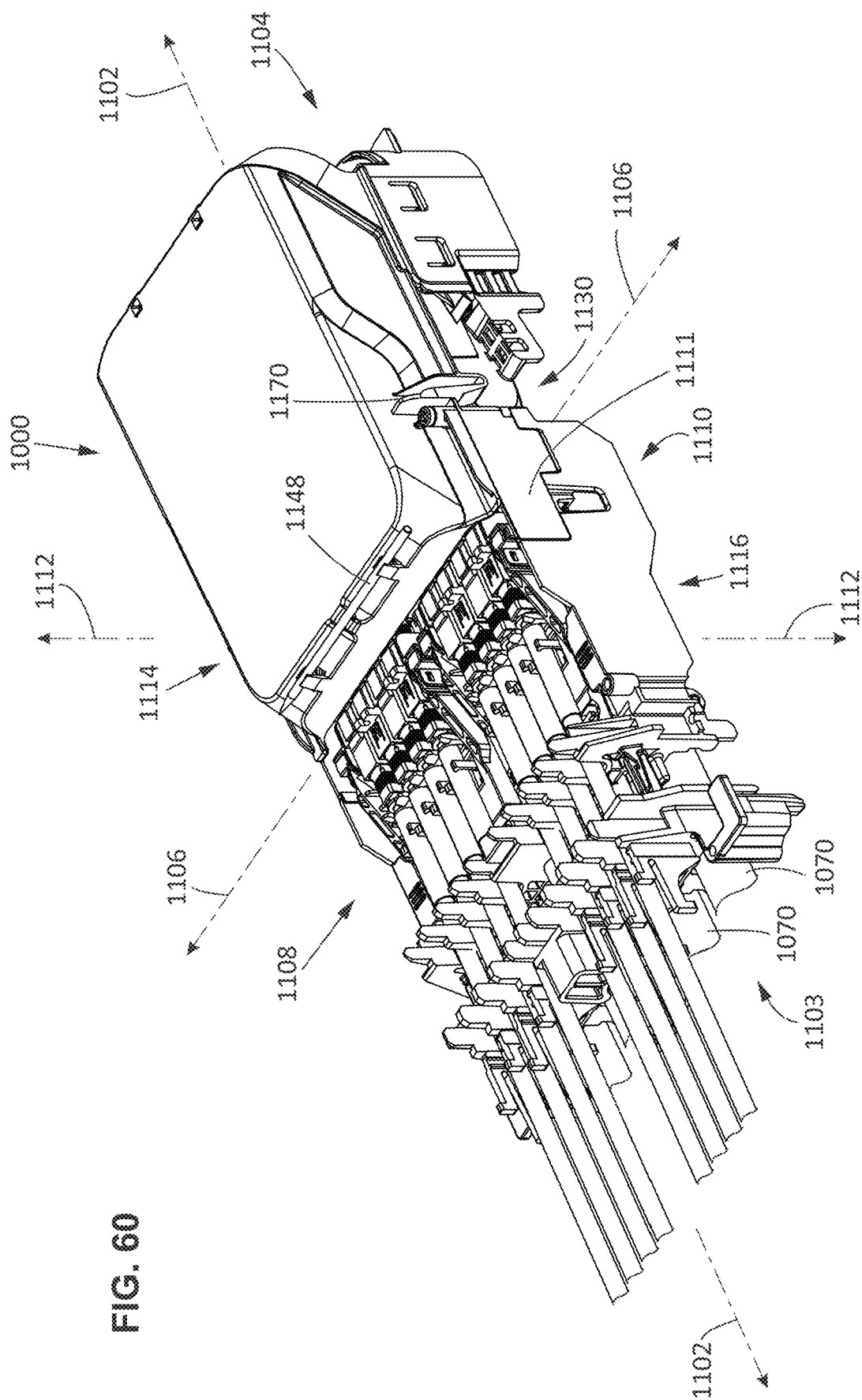
FIG. 60 is a perspective view of a variation of the assembly of FIG. 3, including an optical fiber management organizer according to the present disclosure, the organizer having a demarcation cover in a pivoted closed and locked configuration.
Figure 61:
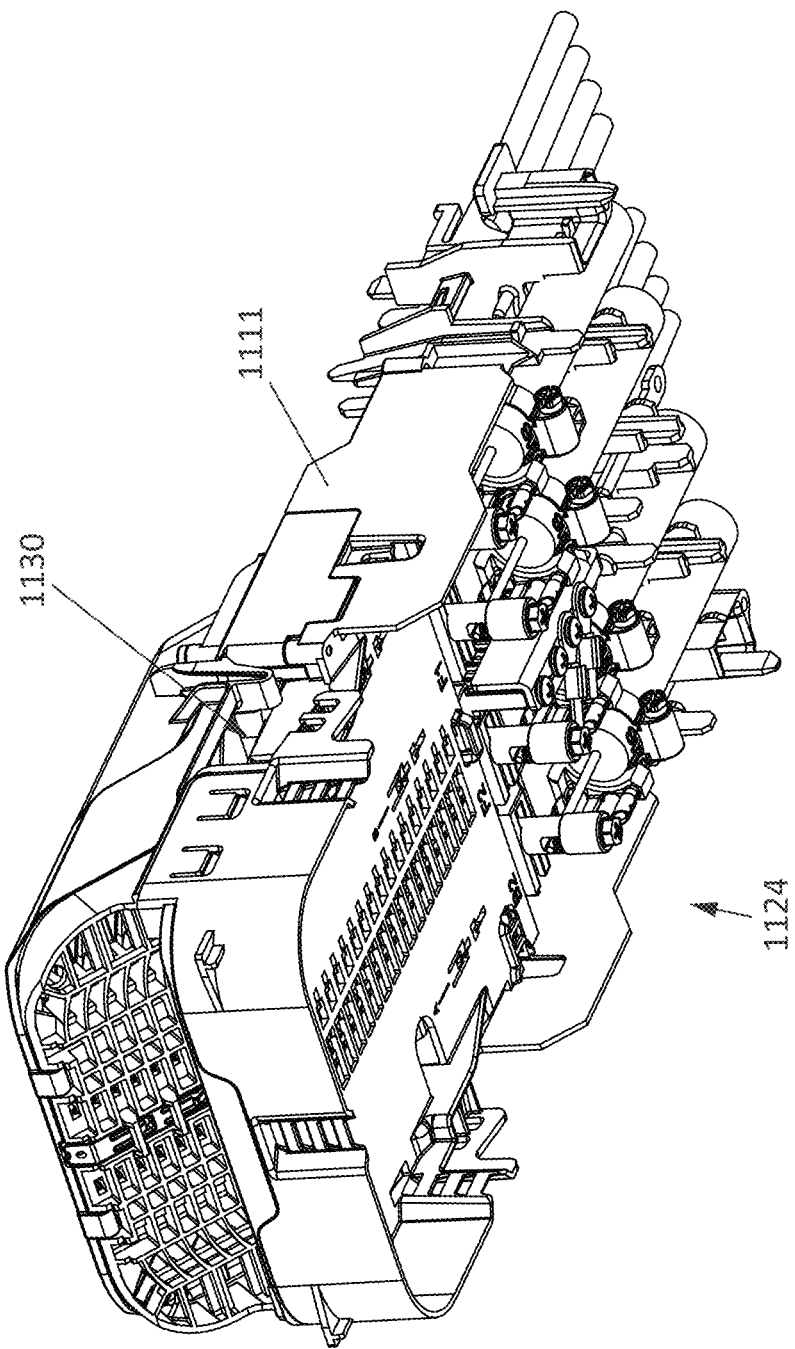
FIG. 61 is a further perspective view of the organizer of FIG. 60, the demarcation cover being in a pivoted closed and locked configuration.
Figure 62:
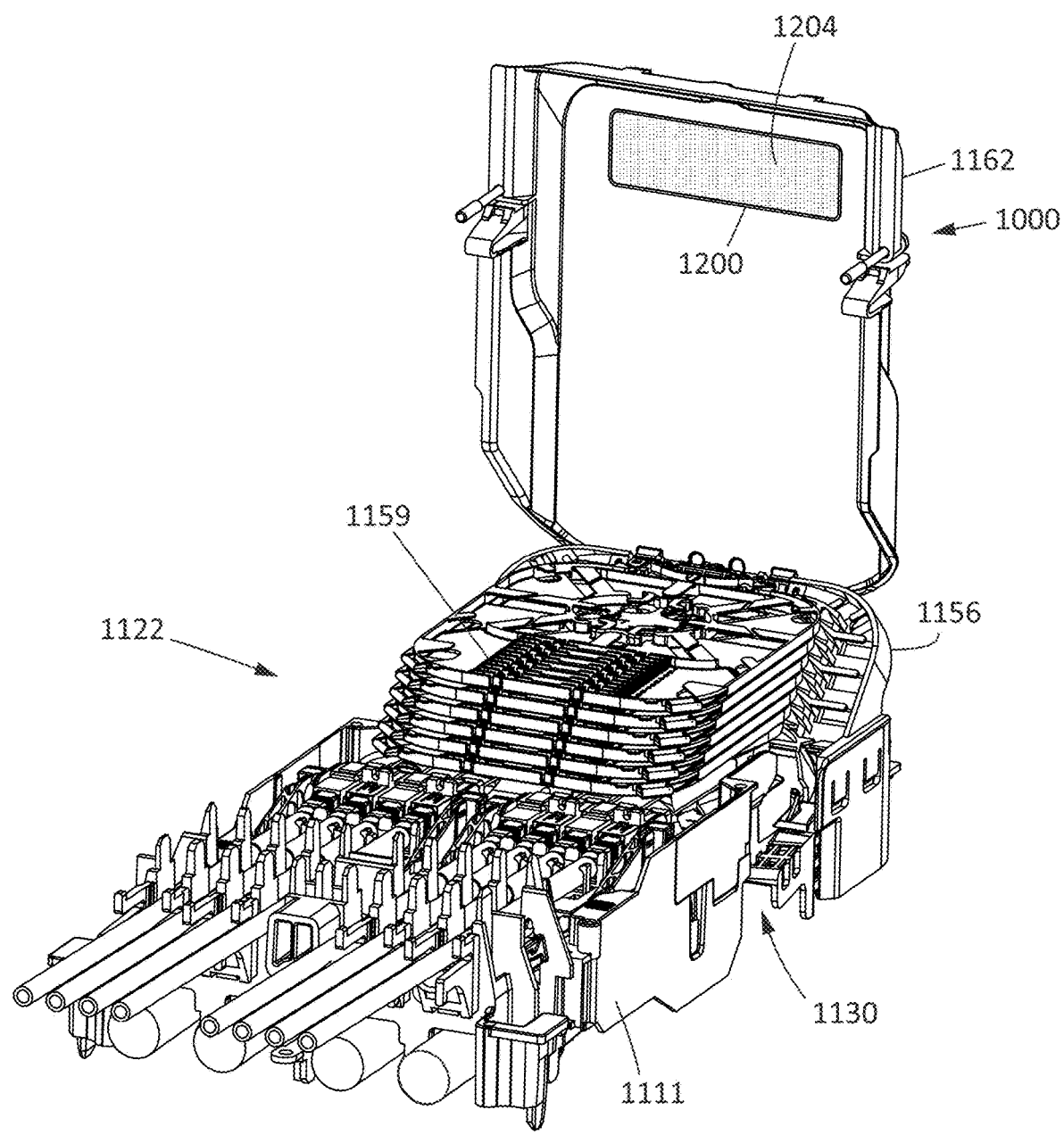
FIG. 62 is a further perspective view of the organizer of FIG. 60, the organizer having a demarcation cover in an unlocked and first pivoted open configuration.
Figure 63:
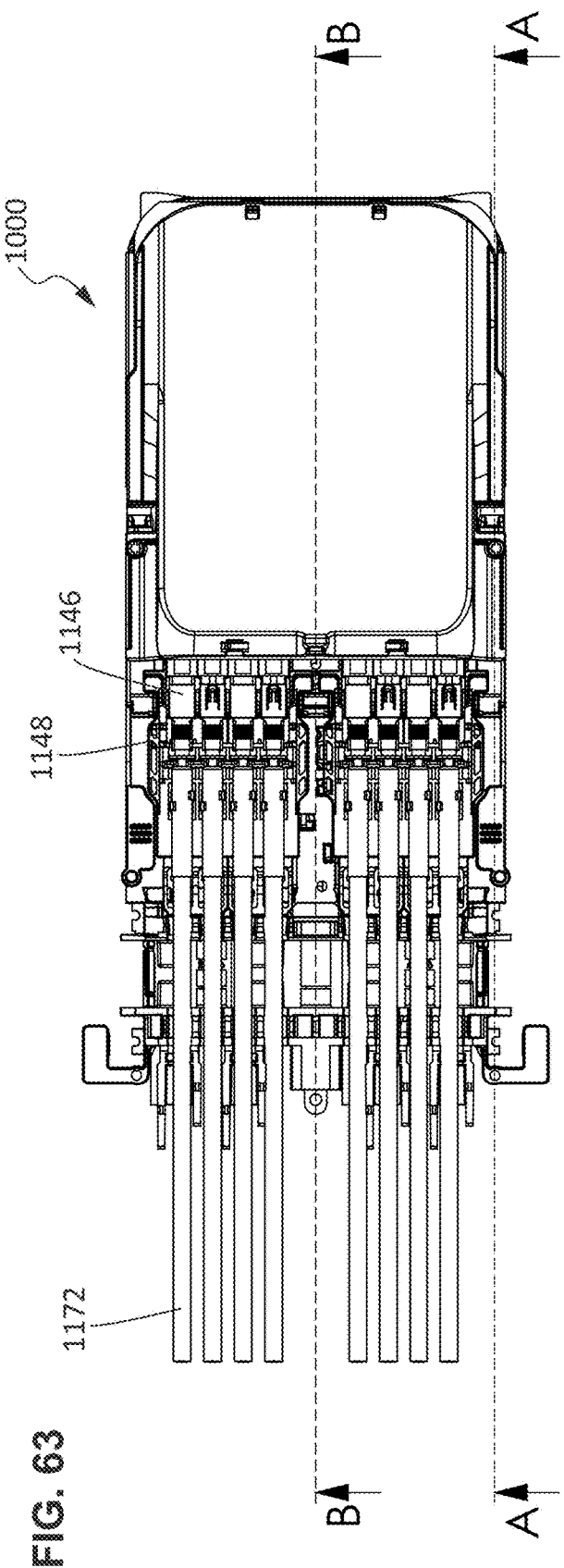
FIG. 63 is a top planar view of the organizer of FIG. 60, the demarcation cover being in a pivoted closed and locked configuration.
Figure 64:
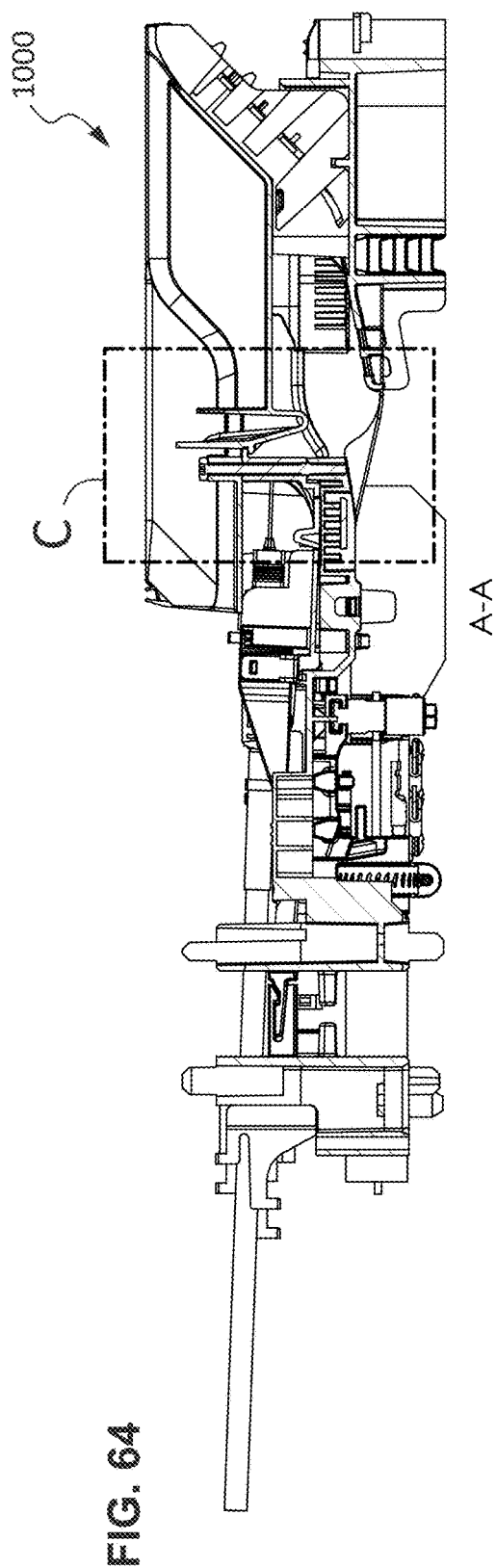
FIG. 64 is a cross-sectional view of the organizer of FIG. 60 taken along the line A-A in FIG. 63, the demarcation cover being in a pivoted closed and locked configuration.
Figure 65:
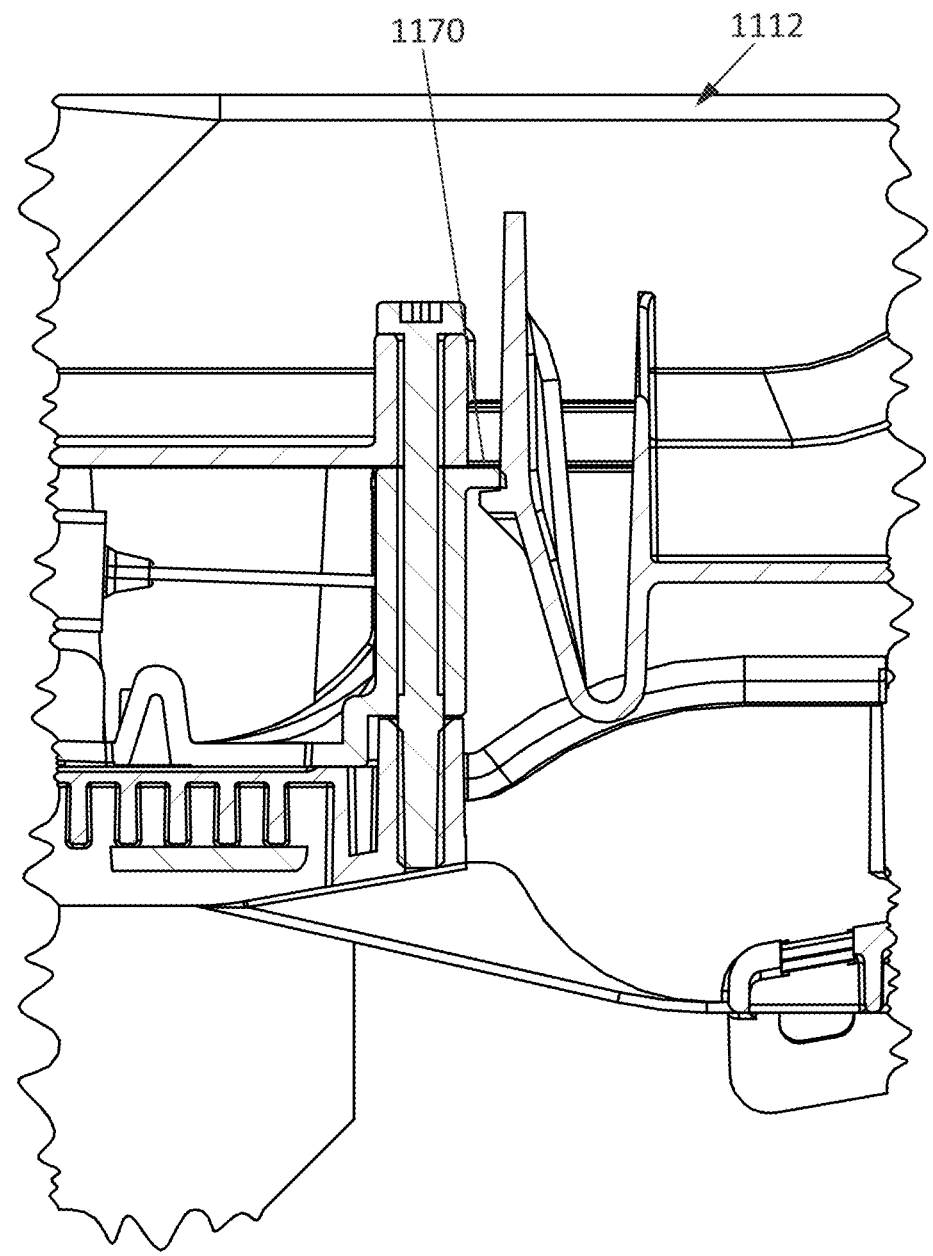
FIG. 65 is an enlarged view of the called out area C in FIG. 64.
Figure 66:
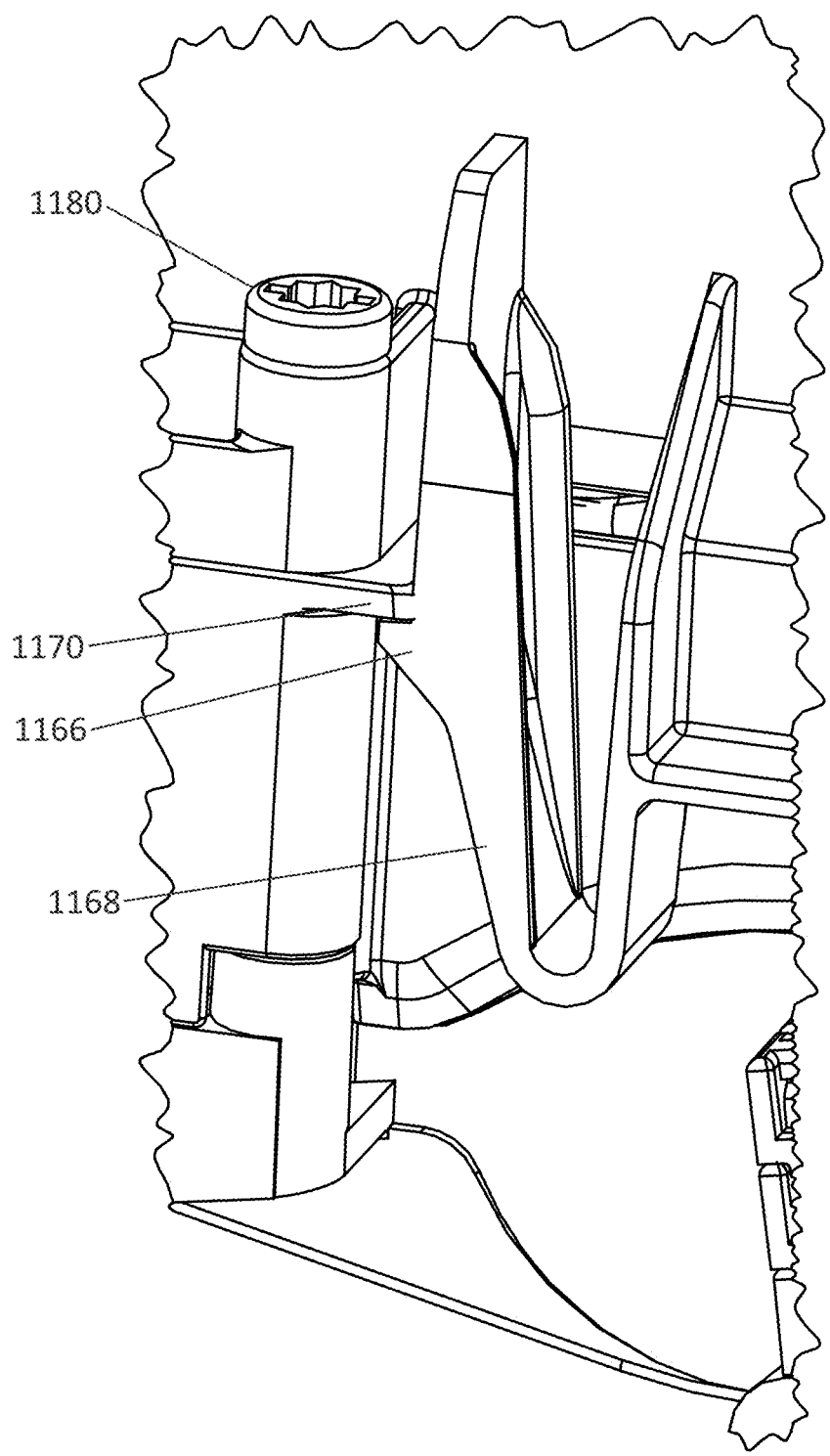
FIG. 66 is an enlarged perspective view of the called out area C of FIG. 64.
Figure 67:
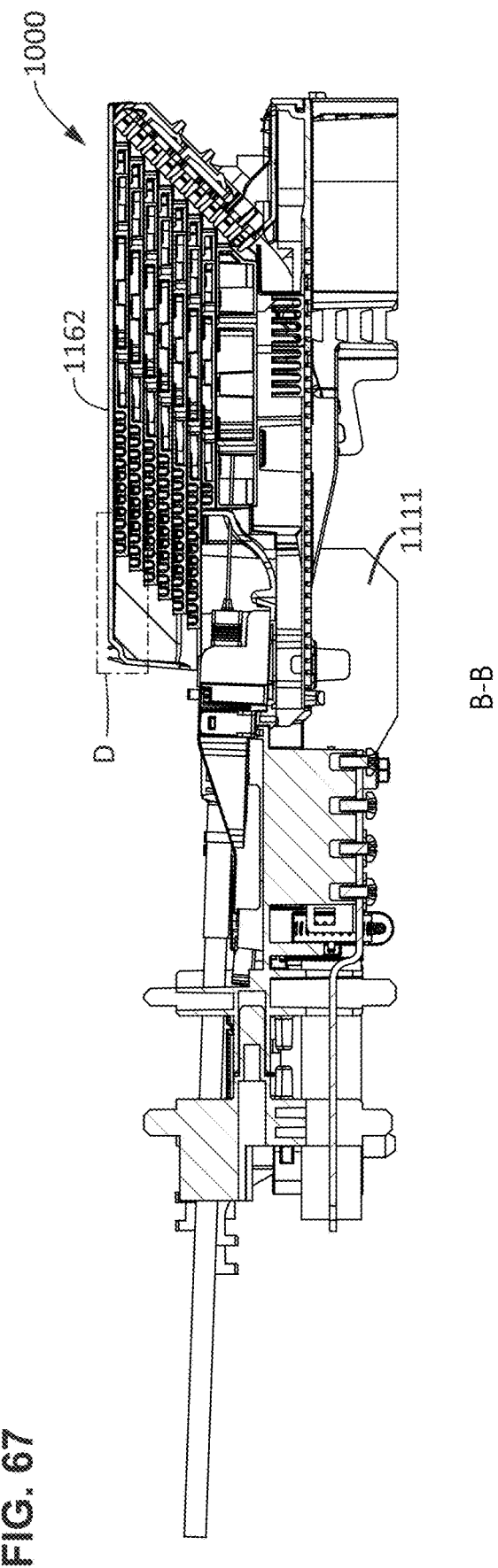
FIG. 67 is a cross-sectional view of the organizer of FIG. 60 taken along the line B-B in FIG. 63, the demarcation cover being in a pivoted closed and locked configuration.
Figure 68:
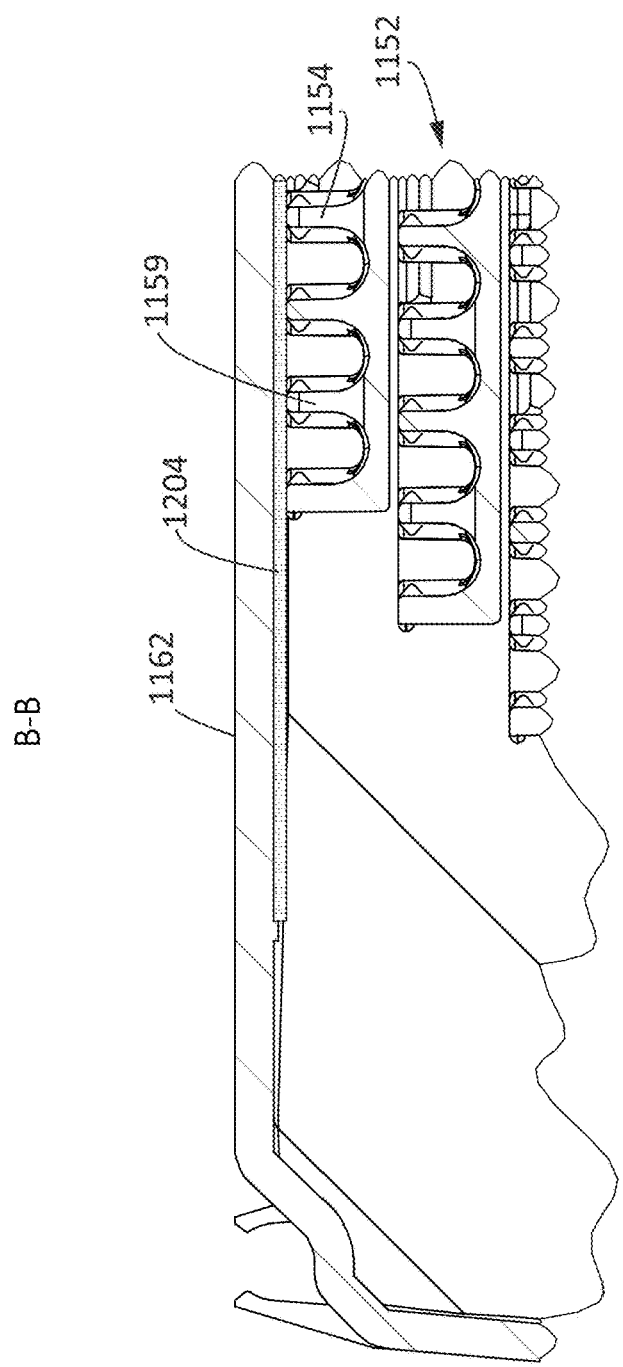
FIG. 68 is an enlarged view of the called out area D of FIG. 67.
Figure 69:
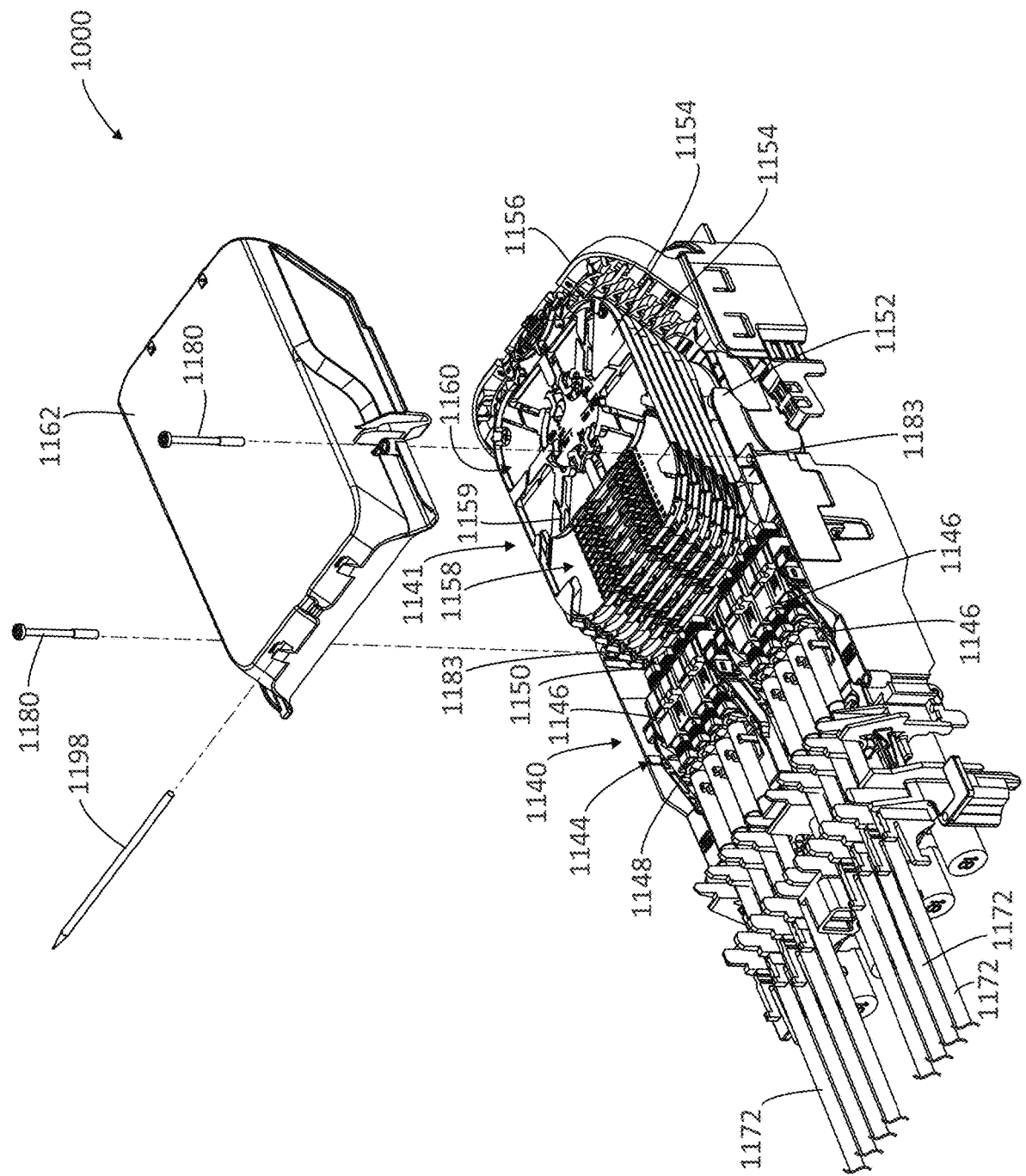
FIG. 69 is a partially exploded view of the organizer of FIG. 60.
Figure 70:
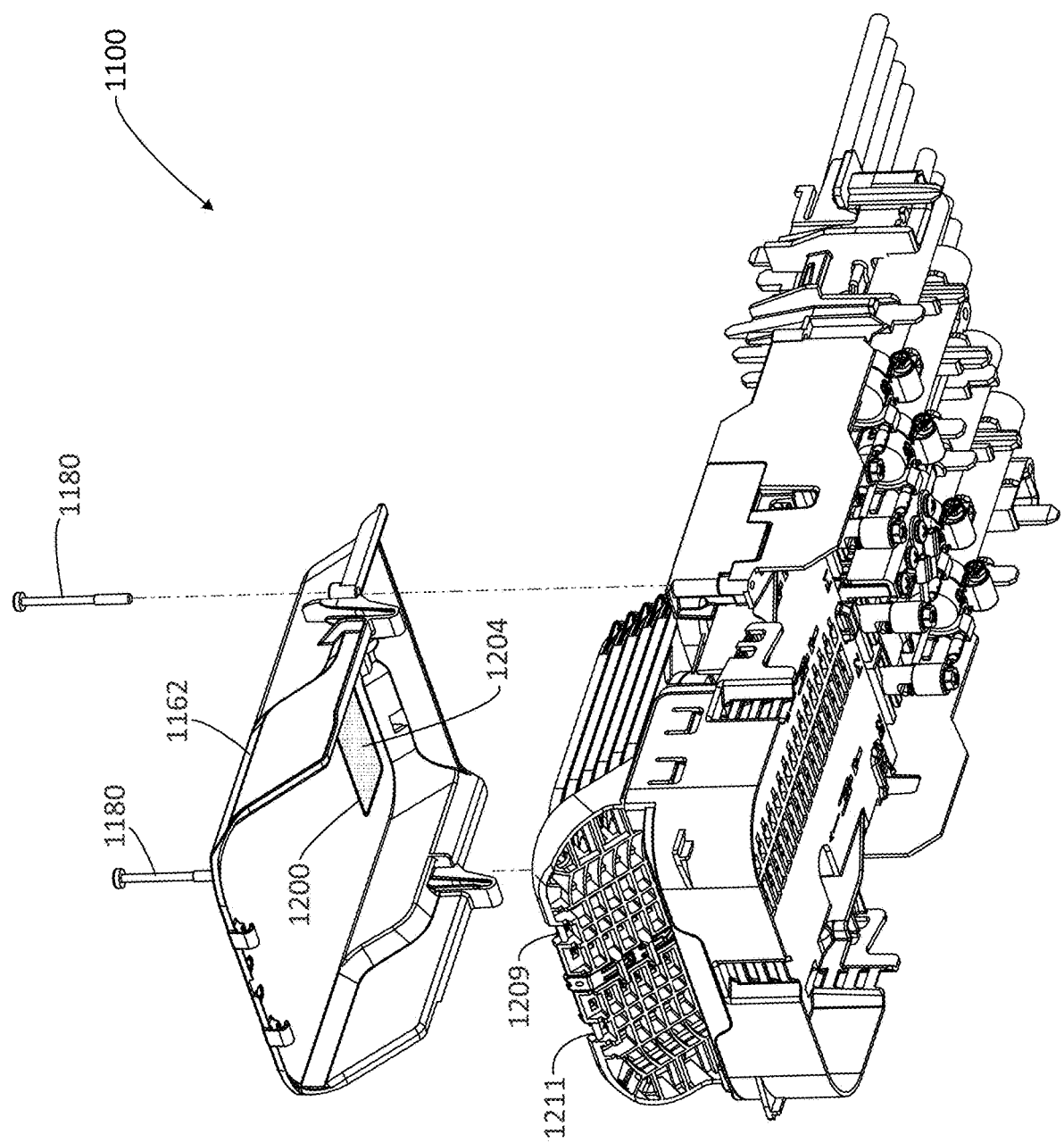
FIG. 70 is a further partially exploded view of the organizer of FIG. 60.
Figure 71:
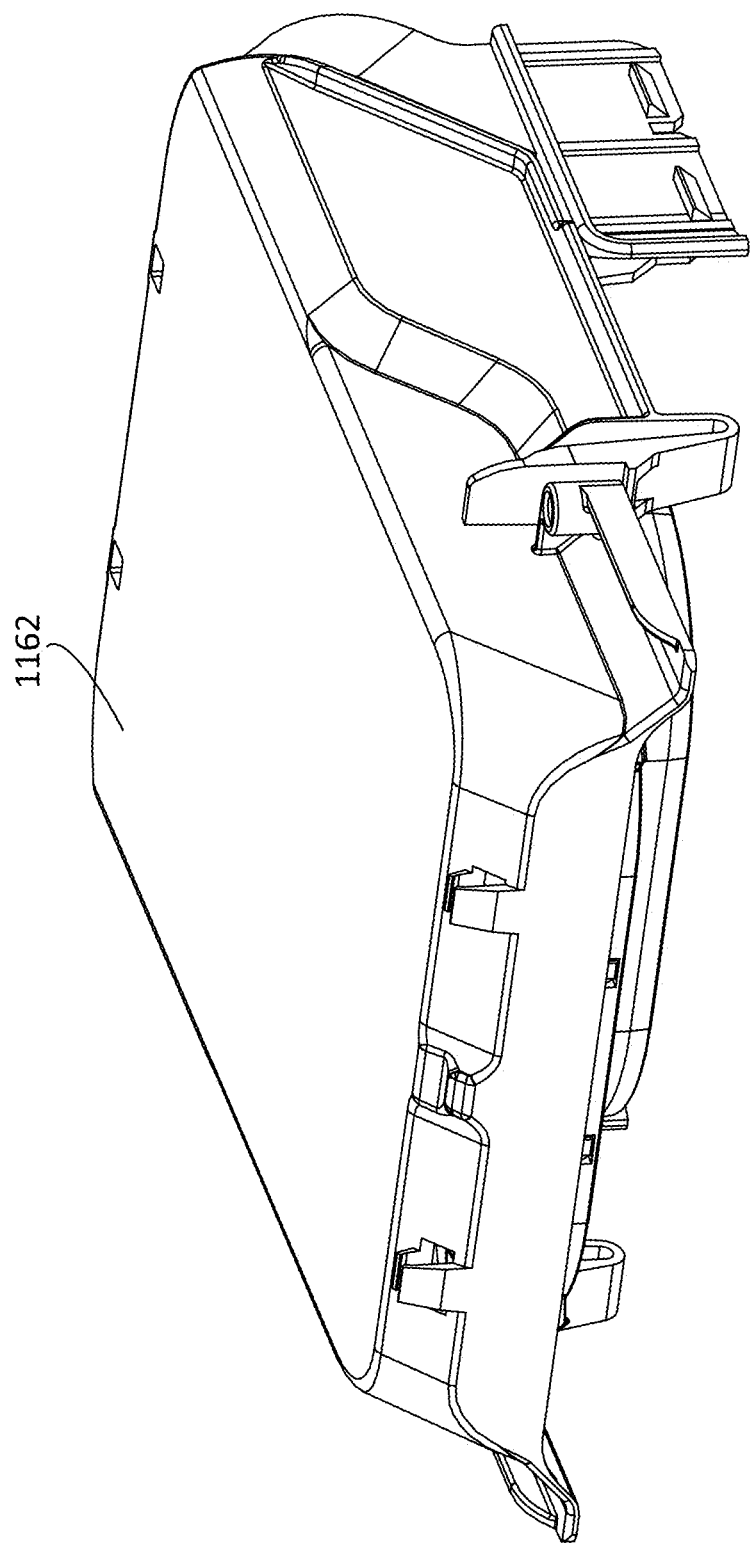
FIG. 71 is a perspective view of a subassembly of the organizer of FIG. 60, the demarcation cover being in a pivoted closed configuration.
Figure 72:
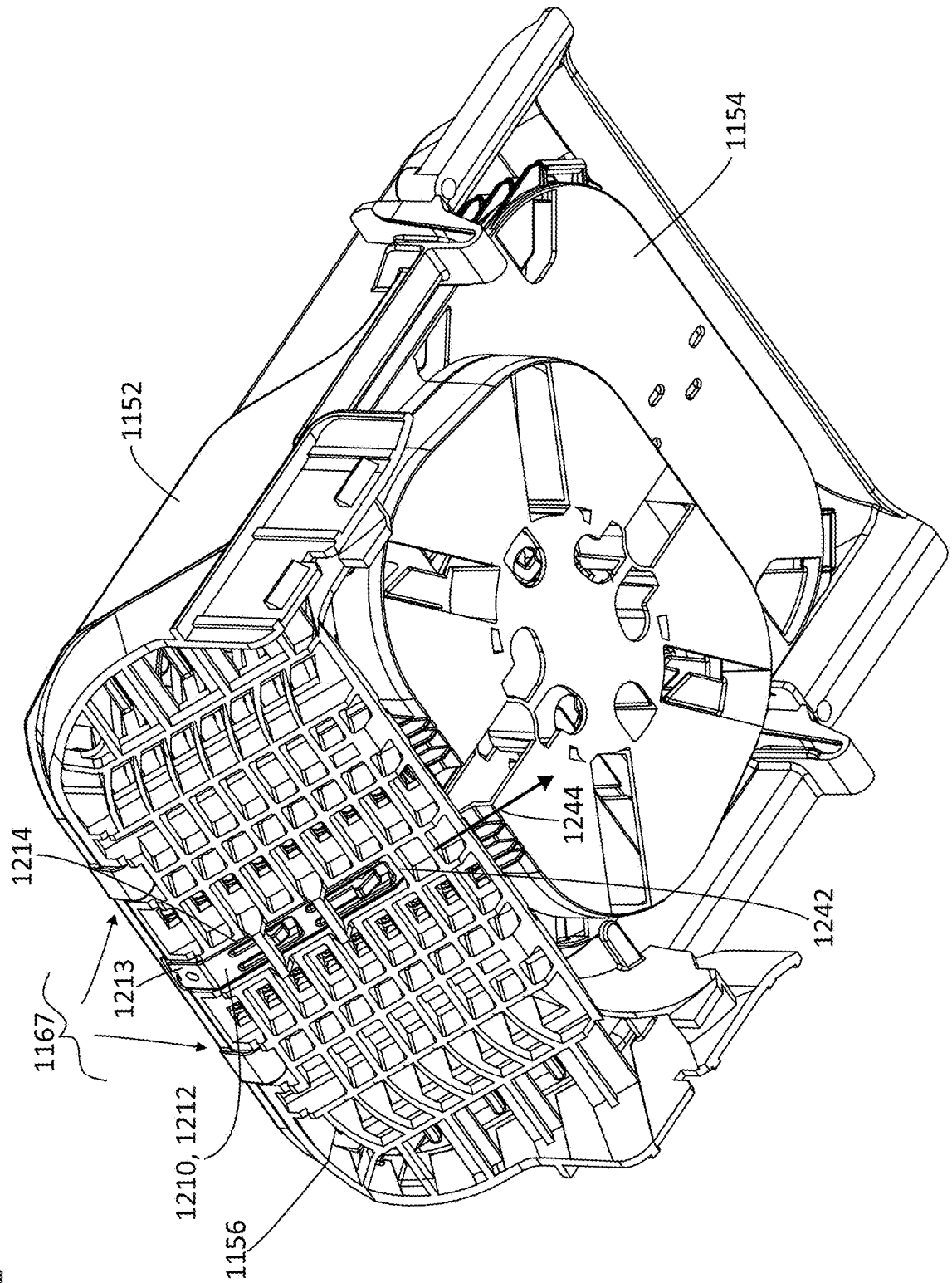
FIG. 72 is a further perspective view of the subassembly of FIG. 71 the demarcation cover being in a pivoted closed configuration.
Figure 73:
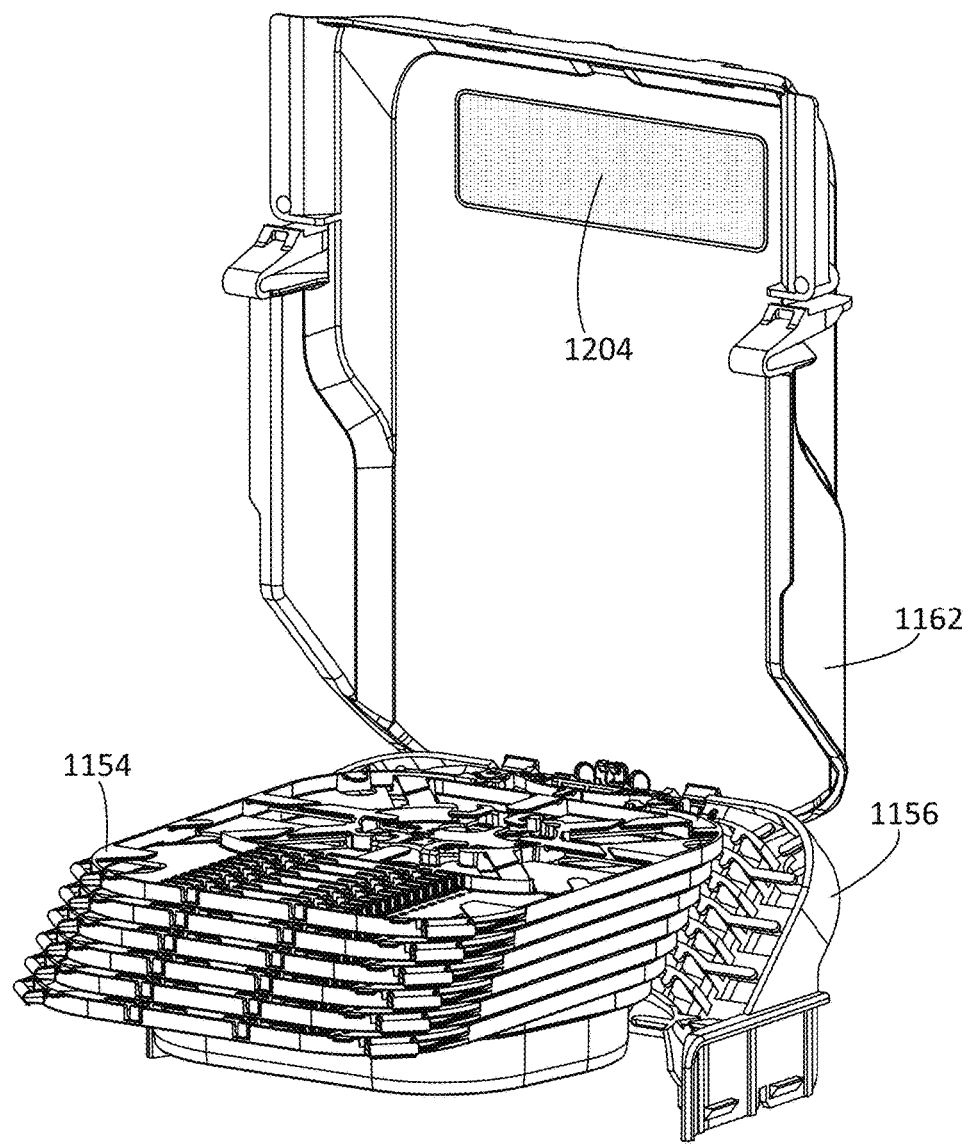
FIG. 73 is a further perspective view of the subassembly of FIG. 71, the demarcation cover being in a first pivoted open configuration.
Figure 74:
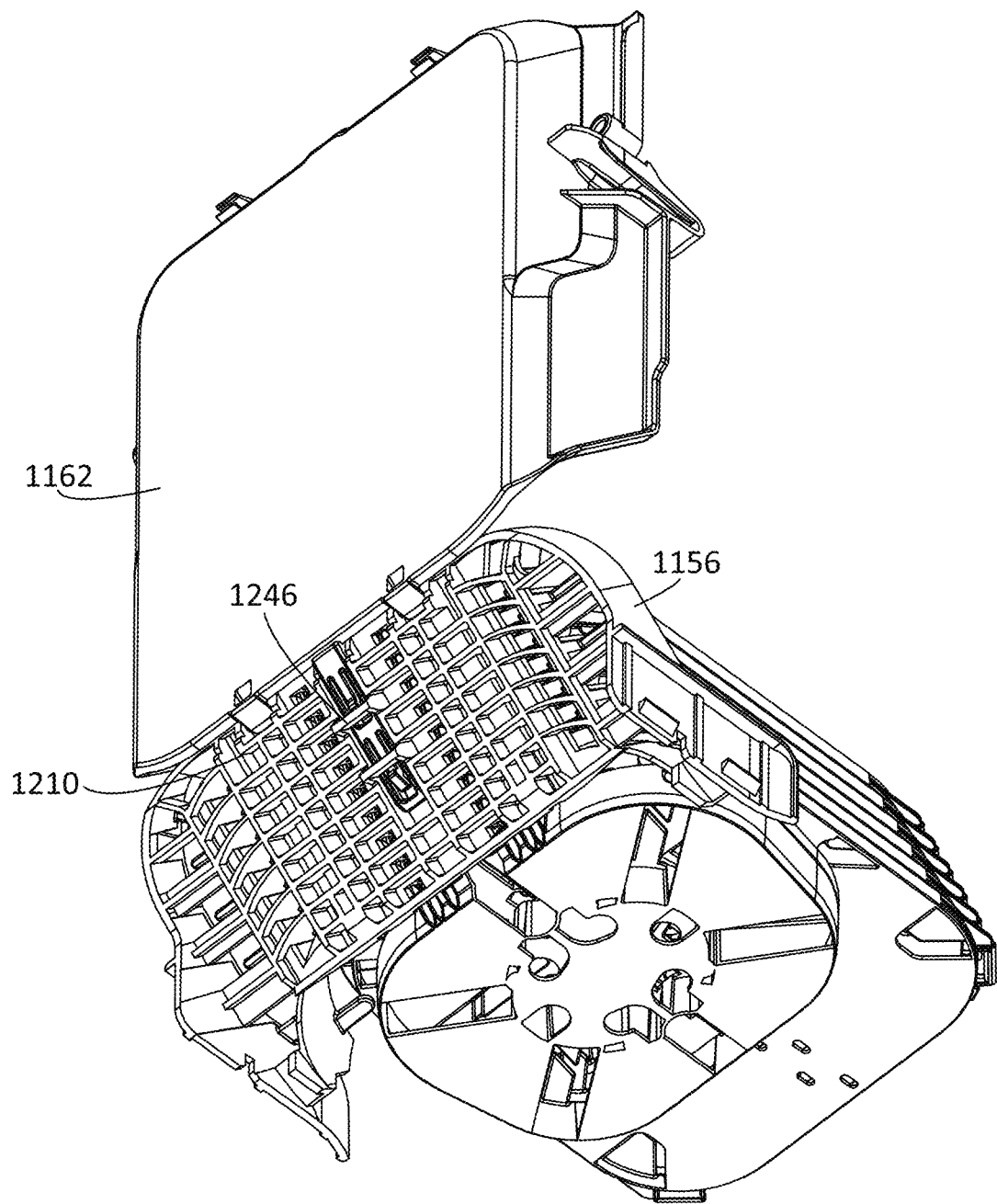
FIG. 74 is a further perspective view of the subassembly of FIG. 71, the demarcation cover being in the first pivoted open configuration.
Figure 75:
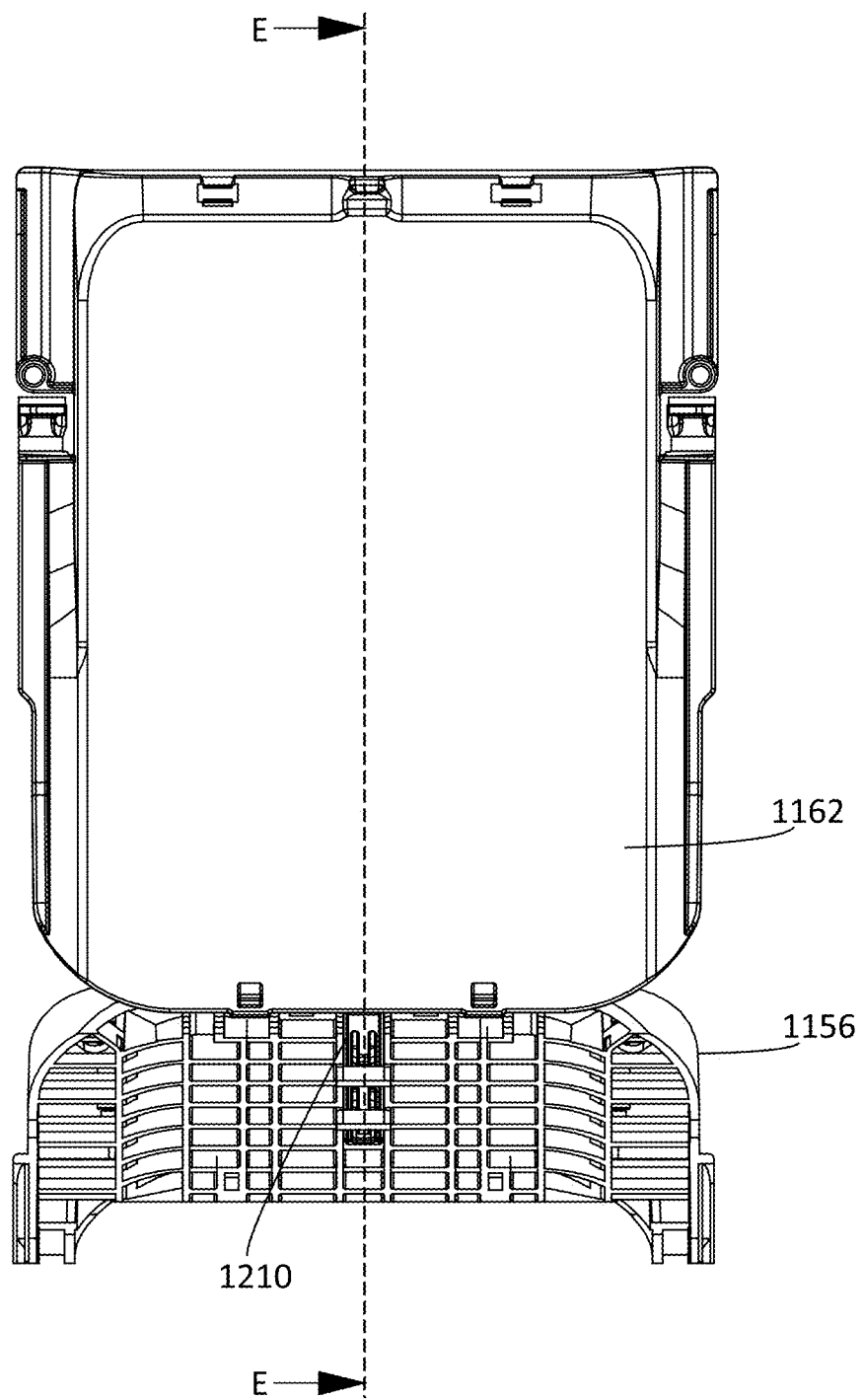
FIG. 75 is a distal end view of the subassembly of FIG. 71, the demarcation cover being in the first pivoted open configuration.
Figure 76:
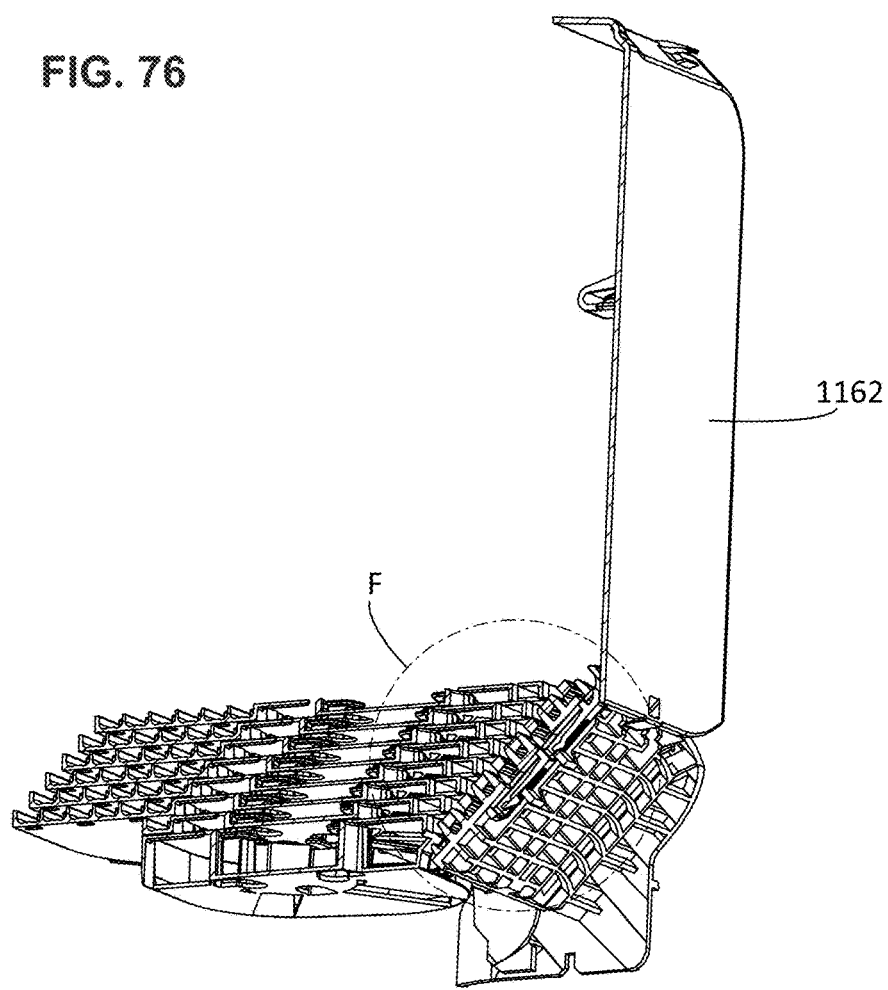
FIG. 76 is a perspective cross-sectional view of the subassembly of FIG. 71 taken along the line E-E in FIG. 75, the demarcation cover being in the first pivoted open configuration.
Figure 77:
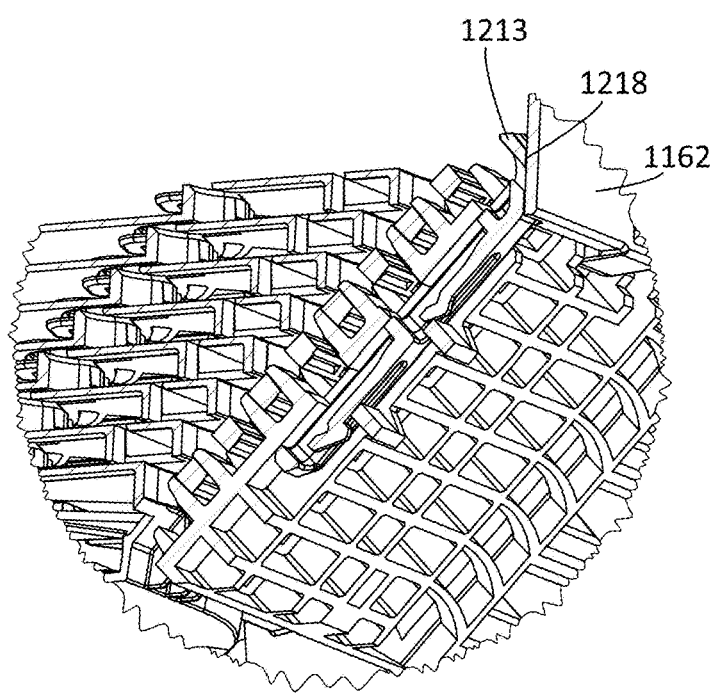
FIG. 77 is an enlarged view of the called out area F of FIG. 76.
Figure 78:
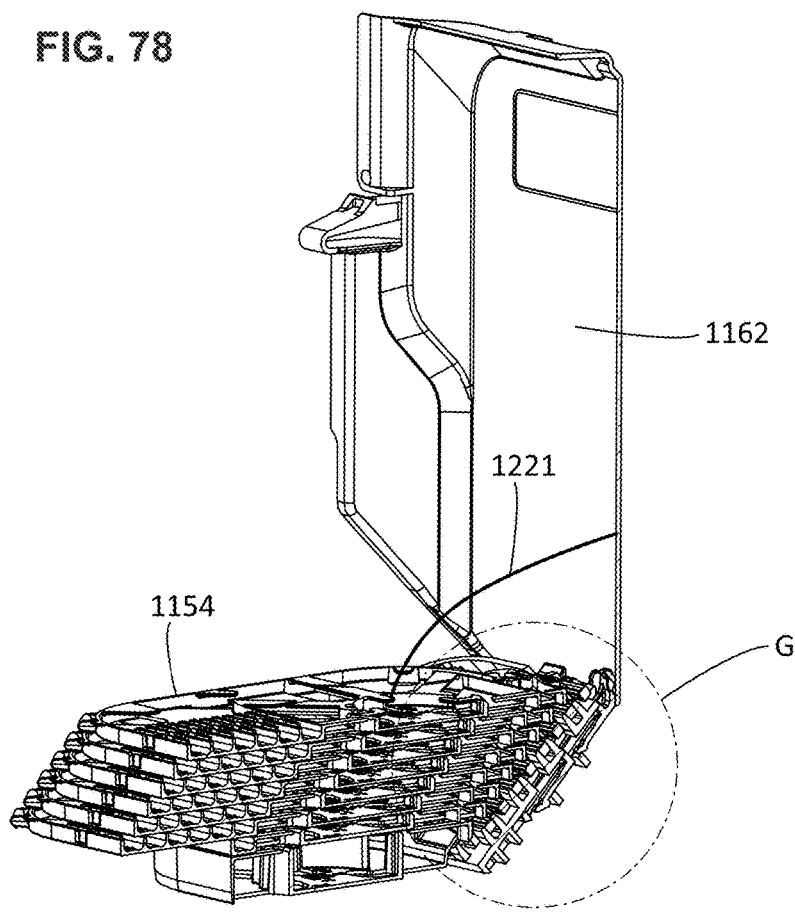
FIG. 78 is a further perspective cross-sectional view of the subassembly of FIG. 71 taken along the line E-E in FIG. 75, the demarcation cover being in the first pivoted open configuration.
Figure 79:
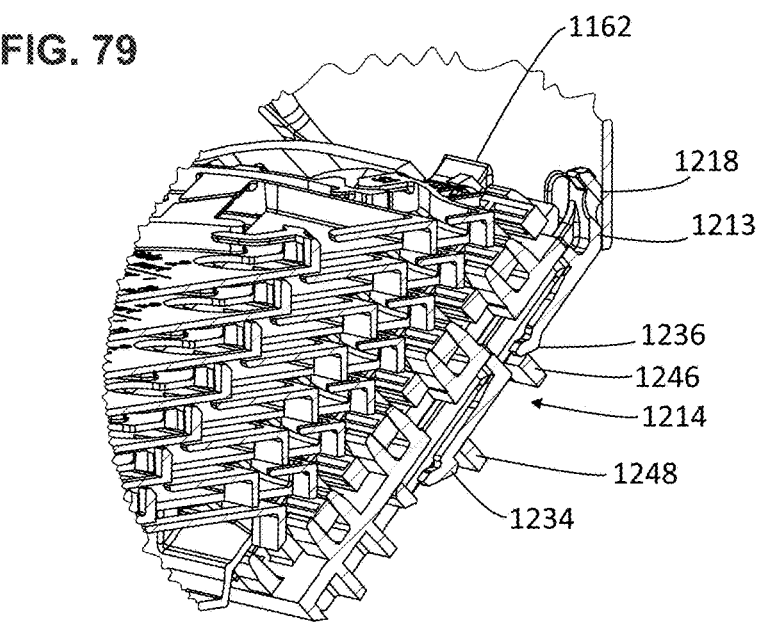
FIG. 79 is an enlarged view of the called out area G of FIG. 78.
Figure 80:
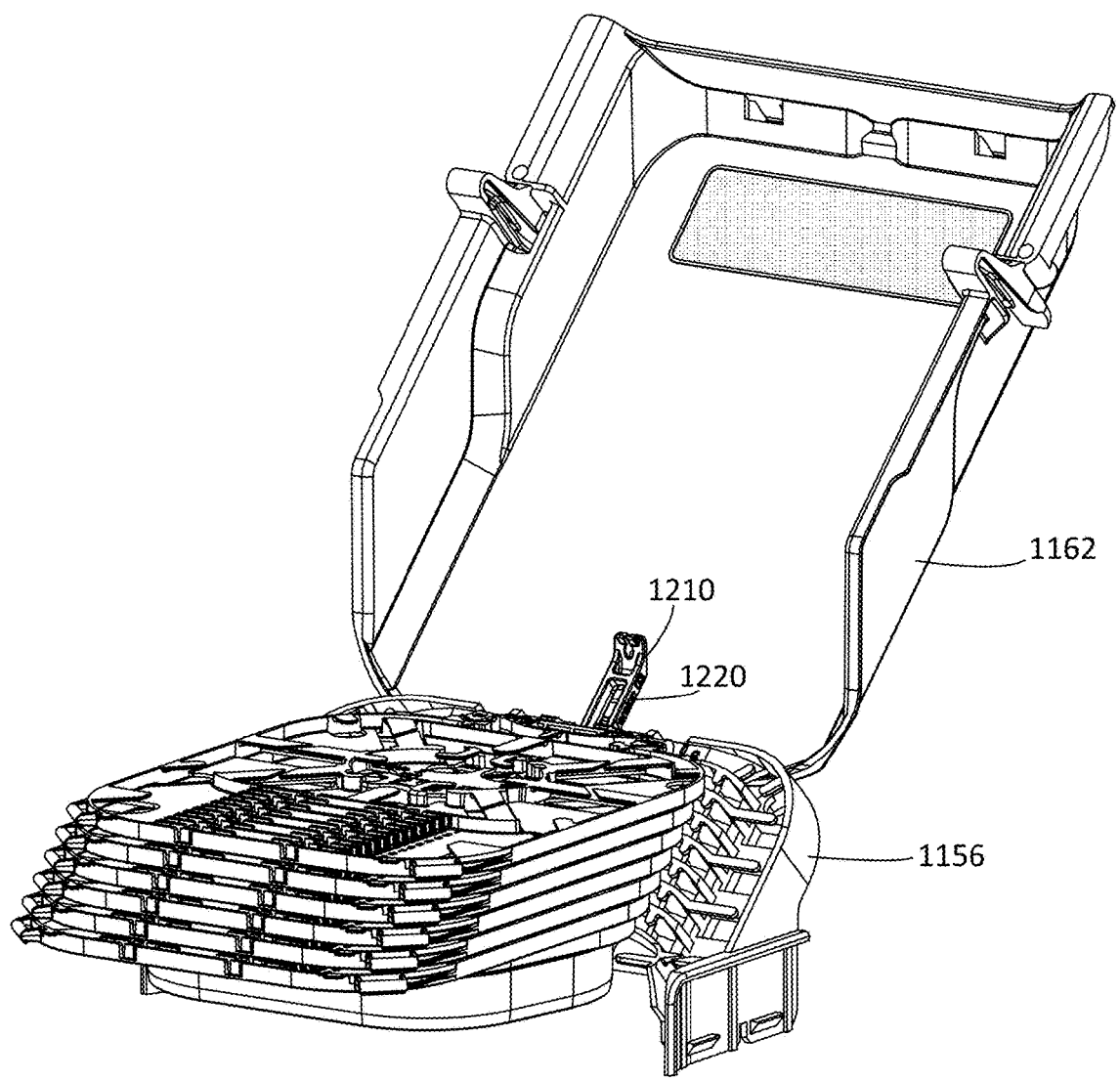
FIG. 80 is a further perspective view of the subassembly of FIG. 71, the demarcation cover being in a second pivoted open configuration.
Figure 81:
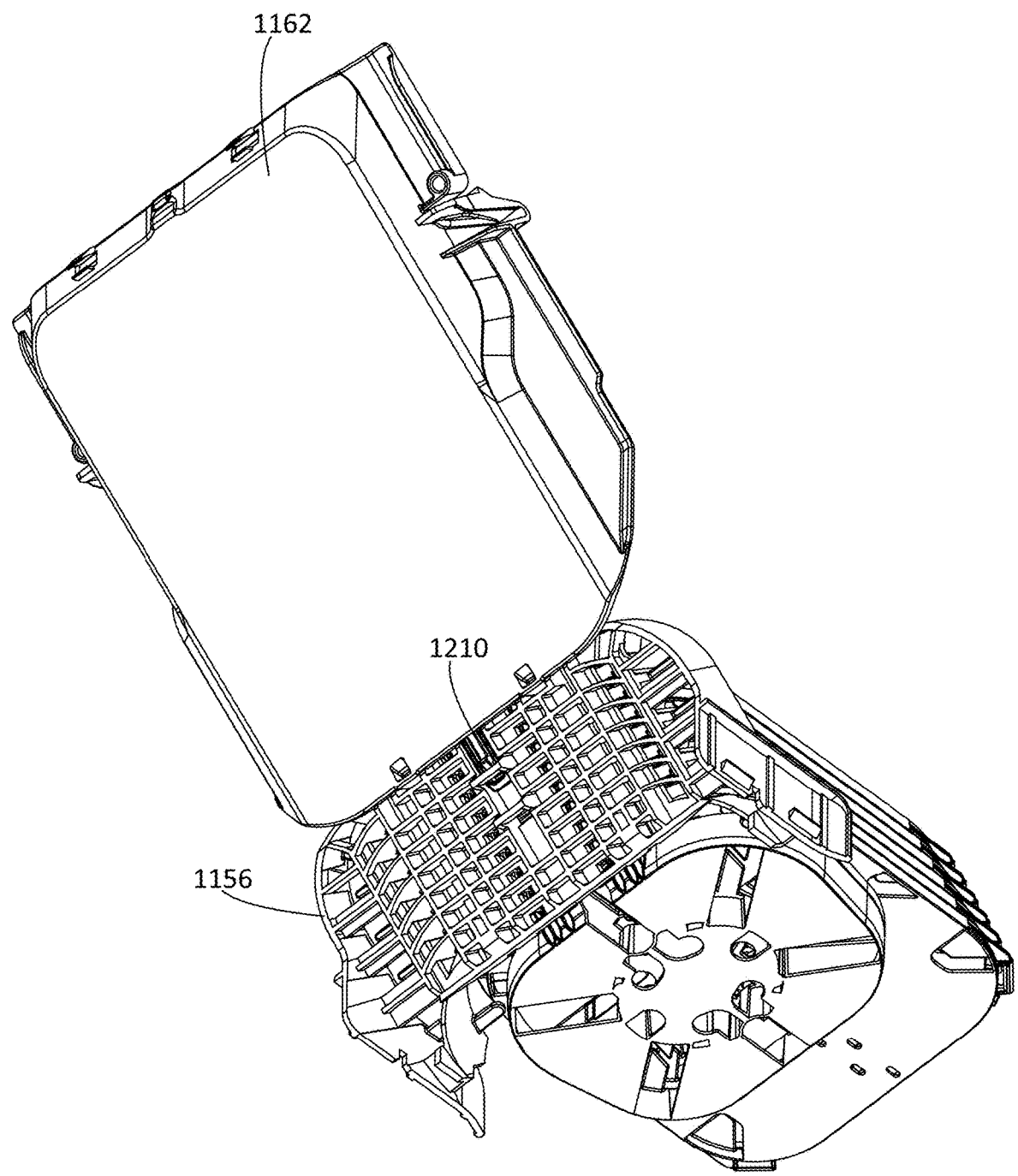
FIG. 81 is a further perspective view of the subassembly of FIG. 71, the demarcation cover being in the second pivoted open configuration.
Figure 82:
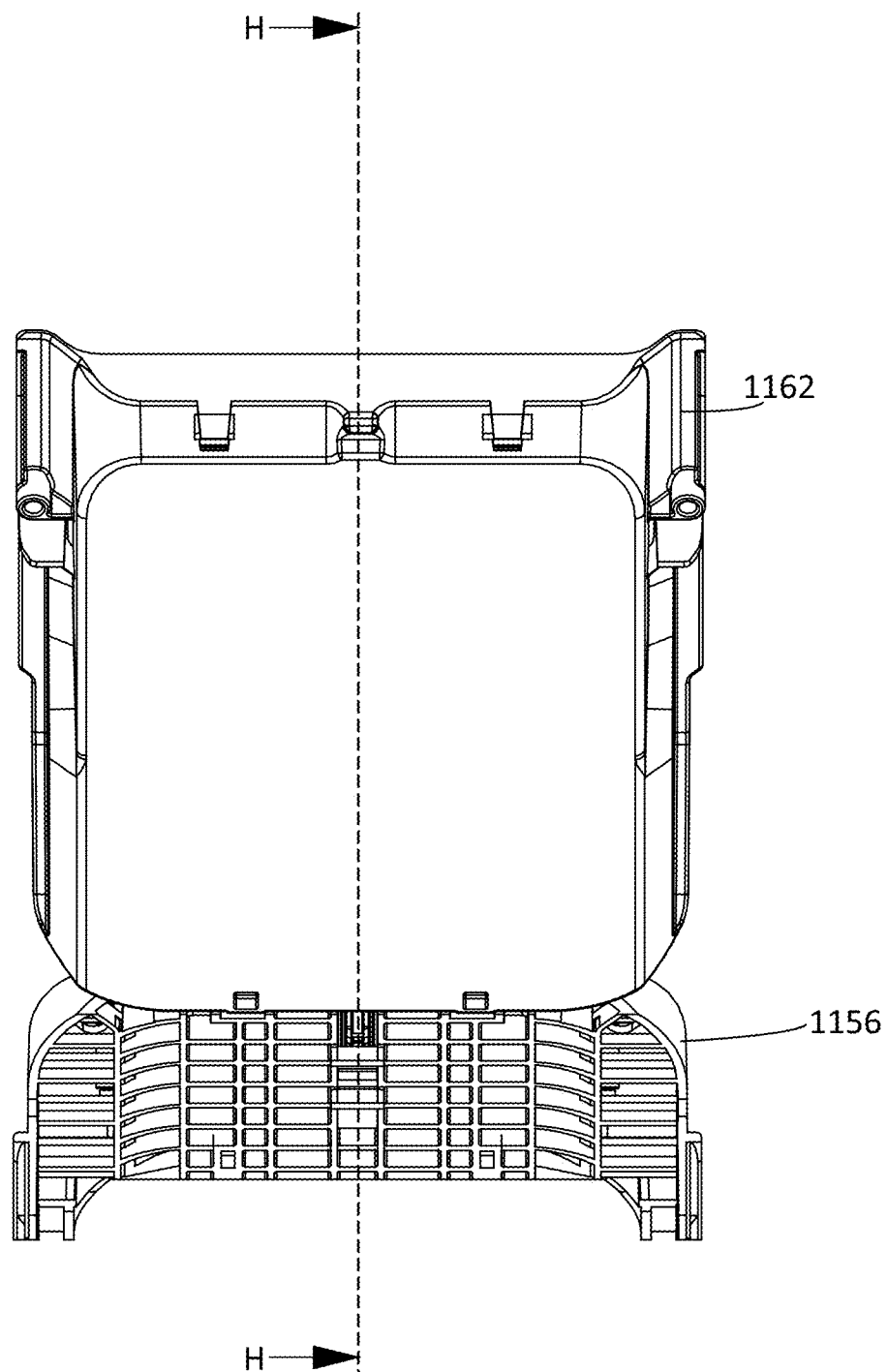
FIG. 82 is a distal end view of the subassembly of FIG. 71, the demarcation cover being in the second pivoted open configuration.
Figure 83:
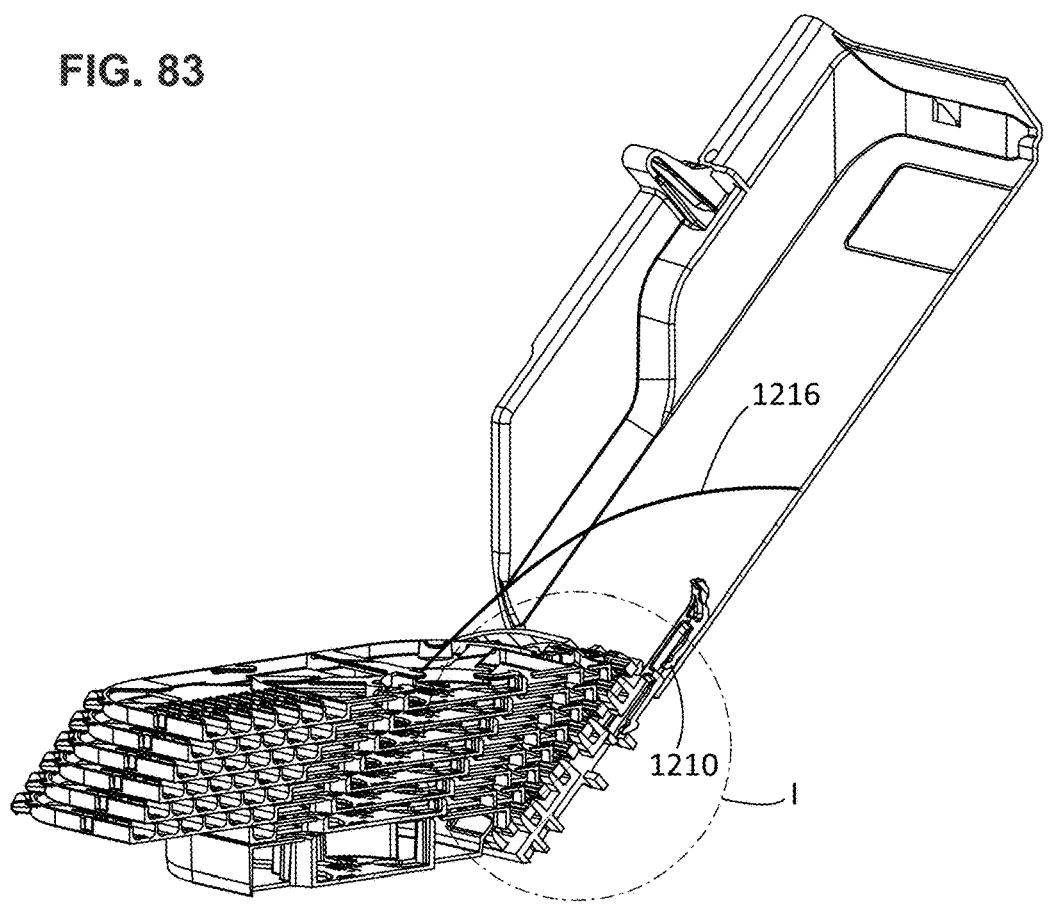
FIG. 83 is a perspective cross-sectional view of the subassembly of FIG. 14 taken along the line H-H in FIG. 82, the demarcation cover being in the second pivoted open configuration.
Figure 84:
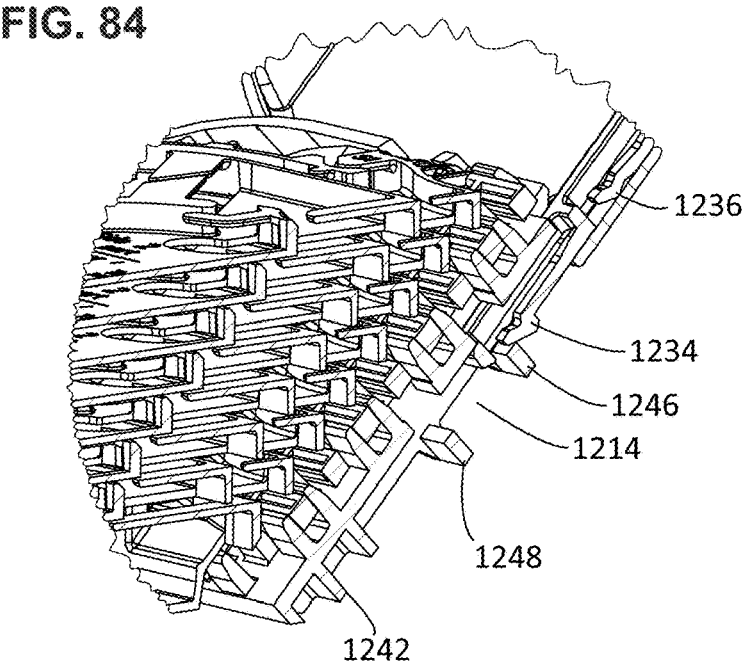
FIG. 84 is an enlarged view of the called out area I of FIG. 83.
Figure 85:
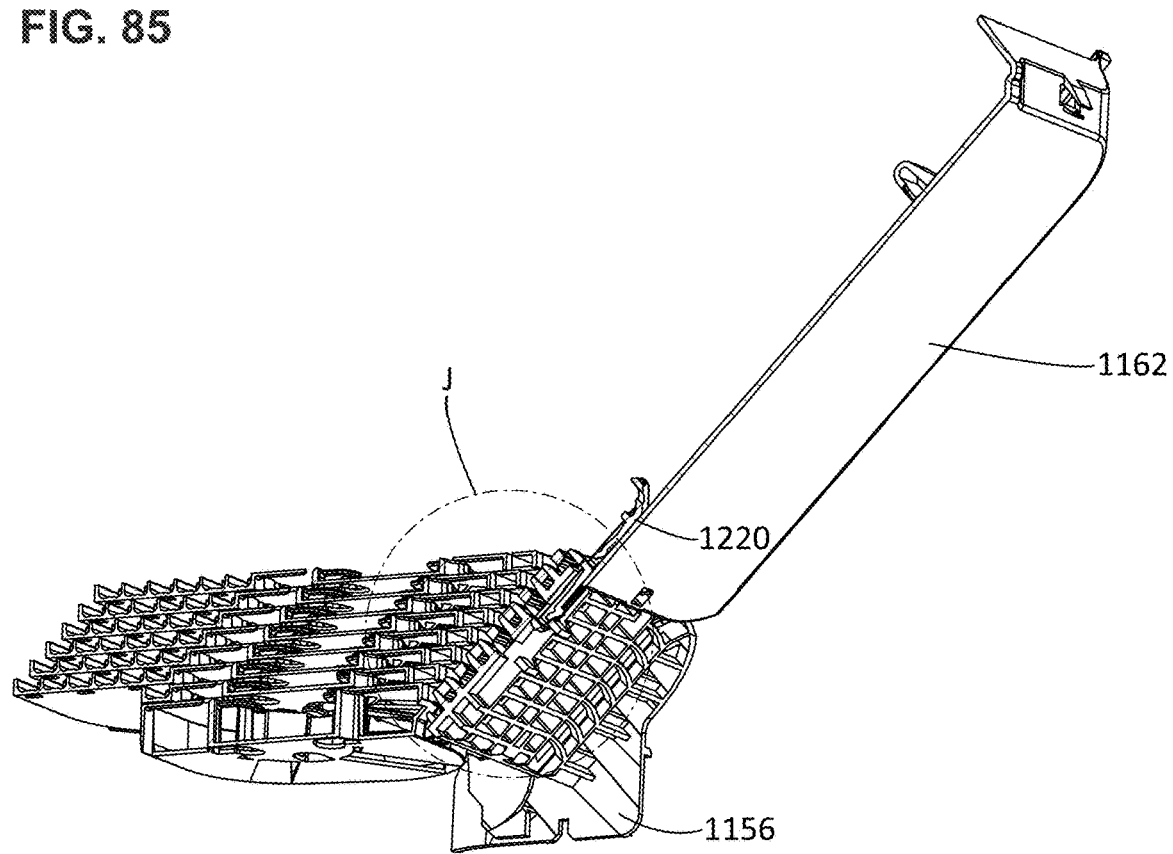
FIG. 85 is a further perspective cross-sectional view of the subassembly of FIG. 71 taken along the line H-H in FIG. 82, the demarcation cover being in the second pivoted open configuration.
Figure 86:
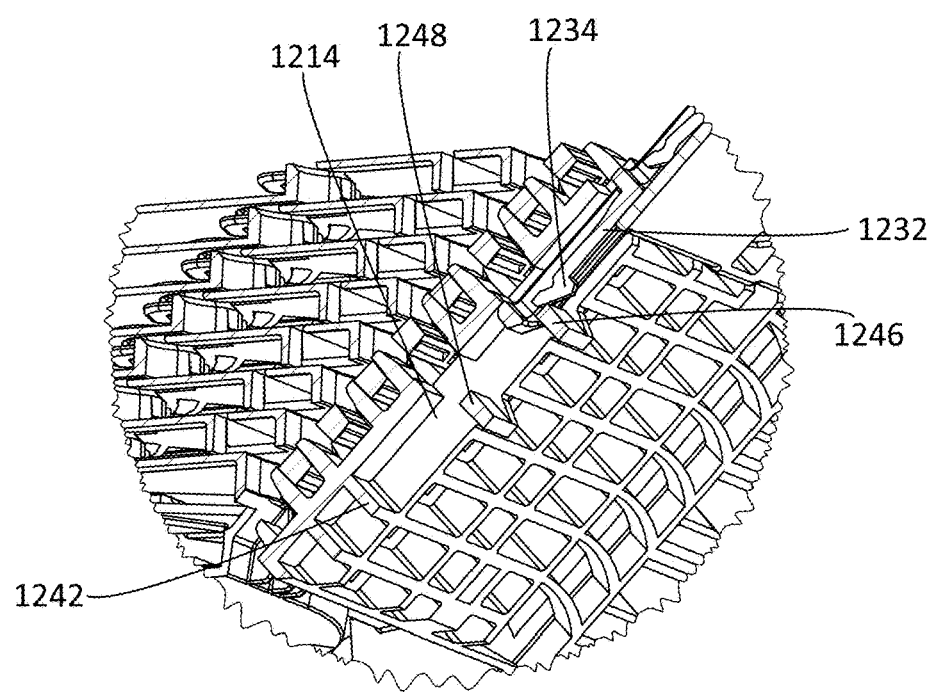
FIG. 86 is an enlarged view of the called out area J of FIG. 85.
Figure 87:
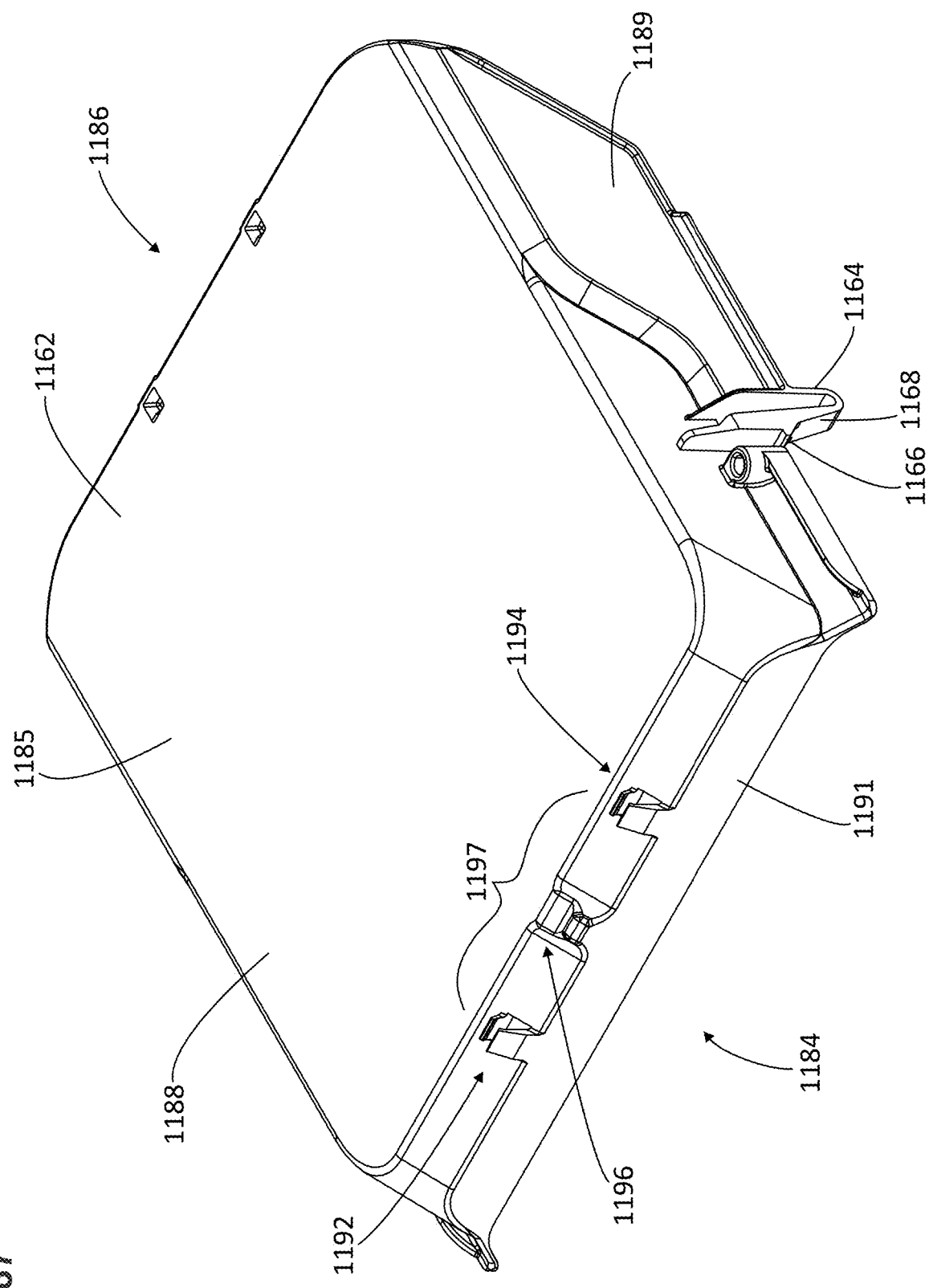
FIG. 87 is a perspective view of the demarcation cover of the organizer of FIG. 60.
Figure 88:
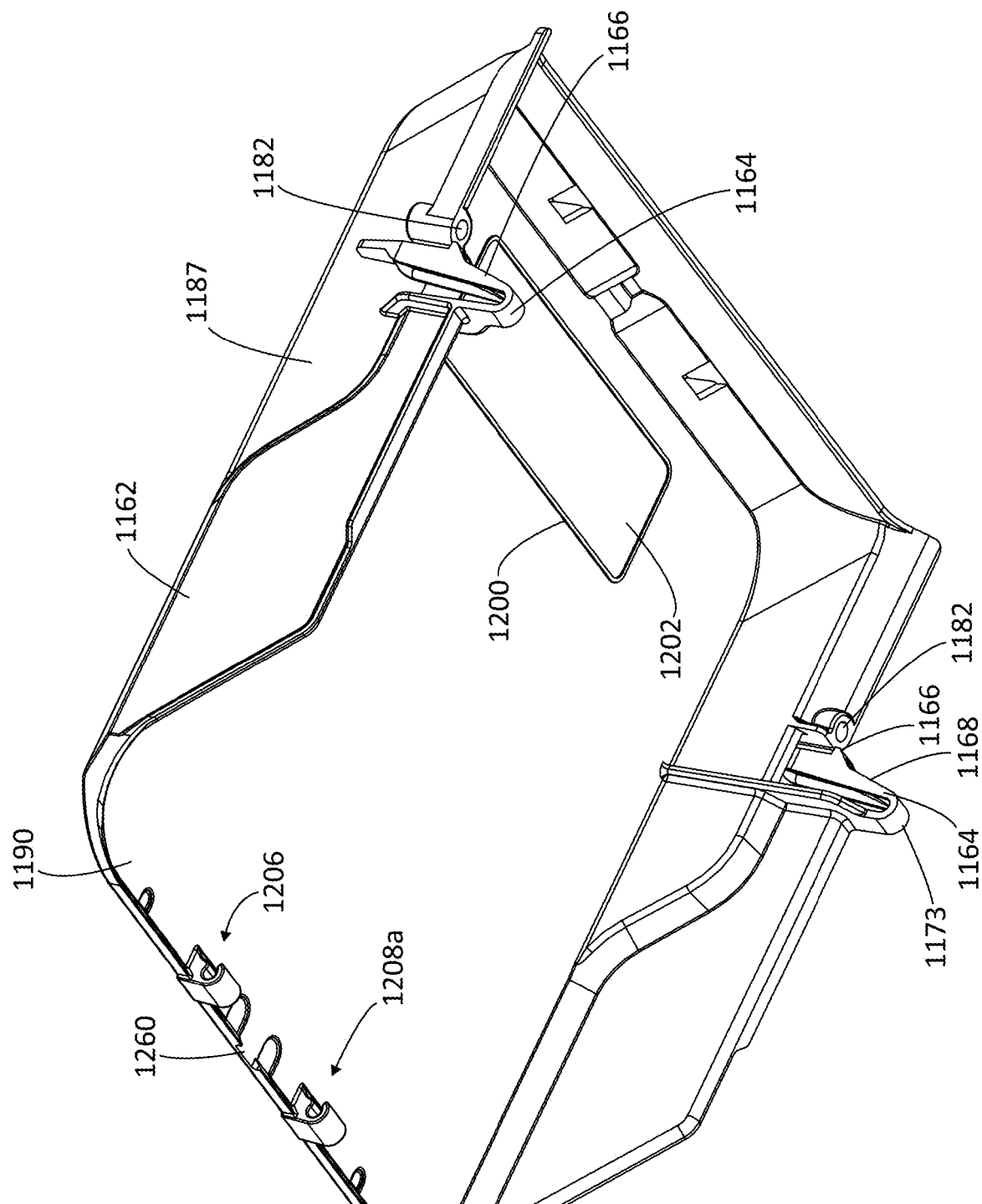
FIG. 88 is a further perspective view of the demarcation cover of FIG. 87.
Figure 89:
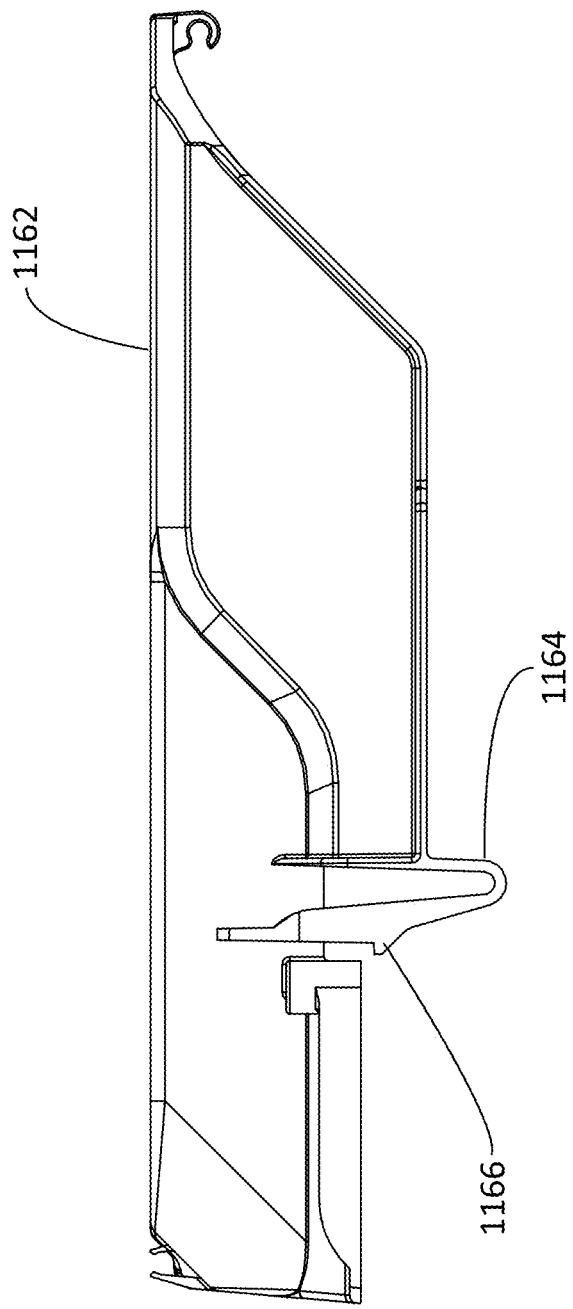
FIG. 89 is a side view of the demarcation cover of FIG. 87.
Figure 90:
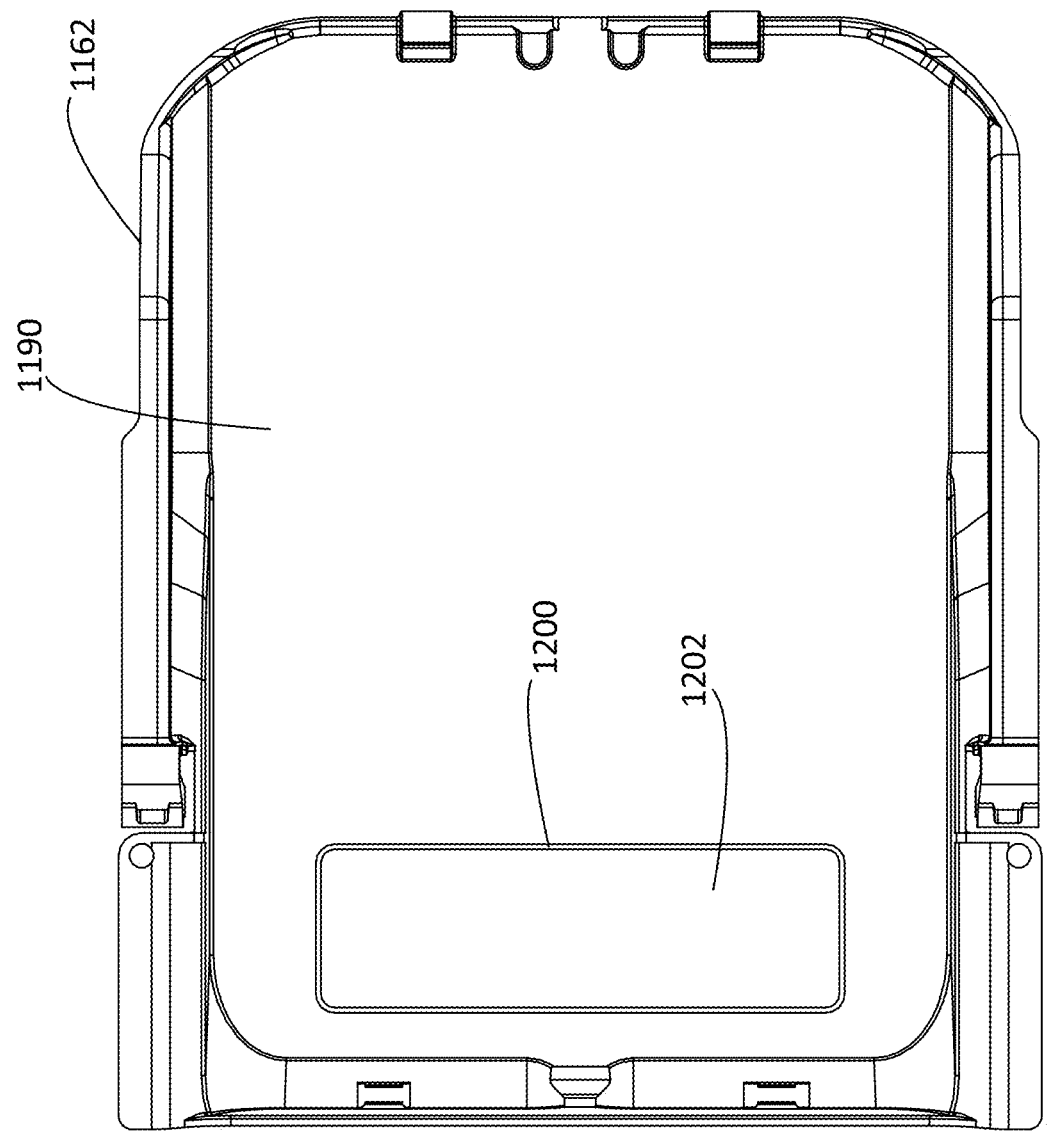
FIG. 90 is a bottom view of the demarcation cover of FIG. 87.
Figure 91:
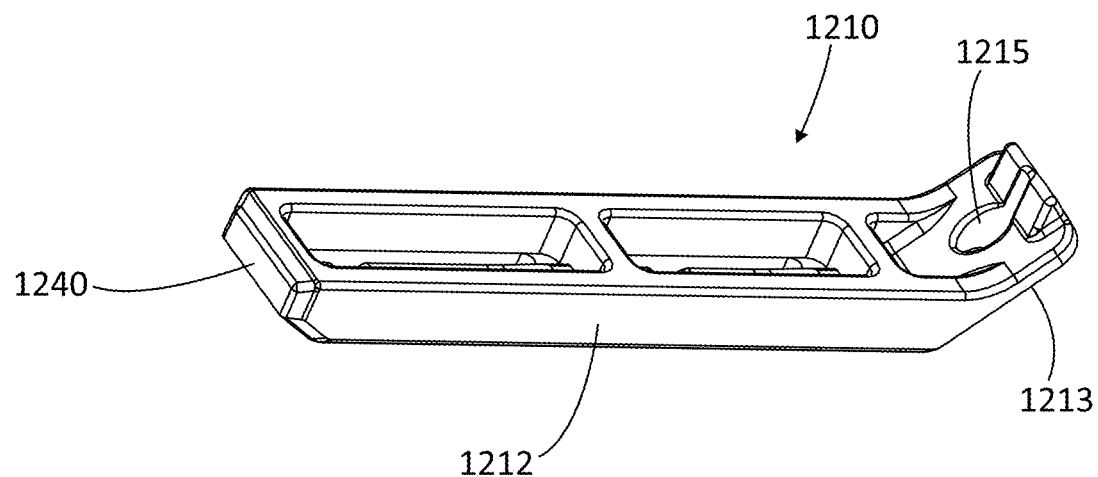
FIG. 91 is a perspective view of the cover support of the subassembly of FIG. 71.

FIGS. 56 to 59 show additional cable routing examples. FIGS. 56 and 59 show cable routing examples for the first zone 350 while FIGS. 57 and 58 show cable routing examples for the second zone 360.

Cable Management Organizer 1000

Referring to FIGS. 60 to 92, an alternative arrangement for the above-described cable or fiber management organizer 100 is presented organizer 1000. Many of the features between organizers 100, 1000 are overlapping. Accordingly, the description for organizer 100 is largely applicable for organizer 1000 and the entire description for such overlapping features is not repeated here. The below-described features of organizer 1000 may be combined with the features of organizer 100, and vice-versa, and are not mutually exclusive. For example, the organizer 100 may be provided with the below-described base/main body, tower/tray support, demarcation cover, locking mechanism, compressible pad arrangement, and/or cover support arrangement, among other features. Likewise, the the organizer 1000 may be provided with the above-described base/main body, tower/tray support, demarcation cover, cover support part, and/or cable routing installations, among other features.

Referring now to FIGS. 60-70, a fiber management organizer (or organizer) 1000 in accordance with the present disclosure will be described. The cable organizer 1000 can cooperate with housing pieces of a closure such as the closure 10 described above. For example, the cable organizer 1000 can cooperate with the housing pieces 30, 32 as described above with respect to FIGS. 1 and 2. An internal portion of the organizer 1000 can be positioned in the closure volume 40.

The organizer 1000 extends along a longitudinal axis 1102 from a proximal end 1103 to a distal end 1104, along a transverse axis 1106 from a first side 1108 to a second side 1110, and along a vertical axis 1112 from a top 1114 to a bottom 1116. The axes 1102, 1106 and 1112 are mutually perpendicular, with the axes 1102 and 1106 defining a horizontal plane.

The organizer 1000 is generally divided by one or more panels, walls, or other structures between an upper region 1122 and a lower region 1124. Some of these panels, walls and other structures form an integrated unit that serves as a main body 1111 of the organizer 1000.

The organizer 1000 defines one or more channels 1130 and other guiding structures for guiding optical fibers between the upper and lower regions. The lower region 1124 is configured to store loops of sheathed fibers. For example, fibers of feeder cables that are not needed for active connections can be stored in sheathed loops in the lower region 1124.

Fibers from provider side feeder cables 1070 and/or branch cables enter the organizer in the lower region 1124. These fibers can be loose, ribbonized, and/or positioned in protective sheaths. The fibers can be routed to the upper region 1122 via channels 1130.

The upper region 1122 of the organizer 1000 includes a proximal area 1140 and a distal area 1141. The proximal area 1140 includes banks 1144 of adapters 1146. The adapters 1146 are configured to receive connectorized ends of fibers from drop cables 1172 and optically connect them to connectorized pigtails. For example, an adapter 1146 receives a connector 1148 of a drop cable fiber and a connector 1150 a pigtail fibers such that the two fibers are optically connected.

The pigtail fibers are routed to the distal area 1141. The distal area 141 is a fiber management area. The fiber management area 1141 includes a stack 1152 of fiber management trays 1154. The trays 1154 are pivotally mounted to a tray support 1156. For compactness and access to trays within the stack 1152, the tray support 1156 is angled obliquely to a horizontal plane. To access a lower tray in the stack 1152, the tray(s) 1154 above can be pivoted to a pivot up position using a hinged coupling of the trays and the tray support 1156.

The trays 1154 can support fiber management components, such as a splice holders, signal splitters, wave division multiplexers, etc. In the example shown, each tray 1154 includes a splice holder region 1158 and a fiber routing and spooling region 1160. The splice holder region 1158 includes splice holders 1159 configured to hold splice bodies (e.g., protective bodies surrounding splices between two individual fibers or between two sets of fibers).

Each pigtail fiber terminated at a connector 1150 can be routed onto a tray 1154 via a fiber routing channel defined by the tray support 1156. On the tray 1154, a splice body protecting a splice between the pigtail fiber and a fiber of a feeder cable or a branch cable routed from the lower region 1114 can be held by a splice holder 1159. In addition, branch cable fibers can be spliced to other branch cable fibers and their splice bodies held by splice holders 1159 of the trays 1154. Such fibers can be routed from the lower region 1124 to the splice location in the upper region 1122 and then back to the lower region 1124.

The proximal area 1140 with pigtail connectorization capability allows a technician working on the fiber management organizer (e.g., in the field where the closure is situated) to create, deactivate and swap drop cable connections without needing access to the fiber management trays 1154, or even any portion of the fiber management area 141. Avoiding unnecessary access to the fiber management area 1141 can be advantageous in minimizing disruption and/or damage to the delicate fiber management components and loose fibers supported on the trays 1154.

To minimize inadvertent handling or disruption, e.g., by a technician, of the components and structures positioned in the fiber management area 141, a demarcation cover 1162 is provided. The demarcation cover 1162 can be a molded part, e.g., molded from a polymeric material. In some examples, the demarcation cover 1162 can be constructed of metal, e.g., sheet metal.

The demarcation cover 1162 is releasably lockable to the main body 1111, or to another component coupled to the main body 1111. When locked to the main body 1111, the demarcation cover (or cover) 1162 covers the trays 1154 minimizing access to the trays 1154. In some examples, the cover 1162 also covers the tray support 1156, minimizing access to the tray support 156. When locked to the main body 1111 of the organizer, the cover 162 does not cover the proximal area 1140, allowing access to the proximal area 1140. Thus, when locked to the main body 1111, the cover 1162 does not cover the banks 1144 of adapters 1146, allowing access to the banks 1144 of adapters 1146, such that different connectorization arrangements between drop cables and pigtails can be performed when the cover 162 is locked to the main body 111.

To further minimize inadvertent or unnecessary access to the distal area 1141, two locking mechanisms that operate with different locking principles are provided to lock the cover 1162 to the main body 1111.

Referring to FIGS. 65, 66, 69, 70, and 87-90, the first locking mechanism includes, on each of two opposite sides of the cover 1162, a resilient arm 1164 having a catch 1166. The resilient arm 1164 includes a ramp 1168 leading to the catch 1166.

When covering the distal area 1141 with the cover 1162, the cover 1162 is lowered toward the main body 1111 such that, on each of two opposite sides of the cover 1162, the ramp 1168 engages a lip 1170 defined by the main body 1111. As the ramp 168 slides relative to the lip 1170, the arm 1164 flexes about flex point 1173 until the catch 1166 clears the lip 1170. At this point, the arm 1164 resiliently returns to its unflexed position and the catch 1166 snaps into snapping engagement with an underside of the 1170 creating a locking engagement between the cover 1162 and the main body 1111. To unlock the cover 1162 from the main body 1111, the resilient arm 1164 can be flexed, with a tool or a finger, to pivot about the flex point 1173 such that the catch 1166 disengages the lip 1170 and no longer locks the arm 1164 to the main body 1111.

The second or redundant locking mechanism for locking the cover 1162 to the main body 1111 includes use of a self-tapping screw or other fastener 1180 on each of two opposite sides of the cover 1162. On each of the two opposite sides of the cover 1162, the fastener 1180 is inserted through a through hole 1182 defined by the cover 1162 and a corresponding and aligned fastener hole 1183 defined by the main body 1111.

In the example shown, the first and second locking mechanism are adjacent each other at opposite sides of the cover 1162 and corresponding opposite sides of the main body 1111. In other examples, the two locking mechanisms can be spaced apart from each other to a greater extent on the cover 1162.

In some examples, the organizer 1000 is constructed and shipped from a manufacturing facility with the cover 1162 pre-locked to the main body 1111. In some examples, the cover 1162 can be locked to the main body in the field after being shipped from the manufacturing facility.

In some examples, the cover 1162 and main body 1111 include only the first locking mechanism. In some examples, the cover 1162 and main body 1111 include only the second locking mechanism. In some examples, the cover 1162 and main body 1111 include the first and second locking mechanisms, but only the first locking mechanism is utilized to lock the cover 1162 and the main body 1111. In some examples, the cover 1162 and main body 1111 include the first and second locking mechanisms, but only the second locking mechanism is utilized to lock the cover 1162 and the main body 1111. In some examples, the cover 1162 and main body 1111 include the first and second locking mechanisms, and the first and second locking mechanisms are utilized to lock the cover 1162 and the main body 1111.

In examples in which the cover 1162 and the main body 1111 are locked to each other using both locking mechanisms, in order to unlock the cover 1162 from the main body 1111 and thereby permit access to the fiber management area 1141, the fasteners 1180 are unscrewed or otherwise removed from the cover 1162 and the main body 1111 and, subsequently, the resilient arms 1164 are flexed simultaneously so that their catches 1166 disengage the lips 1170, allowing the cover 1162 to be lifted (e.g., pivoted) away from the main body 1111.

The cover 1162 extends from a proximal end 1184 to a distal end 1186. The cover 162 defines an exterior surface 1188 and an interior surface 1190.

The cover 1162 includes an upper panel 1185 and side panels 1187 and 1189 extending from the upper panel 1185. The cover 1162 also includes a proximal panel 1191 extending from the upper panel 1185. The locking mechanisms described above are both accessible at the exterior of the cover 1162 and positioned at the side panels 1187 and 1189.

When the cover 1162 is in a pivoted closed and locked position, the top panel 1185 completely covers the stack 1152 of trays 1154 and extends horizontally beyond the outermost edges of the trays 1154. When the cover 1162 is in the pivoted closed and locked position, the side panels 1187 and 1189 and the proximal panel covers sides of the stack 1152 of trays 1154. In this manner, inadvertent and/or unnecessary access to the trays 1154 when working on the proximal area 140 can be minimized.

The cover 1162 includes a holder 1197 for a fiber pick 1198. In the example shown, the holder includes snap clips 1192 and 1194 and a grooved rest 1196 defined by the exterior surface 1188. Advantageously a fiber pick 1198 can be secured to the cover 1162 by locking the fiber pick 1198 in the snap clips 1192 and resting the fiber pick on the grooved rest 1196. The fiber pick 1198 can be handheld and used to guide optical fibers on a tray 1154, or to guide pigtails extending from the adapters 1146. The fiber pick 1198 can provide for finer and more precise manipulation of individual fibers, particularly in cramped or crowded spaces of the organizer 1000, than a technician's fingers.

The interior surface 1190 of the cover 1162 defines a ridge 1200. The ridge 1200 fully encloses a seat 1202 for receiving a pad 1204. For example, a pad 1204 can be adhered to the seat 1202 within the ridge 1200. In some examples, the seat 1202 is recessed relative to the interior surface 1190 that surrounds the ridge 1200.

Figure 11:
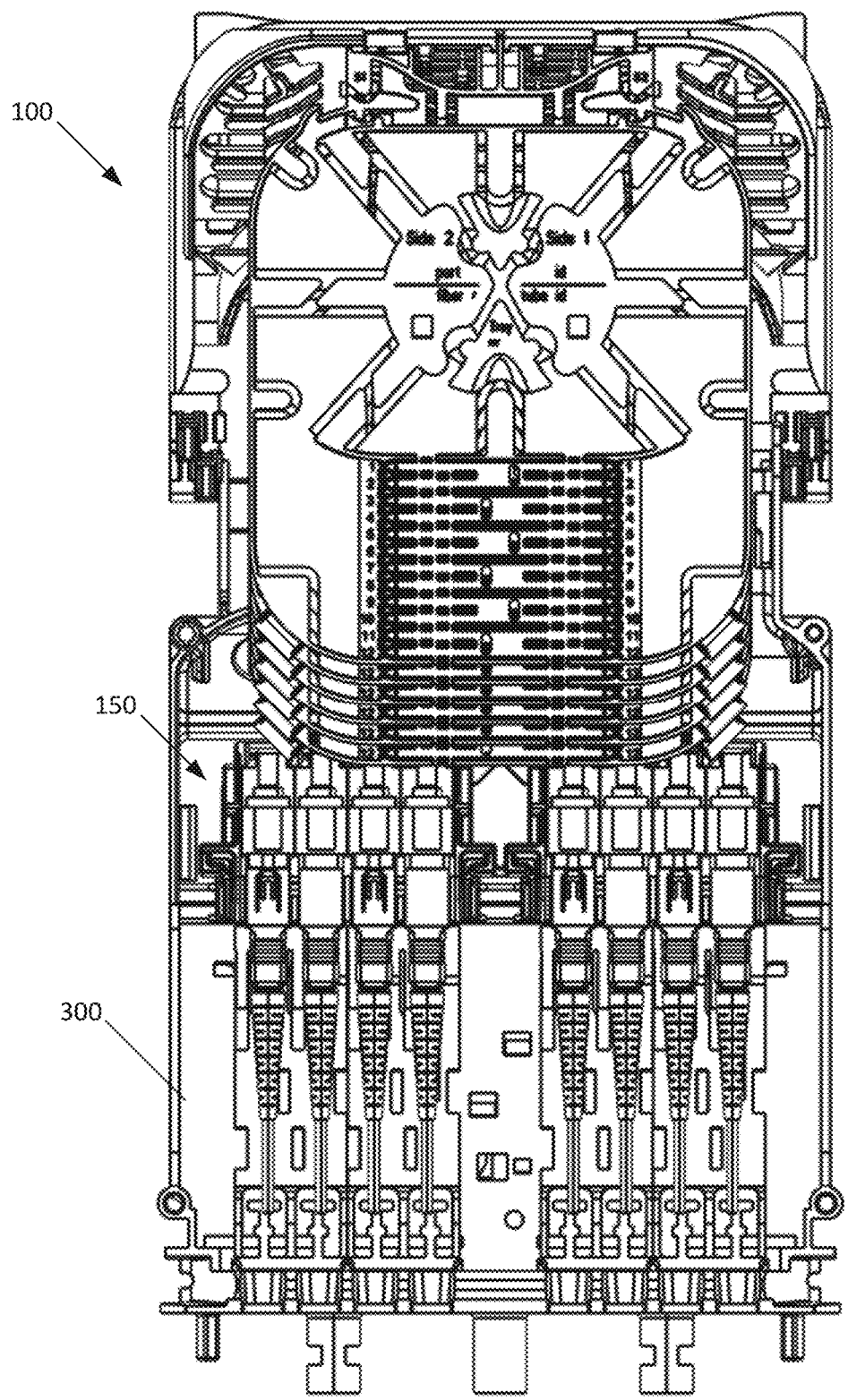
FIG. 11 is a top view of the assembly of FIG. 10.
Figure 12:
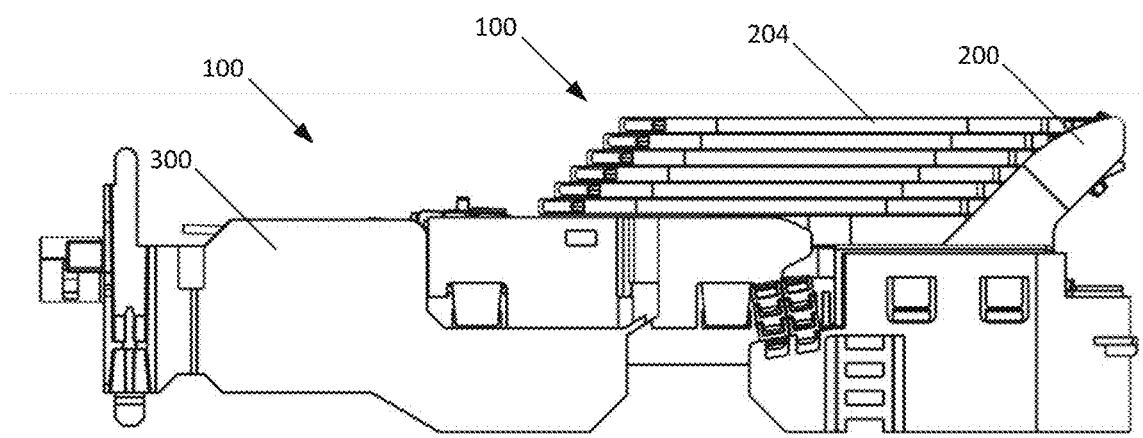
FIG. 12 is a side view of the assembly of FIG. 10.

The pad 1204 can be made of a soft, compressible material, such as a foam. The pad 1204 is sized and otherwise configured to press against the uppermost tray 1154 of the stack 1152 when the cover 1162 is locked to the main body 1111 (FIG. 11). In some examples, the pressing of the uppermost tray 1154 of the stack 1152 against the pad 1204 causes the pad 1204 to compress. The interfacing of the pad 1204 and the uppermost tray 1154 (FIG. 11) can minimize unwanted shifting or rattling of the trays 1154 when the cover 1162 is locked to the main body 1111. In some examples, the pad 1204 is positioned to abut the splice holders 1159 of the uppermost tray 1154 when the cover 1162 is locked to the main body 1111.

In addition to the cover 1162 being lockable to the main body 1111, the distal end 1186 of the cover 1162 is pivotally coupled to the tray support 1156. Thus, advantageously, the cover 1162 can be opened to provide access to the fiber management area 1141 without complete disengagement of the cover.

Referring, to FIGS. 71-92, the cover 1162 includes hinge pin sockets 1206, 1208. The hinge pin sockets 1206, 1208 pivotally receive hinge pins 1209, 1211 (FIG. 70) by snap engagement with the sockets. The hinge pins 1209, 1211 are defined by the tray support 1156 to provide a hinge joint 1167 between the cover 1162 and the tray support 1156.

In some situations, it can be beneficial to hold the cover 1162 in a pivoted open position so that work (e.g., splice work) can be performed in the fiber management area 1141. For example, if the closure is aerially suspended, gravity may urge the cover towards the pivoted closed position, hampering the ability for work to be performed in the fiber management area 1141.

A cover support 1210 is provided to support the cover 1162 in each of one or more pivoted open positions. The cover support 1210 includes an elongate support body 1212 and a tab 1213 extending away from the support body 1212 at an oblique angle to the elongate dimension of the support body 1212. A hole 1215 defined by the tab 1213 can receive a tool (e.g., the fiber pick 1198) for sliding the cover support 1210 between different support positions. The support body 1212 is slidingly received in a slot 1214 defined by the tray support 1156. The support body 1212 and the slot 1214 cooperate with each other to hold the support body 1212 in each of three or more different positions relative to the slot.

In a first of the positions, or the non-extended position (FIG. 72), pivoting of the cover 1162 relative to the tray support 1156 about the pivot axis defined by the hinge 1167 is entirely, or at least substantially, unencumbered by the cover support body 1212. Typically, when the cover support 1210 is in the first position, the cover 1162 is closed and locked to the main body 1111.

In a second of the positions (FIGS. 73-79), pivoting of the cover 1162 relative to the tray support 1156 about the pivot axis defined by the hinge 1167 is encumbered by the tab 1213 of the cover support 1210 at a first engagement site 1218, beginning from a first maximum pivot angle 1221 away from the cover closed position. In some examples, the encumbrance prevents further pivoting beyond the first maximum pivot angle. The first maximum pivot angle 1221 can be in a range from about 60 degrees to about 100 degrees. In some examples, the first maximum pivot angle is about 60 degrees, or about 70 degrees, or about 80 degrees, or about 90 degrees, or about 100 degrees.

In a third of the positions (FIGS. 80-86), further pivoting of the cover relative to the tray support 1156 about the pivot axis defined by the hinge 1167 is encumbered by the cover support body 1212 at a second engagement site 1220, beginning from a second maximum pivot angle 1216 away from the cover closed position. In some examples, the encumbrance prevents further pivoting beyond the second maximum pivot angle. The second maximum pivot angle 1216 can be in a range from about 110 degrees to about 180 degrees. In some examples, the second maximum pivot angle is about 120 degrees, or about 130 degrees, or about 140 degrees, or about 145 degrees, or about 150 degrees, or about 160 degrees.

The cover support body 1212 can be slid within the slot 1214 from the first position to the second position. The cover support body 1212 can be slid within the slot 1214 from the second position to the third position. Similarly, the cover support body 1212 can be slid within the slot 1214 from the third position to the second position, and from the second position to the first position.

Figure 92:
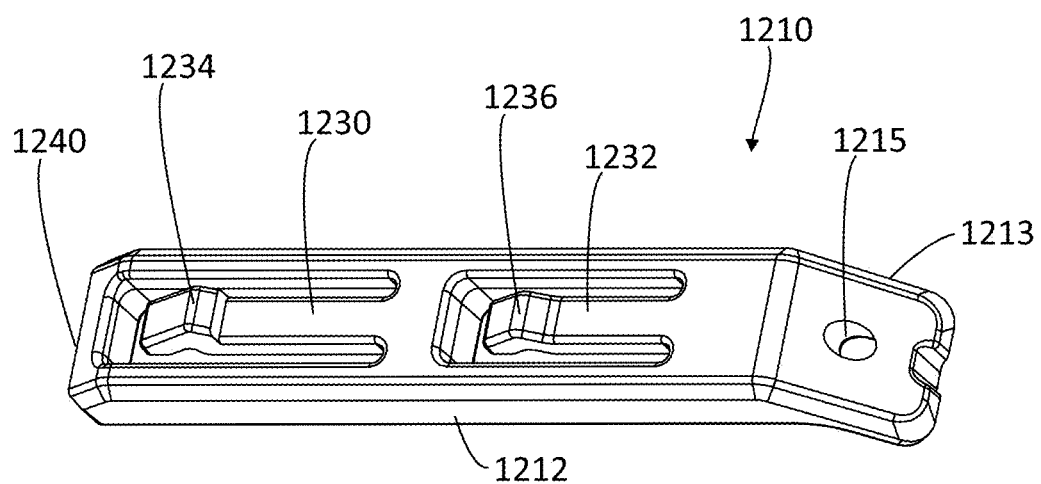
FIG. 92 is a further perspective view of the cover support of the subassembly of FIG. 71.

Cooperating features of the cover support body 1212 and the slot 1214 stabilize the cover support body 1212 in the first, second, or third position, until it is desirable to move the cover support body 1212 from that position to another position. These features include one or more (e.g., two) resilient members1 1230, 1232 of the body 1212 (FIG. 92). Each resilient member 1230, 1232 includes, at its free end, a catch 1234, 1236 (FIG. 92).

In the first position, in which the cover 1162 is pivoted closed (FIG. 72), the proximal end 1240 (FIGS. 81-92) of the cover support 1210 engages a slide stop 1242 of the tray support 1156. The slide stop 1242 is a bar that defines the bottom end of the slot 1214 and inhibits further sliding of the cover support 1210 within the slot 1214 in the direction 1244. The cover 1162 defines a notch 1260 (FIG. 88) that, in some examples, receives a distal end portion of the cover support 1210 when the cover support 1210 is the first position.

In the second position, in which the cover 1162 is pivoted to the first open position (FIGS. 73-79), the cover support 1210 has been slid opposite the direction 1244 (FIG. 72) in the slot 1214 until the catch 1236 rides over the catch engagement bar 1246 defined by the tray support 1156. The catch 1236 rides upward over the catch engagement bar 1246, causing the resilient member 1232 to flex until the catch 1236 snaps back into engagement with the upper side of the catch engagement bar 1246, inhibiting sliding of the cover support 1210 in the direction 1244 (FIG. 72) within the slot 1214 without sufficient force to cause the catch 1236 to ride downward over the catch engagement bar 1246.

In the third position, in which the cover 1162 is pivoted to the second open position (FIGS. 80-86), the cover support 1210 has been slid opposite the direction 1244 (FIG. 72) in the slot 1214 until the catch 1234 rides over the catch engagement bar 1246 defined by the tray support 1156. The catch 1234 rides upward over the catch engagement bar 1246, causing the resilient member1 1232 to flex until the catch 1234 snaps back into engagement with the upper side of the catch engagement bar 1246, inhibiting sliding of the cover support 1210 in the direction 1244 (FIG. 72) within the slot 1214 without sufficient force to cause the catch 1234 to ride downward over the catch engagement bar 1246.

A fourth position, or intermediate pivot open position for the cover 1162 that is between the first pivot open position and the second pivot open position can be achieved by sliding the cover support 1210 within the slot 1214 such that the catch 1234 engages the upper side of the other catch engagement bar 1248 of the slot 1214. In some examples, due to cover pivoting encumbrance provided by the angle and position of the tab 1213, in the fourth position the maximum pivot angle of the cover 1162 away from the cover closed position is between the first and second maximum pivot angles.

From the foregoing detailed description, it will be evident that modifications and variations can be made in the devices of the disclosure without departing from the spirit or scope of the invention.

What is claimed is:

1. A fiber management organizer for a telecommunications closure, comprising:
   a) a main body defining a first cable management region and a second cable management region, the main body extending along a longitudinal axis; and
   b) a tray assembly extending over at least a portion of the first cable management region, the tray assembly including:
      i) a tower mounted to the main body;
      ii) a plurality of trays rotatably mounted to the tower such that the trays are rotatable about an axis orthogonal to the longitudinal axis; and
      iii) a demarcation cover defining an interior space and being rotatably mounted to the tower such that the demarcation tray is rotatable about an axis orthogonal to the longitudinal axis;
   c) wherein, when the demarcation cover is in a closed position, at least a portion of the plurality of trays is received within the interior space, and wherein the first cable management region is inaccessible and the second cable management region is accessible, and
   d) wherein, when the demarcation cover is in an open position, the first and second cable management regions are each accessible.

2. The fiber management organizer of claim 1, wherein the tower is connected to the main body with a snap-fit type connection, or wherein the trays are connected to the tower with a snap-fit type connection.

3. The fiber management organizer of claim 1, wherein the demarcation cover includes a top wall and a pair of side walls, the side walls extending along sides of the plurality of trays.

4. The fiber management organizer of claim 1, wherein the demarcation cover is secured to the main body by a deflectable latch when the demarcation cover is in the closed position.

5. The fiber management organizer of claim 1, wherein the first cable management region includes stored fiber optic cabling.

6. The fiber management organizer of claim 1, wherein the second cable management region includes a plurality of fiber optic adapters.

7. The fiber management organizer of claim 6, wherein the second cable management region includes a plurality of connectorized drop cables connected to the plurality of fiber optic adapters.

8. The fiber management organizer of claim 6, wherein the first cable management region includes stored fiber optic cabling extending from the plurality of fiber optic adapters.

9. A fiber management organizer for a telecommunications closure, comprising:
   a) a main body defining a first cable management region, the main body extending along a longitudinal axis; and
   b) a tray assembly extending over at least a portion of the first cable management region, the tray assembly including:
      i) a tower mounted to oppositely positioned side walls of the main body such that a first portion of the first cable management region is enclosed and such that a second portion of the first cable management region, located at a rearward side of the tower, remains unenclosed by the tower;
      ii) a plurality of trays rotatably mounted to a forward side of the tower such that the trays are rotatable about an axis orthogonal to the longitudinal axis;
      iii) a cover support part disposed between the main body and the tower, the cover support part enclosing the second portion of the first cable management region and supporting a central portion of the tower above the first cable management region.

10. The fiber management organizer of claim 9, wherein the cover support part is connected to the main body with a snap-fit type connection.

11. The fiber management organizer of claim 9, wherein the cover support part and the tower define an upper boundary of the first cable management region.

12. The fiber management organizer of claim 9, wherein the tower has a tray support portion extending at an oblique angle relative to the longitudinal axis.

13. The fiber management organizer of claim 12, wherein the tray support portion extends above the cover support part.

14. The fiber management organizer of claim 9, wherein the cover support part covers a portion of the first cable management region between an end of the main body and the tower.

15. A fiber management organizer assembly for a telecommunications closure, comprising:
   a) a subassembly, including:
      i) a main body defining a first area and a second area;
      ii) a tray support structure mounted at the second area; and
      iii) fiber management trays pivotally supported by the tray support structure;
   b) a demarcation cover, the demarcation cover being pivotally coupled with a hinge mechanism to the subassembly between an open position and a closed position, and being lockable, in the closed position, to the subassembly with a locking mechanism, an interior surface of the demarcation cover defining a seat; and
   c) a compressible pad positioned on the seat and configured to compress against one of the fiber management trays when the demarcation cover is in the closed position.

16. The assembly of claim 15, wherein the hinge mechanism includes a first hinge component on the demarcation cover that forms a hinge with a second hinge component on the tray support structure.

17. The assembly of claim 16, wherein the first hinge component is a socket and the second hinge component is a pin.

18. The assembly of claim 15, wherein the demarcation cover is lockable to the subassembly with two different locking mechanisms.

19. The assembly of claim 18, wherein one of the locking mechanisms includes a fastener insertable in holes defined by the demarcation cover and the main body, and wherein the other of the locking mechanism includes a resilient arm having a catch configured to lockingly engage a lip defined by the main body.

20. The assembly of claim 15, wherein the demarcation cover completely covers and extends beyond outer edges of the fiber management trays.

* * * * *